US007145920B2

(12) United States Patent
Kinoshita et al.

(10) Patent No.: US 7,145,920 B2
(45) Date of Patent: Dec. 5, 2006

(54) SDH TRANSMISSION APPARATUS AND FRAME TIMING RE-CLOCKING METHOD FOR SDH TRANSMISSION APPARATUS

(75) Inventors: Toshiaki Kinoshita, Yokohama (JP); Shosaku Yamasaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 997 days.

(21) Appl. No.: 10/007,759

(22) Filed: Oct. 31, 2001

(65) Prior Publication Data

US 2002/0064184 A1 May 30, 2002

Related U.S. Application Data

(63) Continuation of application No. PCT/JP99/02825, filed on May 28, 1999.

(51) Int. Cl.
*H04J 3/06* (2006.01)

(52) U.S. Cl. .................................................... 370/503

(58) Field of Classification Search ..................... None
See application file for complete search history.

(56) References Cited

U.S. PATENT DOCUMENTS 5,717,693 A * 2/1998 Baydar et al. .............. 370/514
5,796,795 A 8/1998 Mussman et al.
5,917,870 A * 6/1999 Wolf .......................... 370/503
6,118,795 A * 9/2000 Fukunaga et al. .......... 370/503
6,163,549 A * 12/2000 Bortolini et al. ............ 370/503
6,163,551 A * 12/2000 Wolf .......................... 370/503
6,278,718 B1 * 8/2001 Eschholz .................... 370/503
2001/0038674 A1 * 11/2001 Trans ......................... 370/503

FOREIGN PATENT DOCUMENTS

| | | |
|---|---|---|
| JP | 3-179830 | 8/1991 |
| JP | 4-291533 | 10/1992 |
| JP | 04-294649 | 10/1992 |
| JP | 05-167551 | 7/1993 |
| JP | 5-316065 | 11/1993 |
| JP | 7-087046 | 3/1995 |
| WO | WO 98/25436 | 6/1998 |

OTHER PUBLICATIONS

Supplementary European Search Report dated Mar. 18, 2005.

* cited by examiner

*Primary Examiner*—Chi Pham
*Assistant Examiner*—Anh-Vu Ly
(74) *Attorney, Agent, or Firm*—Katten Muchin Rosenman LLP

(57) ABSTRACT

In an SDH transmission apparatus, an intra-apparatus reference frame timing produced by a main signal processing unit (3A/3B) which accommodates a plurality of interface units (2) is distributed to the interface units (2) by a frame timing production section (32-9) to suppress displacements of the frame top positions of the main signals from the IF boards to the minimum, whereby frame timing re-clocking of the main signals is performed with the least necessary memory capacity without using a pointer processing technique so that, even if the number of channels to be processed increases, the apparatus scale can be suppressed to the minimum.

17 Claims, 51 Drawing Sheets

| μ-com LOS WIN | | | | WINDOW TIME | DIVIDING TIMER |
|---|---|---|---|---|---|
| D3 | D2 | D1 | D0 | (ns) | |
| 0 | 0 | 0 | 0 | 25.7 | 77.76 M/4 |
| 0 | 0 | 0 | 1 | 77.2 | 77.76 M/8 |
| 0 | 0 | 1 | 0 | 128.6 | 77.76 M/12 |
| 0 | 0 | 1 | 1 | 180.7 | 77.76 M/16 |
| 0 | 1 | 0 | 0 | 231.5 | 77.76 M/20 |
| 0 | 1 | 0 | 1 | 282.9 | 77.76 M/24 |
| 0 | 1 | 1 | 0 | 334.3 | 77.76 M/28 |
| 0 | 1 | 1 | 1 | 385.8 | 77.76 M/32 |
| 1 | 0 | 0 | 0 | 437.3 | 77.76 M/36 |
| 1 | 0 | 0 | 1 | 488.7 | 77.76 M/40 |
| 1 | 0 | 1 | 0 | 540.1 | 77.76 M/44 |
| 1 | 0 | 1 | 1 | 591.6 | 77.76 M/48 |
| 1 | 1 | 0 | 0 | 643.0 | 77.76 M/52 |
| 1 | 1 | 0 | 1 | 694.5 | 77.76 M/56 |
| 1 | 1 | 1 | 0 | 745.9 | 77.76 M/60 |
| 1 | 1 | 1 | 1 | 797.3 | 77.76 M/64 |

F I G. 12
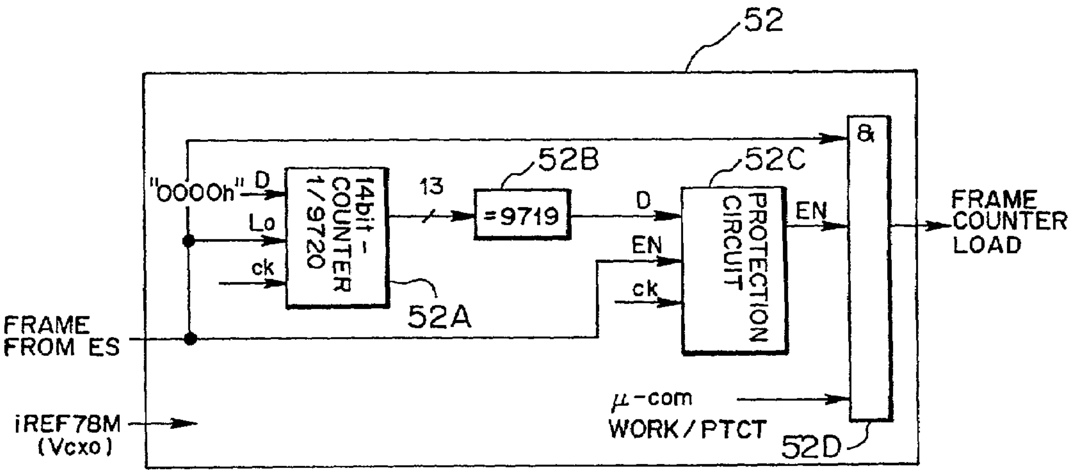
F I G. 13
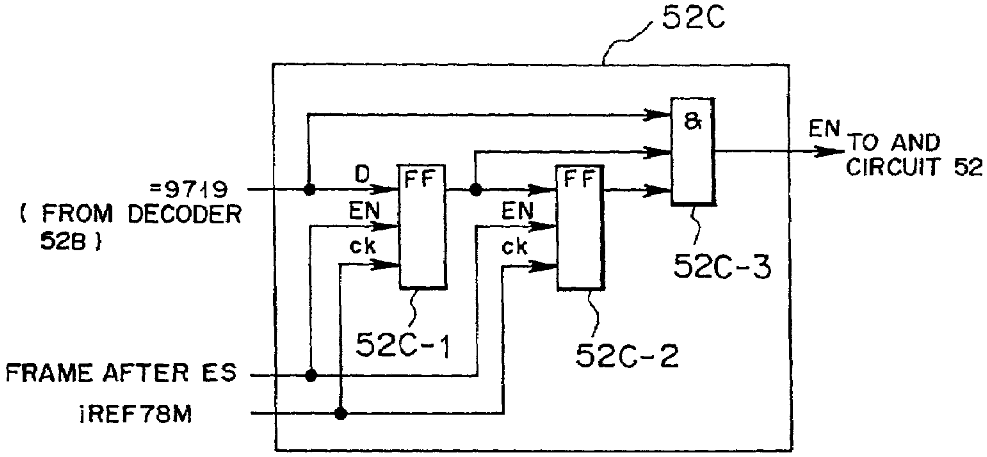

Bit-DELAY (78 CONVERSION)

| | | | |
|---|---|---|---|
| ① TP PHASE DIFFERENCE FROM STS SF WK, Pt OF INF CARD | -- | Min: 0ns | Max: 4bits |
| ② bit-DELAY OF CMOS LOGIC ON INF CARD | ----- | Min: 1ns | Max: 28bits |
| ③ MUX SIDE bit-DELAY OF BIF-SLSI ON INF CARD | ----- | Min: 22.5bits | Max: 39.5bits |
| ④ DMUX SIDE bit-DELAY OF BIF-SLSI ON STS-SF CARD | --- | Min: 4.875bits | Max: 6.875bits |
| ⑤ LOGIC DELAY OF STS TSI LSI | ----- | Min: 4bits | Max: 14bits |
| TOTAL | | Min: 31.375bits | Max: 92.375bits |

| BANDWIDTH | ① → ② → ③ → ④ | OPERATION MODE |
|---|---|---|
| 0 | 19.44M → 19.44M → 155.52M → 155.52M | OPERATION MODE A |
| 1 | 77.76M → 77.76M → 155.52M → 622.08M | OPERATION MODE B |

TRANSMISSION SIDE FORMAT CONVERSION

| BANDWIDTH | ①→②→③ | OPERATION MODE |
|---|---|---|
| 0 | 155.52M→155.52M→19.44M | OPERATION MODE A |
| 1 | 622.08M→155.52M→77.76M | OPERATION MODE B |
| 1 | 155.52M→155.52M→77.76M | OPERATION MODE C |

RECEPTION SIDE FORMAT CONVERSION

F I G. 45
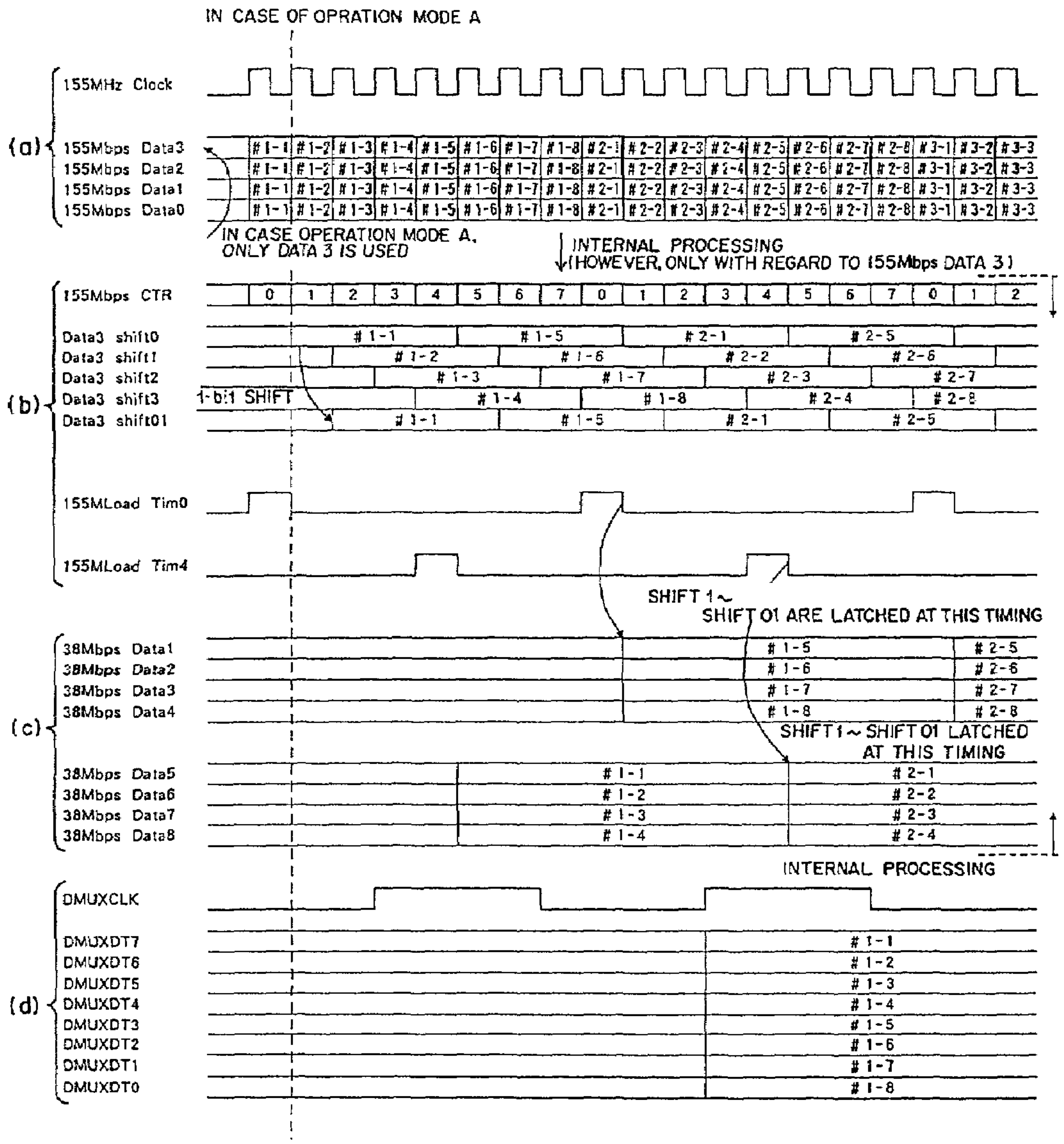

FIG.53

| | 1 | 2 | 3 | 4 | 5 | 6 | 7 | 8 | 9 | ~ | 89 | 90 |
|---|---|---|---|---|---|---|---|---|---|---|---|---|
| 1 | A1 | A2 | C1 | 522 | | | | | | | | 608 |
| 2 | B1 | E1 | F1 | 609 | | | | | | | | 695 |
| 3 | D1 | D2 | D3 | 696 | | | | | | | | 782 |
| 4 | H1 | H2 | H3 | 0 | 1 | 2 | 3 | 4 | 5 | | 85 | 86 |
| 5 | B2 | K1 | K2 | 87 | | | | | | | | 173 |
| 6 | D4 | D5 | D6 | 174 | | | | | | | | 260 |
| 7 | D7 | D8 | D9 | 261 | | | | | | | | 347 |
| 8 | D10 | D11 | D12 | 348 | | | | | | | | 434 |
| 9 | Z1 | Z2 | E2 | 435 | | | | | | | | 521 |

SDH TRANSMISSION APPARATUS AND FRAME TIMING RE-CLOCKING METHOD FOR SDH TRANSMISSION APPARATUS

This is a request for filing a continuation application under 37 CFR 1.53(b) of pending prior international application No. PCT JP99/02825, filed on May 28, 1999 entitled SDH TRANSMISSION APPARATUS AND FRAME TIMING RE-CLOCKING METHOD FOR SDH TRANSMISSION APPARATUS.

TECHNICAL FIELD

This invention relates to an SDH transmission apparatus applicable to new synchronous networks such as an SDH (Synchronous Digital Hierarchy) transmission network and a SONET (Synchronous Optical Network), and a frame timing re-clocking method for an SDH transmission apparatus.

BACKGROUND ART

FIG. 48 is a block diagram showing an example of a configuration of a SONET (SDH transmission network). A SONET 100 shown in FIG. 48 has a multi ring configuration wherein, for example, a 10 G ring 101 which handles a data transmission rate of the OC-192 level (approximately 10 Gbps), and an OC (Optical Carrier)-12 loop ring network 102 which handles a data transmission rate of the OC-12 level (approximately 622 Mbps) and an OC-3 loop ring network 103 which handles a data transmission rate of the OC-3 level (approximately 155 Mbps) are connected to each other through SONET transmission apparatus 111, 112, 121 and 122 which serve as gateways. It is to be noted that the transmission apparatus 121 accommodates also a ring network 104 of a data transmission rate of the DS3 (Digital Signal level 3) or STS-1 level (approximately 51 Mbps).

Therefore, at least the SONET transmission apparatus 111, 112, 121 and 122 which serve as gateways require a function of supporting processing for a plurality of signals of different data transmission rates, a cross connect (TSA: Time Slot Assignment) function and so forth. If attention is paid, for example, to the SONET transmission apparatus 121 (which may be hereinafter referred to merely as "transmission apparatus"), it is necessary that it can perform signal processing of the different levels including the OC-12, OC-3, DS-3 and STS-1 levels and that it can cross connect receive signals to desired ones of the ring networks 100 to 104.

In order to support such functions as described above, the transmission apparatus 121 includes, if attention is paid to a configuration of essential part of the same, for example, as shown in FIG. 49, a suitable number of higher level group interface units 201 ready for the OC-12/OC-3 levels and a suitable number of lower level group interface units 202 ready for the DS3/STS-1 levels individually corresponding to the numbers of transmission/reception destinations, and an STS cross connect unit 203 which accommodates the interface units (hereinafter referred to as IF boards) 201 and 202 and performs cross connect processing in a unit of a channel (here, STS-1). It is to be noted that reference numeral 204 denotes a synchronization card (SYNC) for supplying an intra-apparatus (unit) reference clock to the units 201 to 203.

Each of the IF boards 201 and 202 includes a channel (CH) interface section 210 which in turn includes a demultiplex processing section (DMUX) 211, a P/S (parallel/ serial) conversion circuit 212, an S/P (serial/parallel) conversion circuit 213, a PLL circuit 214 and a multiplex processing section (MUX) 215. The STS cross connect unit 203 includes an STS-TSA section 230 which in turn includes an S/P conversion circuit 231, a pointer processing circuit 232, a cross connect section 233, a PLL circuit 234 and a P/S conversion circuit 235.

It is to be noted that, although not shown for simplified illustration in FIG. 49, the STS-TSA section 230 actually includes a number of S/P conversion circuits 231, pointer processing circuits 232, P/S conversion circuits, PLL circuits 234 and P/S conversion circuits 235 equal to the number of the accommodated IF boards 201 and 202 in order to perform signal processing for each of the IF boards 201 and 202.

In each of the IF boards 201 and 202, the DMUX 211 demultiplexes (extracts) a main signal (frame) in frame synchronism with a receive signal, and the demultiplexed main signal is outputted to the P/S conversion circuit 212 together with a frame pulse (FP) representative of the top position of the main signal and a clock signal (CK). It is to be noted that the DMUX 211 additionally has such a pointer processing function well-known in the art as hereinafter described.

The P/S conversion circuit 212 performs S/P conversion of the main signal from the DMUX 211 in accordance with the frame pulse and the clock described above in order to pass the main signal at a high rate to the STS cross connect unit 203. The main signal after the S/P conversion is outputted as N (N is an integer equal to or greater than 2) parallel data to the STS cross connect unit 203 together with the frame pulse and the clock described above through a back plane interface 205.

The S/P conversion circuit 213 performs S/P conversion of the main signal (N parallel data) after the cross connect processing transferred thereto at a high rate from the STS cross connect unit 203 through the back plane interface 205 in accordance with the frame pulse representative of the top position of the main signal and the clock in order to process the main signal at a low rate. The PLL circuit 214 produces an intra-unit reference master clock synchronized with the intra-unit reference clock signal supplied thereto from the synchronization card 204.

The MUX 215 performs pointer processing and processing (MUX processing) such as insertion of an overhead and so forth for the main signal from the S/P conversion circuit 213 described above in accordance with the intra-unit reference master clock supplied thereto from the PLL circuit 214 to produce a predetermined signal (frame) of the OC-12/OC-3 or the DS3/STS-1 and signals the predetermined signal to the network side.

On the other hand, each of the S/P conversion circuits 231 in the STS-TSA section 230 performs S/P conversion of the main signal sent thereto at a high rate from a corresponding one of the IF boards 201 or 202 through the back plane interface 205 in accordance with the frame pulse and the clock sent thereto together with the main signal in order to process the main signal at a low rate. The pointer processing circuit 232 performs well-known pointer processing such as NDF (New Data Flag) enable detection and pointer value detection for the main signal after the S/P conversion by the S/P conversion circuit 231 in accordance with the intra-unit reference master clock supplied thereto from the PLL circuit 234 to absorb any displacement of the frame top position of the main signal from the corresponding one of the IF boards 201 or 202 so that such frame top positions are adjusted to one another.

The cross connect section 233 performs TSA in a unit of a channel (STS-1) for the main signals, whose frame top positions have been adjusted by the pointer processing circuits 232 in this manner, in accordance with the intra-unit reference master clock supplied thereto from the PLL circuit 234 to perform cross connection in a unit of channel of the receive signals. It is to be noted that setting of the cross connect (including through-setting) is performed from the outside by a system CPU (microcomputer) not shown or the like.

The PLL circuit 234 is similar to the PLL circuit 214 of the IF boards 201 and 202 and produces the intra-unit reference master clock described above synchronized with the intra-unit reference clock supplied thereto from the synchronization card 204. The P/S conversion circuit 235 performs P/S conversion of a main signal after the cross connect by the cross connect section 233 in accordance with the frame pulse representative of the top position of the main signal and the clock in order to transmit the main signal at a high rate to the pertaining IF board 201 or 202.

Operation of the SONET transmission apparatus 121 having such a configuration as described above is described below taking operation in a case wherein a signal (OC-12) on a network on the higher level group side (for example, the OC-12 loop ring network 102) accommodated in an IF board 201 is cross connected (dropped) to a network (for example, the ring network 104) of the lower level group (tributary) side accommodated in an IF board 202 as an example.

First, after a signal transmitted over the OC-12 loop ring network 102 is taken into an IF board 201, the DMUX 211 in the IF board 201 demultiplexes a main signal from the receive signal, and the P/S conversion circuit 212 performs P/S conversion of the main signal, whereafter the main signal, a frame pulse and a clock are outputted to the STS cross connect unit 203 through the back plane interface 205.

In the STS cross connect unit 203 (STS-TSA section 230), the main signal from the IF boards 201 is S/P converted by the S/P conversion circuit 231 and then inputted to the pointer processing circuit 232.

The pointer processing circuit 232 performs pointer processing for the main signal inputted thereto in accordance with an intra-unit reference master clock to adjust the frame top position of the main signal to the frame top positions of main signals from the other IF boards 201 or 202.

Consequently, the main signals from the IF boards 201 or 202 are inputted to the cross connect section 233 in such a condition that the frame top positions thereof are adjusted to one another (in a synchronized state). Then, the cross connect section 233 performs cross connect processing of the main signals with the frame top positions adjusted to one another in this manner in accordance with the intra-unit reference master clock and the cross connect setting set in advance.

More particularly, in this instance, TSA is performed so that the main signal received from the OC-12 loop ring network 102 may be outputted as a main signal to the ring network 104 to the pertaining P/S conversion circuit 235 (IF board 202).

The main signal after the cross connect is P/S converted by the pertaining P/S conversion circuit 235 and then outputted to the pertaining IF board 202 (which accommodates the ring network 104) through the back plane interface 205. In the IF board 202, the main signal is S/P converted by the S/P conversion circuit 213 and undergoes MUX processing by the MUX 215, whereafter it is signaled as a signal of the DS3 or STS-1 level to the ring network 104.

It is to be noted that, also when a main signal transmitted on the ring network 104 is to be cross connected to the OC-12 loop ring network 102 conversely to that described above or when different cross connection to that described above is to be performed, basically similar processing is performed although the IF boards 201 and 202 through which the main signal passes are different.

Now, the pointer processing circuit 232 described above is described in more detail.

FIG. 50 is a block diagram showing an example of a detailed configuration of the pointer processing circuit 232. The pointer processing circuit 232 shown in FIG. 50 includes a pointer value reception section 241, a J1 pulse production section 242, a memory section 243, a stuff control section 244, a pointer value calculation section 245, a pointer value insertion section 246, an NDF production section 247 and so forth.

The pointer value reception section 241 receives (detects), from within a receive signal (refer to FIG. 51: it is to be noted that the signal format shown in FIG. 51 indicates an STS-1 frame, and the signal format of the OC-12, the OC-3 or the like corresponds to a signal obtained by byte-multiplexing of 12 or 3 such STS-1 frames), a pointer value of lower order 10 bits of pointer bytes (H1 and H2 bytes: refer to FIG. 52) which are positioned in the fourth row of an overhead part 301.

The J1 pulse production section 242 recognizes a J1 byte position which is the top position of the main signal based on the pointer value detected by the pointer value reception section 241 and produces a J1 pulse (frame timing pulse of the main signal) at the timing of the position of the J1 byte. The memory section 243 temporarily stores the J1 pulse produced by the J1 pulse production section 242 and the receive data (main signal).

More particularly, the J1 pulse and the main signal described above are written into the memory section 243 in synchronism with a receive clock from the IF board 201 (202) and read out from the memory section 243 in synchronism with a transmission clock (the intra-unit reference master clock) under the stuff (INC/DEC) control of the stuff control section 244. Consequently, clock (timing) re-clocking processing of the receive data to the transmission clock (transmission frame timing) is performed.

The pointer value calculation section 245 supervises to detect which one of SPE (Synchronous Payload Envelope) addresses (refer to FIG. 53) as counted up to "782" from "0" where the position of the next byte to the H3 byte (stuff byte) is set as "0" coincides with the timing of the J1 pulse to determine a transmission pointer value. The pointer value insertion section 246 inserts the transmission pointer value determined by the pointer value calculation section 245 as a new pointer value into the transmission data (main signal) read out from the memory section 243.

The NDF production section 247 produces NDF bits (refer to FIG. 52) which are higher order 4 bits of the H1 byte described above and represent whether or not the pointer value exhibits a change. More particularly, in a normal state wherein normal data communication is proceeding, the NDF production section 247 produces a normal NDF value of "0110", but if the pointer value exhibits a change because of connection of power supply, occurrence of a circuit fault [occurrence (detection) of an AIS (Alarm Indication Signal), detection of interruption of the clock or the like], release after occurrence of a memory slip or the like, then the NDF production section 247 produces an NDF enable of "1001".

However, the NDF enable above is not produced (that is, invalidated) upon change of the pointer value when stuff control by the stuff control section 244 is performed. Further, the produced NDF bits are inserted into the transmission data by the pointer value insertion section 246.

In the pointer processing circuit 232 having the configuration described above, the J1 byte position which is the top position of the main signal is recognized by the pointer value reception section 241 based on the pointer value indicated by the pointer byte of the receive data, and a J1 pulse is produced by the J1 pulse production section 242 at the timing of the J1 byte position.

The receive data and the J1 pulse are written once into the memory section 243 in synchronism with a reception clock and then read out from the memory section 243 in synchronism with the transmission clock. At this time, if necessary, stuff control by the stuff control section 244 is performed. Then, the transmission pointer value is determined by the pointer value calculation section 245 from the timing of the J1 pulse thus read out, and the pointer value is inserted into the transmission data read out from the memory section 243 by 246. At this time, also the NDF bits produced by the NDF production section 247 are inserted.

Such processing as described above is executed for reception data from the IF boards 201 or 202 individually by the respective pointer processing circuits 232 to absorb displacements (bit delays) of the top positions of the receive data from the IF boards 201 or 202 caused by a difference in transmission path (used network), a processing delay by the IF board 201 or 202, a difference in physical distance (wiring line distance) between the IF board 201 or 202 and the STS cross connect unit 203 and other factors so that the frame timings of all of the receive data are brought into coincidence with one another thereby to allow cross connect processing by the cross connect section 233.

In this manner, in the SONET 100 or SDH transmission network, pointer processing is a technique used to re-clock (convert) the frame timing and the clock of data on a transmission line (network) (on the reception side) into a frame timing and a clock in the unit (transmission side) while suppressing a bit delay of receive data to the minimum.

It is to be noted that such pointer processing as described above is performed also by the DMUX 211 or the MUX 215 in the IF boards 201 and 202 in the transmission apparatus 121 shown in FIG. 49. This is intended to cause each of the IF boards 201 and 202 to absorb a displacement of the top position of the individual receive data which is caused by a difference in used network to some degree.

However, such a transmission apparatus 121 as described above is obliged to have a very great apparatus scale because a number of pointer processing circuits 232 corresponding to the number of IF boards 201 and 202 accommodated in the transmission apparatus 121 (the number corresponding to the number of channels to be processed) are required in order to perform timing re-clocking of receive data (main signal frames) from the IF boards 201 or 202.

Particularly, in order to allow a transmission apparatus (for example, 111) which can cope with a very high rate transmission network higher than the OC-192 level (approximately 10 Gbps) described above to cope various network schemes (applications) which handle the OC-12, OC-3, DS3, STS-1 and so forth, it is necessary to increase the number of IF boards (number of channels to be processed) which can be accommodated in the STS cross connect unit 203, and also additional pointer processing circuits 232 must be provided accordingly. This further increases the apparatus scale, and it is very difficult to implement such a transmission apparatus as described above using the LSI technique at present in terms of the mounting area and so forth.

Further, the transmission apparatus 121 described above has, since displacements of the frame top positions of main signals which are caused by a difference in processing delay by the IF boards 201 and 202 and physical distance (wiring line distance) to the IF boards 201 and 202 are absorbed by the pointer processing circuit 232, as shown in FIG. 49, a structure wherein each of the IF boards 201 and 202 may operate in accordance with an intra-unit reference master clock generated uniquely by its PLL circuit 214 based on the intra-unit reference clock, that is, may operate not in synchronism with the STS cross connect unit 203.

However, if the number of accommodated IF boards is increased in the structure just described, then displacements of the frame top positions of the main signals to the STS cross connect unit 203 appear further separately among the IF boards 201 and 202, resulting in increase of the fluctuation amounts (dispersion) of the "displacements" of the main signals.

Therefore, the memory section 243 of each of the STS-TSA sections 230 must have a memory capacity sufficient to absorb all of the "displacements" appearing separately among the IF boards 201 and 202 in this manner. Accordingly, the "timing re-clocking" which uses the pointer processing technique has a limitation to increase of the number of channels to be processed.

The present invention has been made in view of such a subject as described above, and it is an object of the present invention to provide an SDH transmission apparatus and a frame timing re-clocking method for an SDH transmission apparatus by which timing re-clocking of a main signal frame can be performed without using the pointer processing technique and increase of the apparatus scale can be suppressed to the minimum even if the number of channels to be processed increases.

DISCLOSURE OF INVENTION

In order to attain the object, according to the present invention, an SDH transmission apparatus is characterized in that it comprises a plurality of interface units (hereinafter referred to as IF boards) for accommodating main signal frames (hereinafter referred to merely as main signals) including channel data of a plurality of channels and compliant with an SDH transmission system, and a main signal processing unit accommodating the IF boards for performing predetermined main signal processing for the main signals, that the main signal processing unit includes a frame timing production section for producing an intra-apparatus reference frame timing (FT) based on an intra-apparatus reference clock (reference RCK), a frame timing distribution section for distributing the intra-apparatus reference FT produced by the frame timing production section to the IF boards, and a main signal timing re-clocking section for synchronizing frame timings of the main signals with the intra-frame reference FT using a memory section for temporarily storing the main signals, and that each of the IF boards includes a main signal signaling processing section for performing signaling processing of a main signal to the main signal processing unit based on the intra-apparatus reference FT distributed from the frame timing distribution section of the main signal processing unit.

In the SDH transmission apparatus of the present invention having the configuration described above, the IF boards (main signal signaling processing sections) operate based on the intra-apparatus reference FT (hereinafter referred to merely as "reference FT") distributed from the main signal processing unit to perform signaling of main signals to the main signal processing unit. In short, the IF boards operate subordinately based on the reference FT produced by the frame timing production section of the main signal processing unit.

Consequently, since displacements of the frame top positions of the main signals from the IF boards appear uniformly principally from physical distances (wiring line distances) between the IF boards and the main signal processing unit, the dispersion of the displacements of the frame top positions is suppressed to the minimum.

Accordingly, if a memory capacity sufficient to absorb the dispersion in "displacement" suppressed to the minimum in this manner is provided, then timing re-clocking of the main signals can be performed with the minimum memory capacity without using the pointer processing technique. Consequently, different from an existing apparatus which uses the pointer processing technique for timing re-clock of main signals while IF boards and a main signal processing unit operate independently of one another, the apparatus scale can be suppressed to the minimum even if the number of channels to be processed increases.

The main signal processing unit may includes a cross connect section for performing cross connect processing in a unit of channel data for the main signals from the main signal timing re-clocking section. In this instance, the main signals whose frame top positions are normally adjusted to one another are inputted from the IF boards to the cross connection section. Consequently, the cross connect section can achieve cross connect processing in a unit of channel data readily.

Each of the IF boards may include a frame synchronizing signal application section for applying a frame synchronizing signal to a main signal, and the main signal processing unit may include, for each of the IF boards, a frame synchronizing section for detecting the frame synchronizing signal from the main signal from the IF board to establish synchronism of the main signal.

In the SDH transmission apparatus, it is not necessary to transmit and receive a frame timing for establishing frame synchronism of a main signal between each IF board and the main signal processing unit. Therefore, only it is required to lay a data line for main signal transmission between each IF board and the main signal processing unit, and a wiring line for transmission and reception of a frame timing is unnecessary any more. Accordingly, even if the number of accommodated IF boards increases, the apparatus scale of the transmission apparatus can be suppressed to the minimum.

Each of the IF boards may include a first transmission rate conversion section for converting the rate of a main signal into a predetermined inter-unit transmission rate and transmitting the resulting main signal to the main signal processing unit, and the main signal processing unit may include, for each of the IF boards, a second transmission rate conversion section for converting the rate of a main signal from the first transmission rate conversion section of any of the IF boards into the predetermined intra-apparatus transmission rate.

In the SDH transmission apparatus, each main signal is successively converted into and transmitted as a signal of the fixed inter-unit transmission rate and of the intra-unit transmission rate irrespective of an accommodated network application (transmission rate of the received main signal) of each IF board. Consequently, IF boards for various network applications can be provided without increasing the apparatus scale of the transmission apparatus.

In this instance, the main signal processing unit may include a main PLL circuit for performing PLL processing for the RCK, and a sub PLL circuit provided for each of the second transmission rate conversion sections for performing PLL processing for the reference RCK after the PLL processing by the main PLL circuit and supplying the resulting reference RCK as an operation clock for the second transmission rate conversion section.

In the SDH transmission apparatus, the sub PLL circuit of each of the BPIF sections operates in synchronism with the corresponding main PLL circuit. Therefore, the phase variation and so forth upon transfer rate conversion by the second transmission rate conversion section is suppressed to the minimum, and besides, the memory capacity necessary for the main signal timing re-clocking section is reduced.

The main PLL circuit may include a distribution outputting section for outputting the reference RCK after the PLL processing individually for the sub PLL circuits. In the SDH transmission apparatus, waveform deterioration of the reference RCK to be distributed to each of the sub PLL circuits can be prevented, and each sub PLL circuit can be synchronized with a high degree accuracy with the corresponding main PLL circuit.

Where at least one of the sub PLL circuits produces a master clock (MCK) of an intra-apparatus reference based on the reference RCK, the main signal processing unit may include a frame timing re-clocking section for synchronizing the reference FT with the MCK.

In the SDH transmission apparatus, the master clock re-clocking section of the main signal processing unit produces the reference FT normally synchronized with the MCK. Consequently, the memory capacity necessary for the timing re-clocking processing by the main signal timing re-clocking section can be further reduced.

Where the main signal processing unit has a redundancy configuration including an work main signal processing unit and a protection main signal processing unit, each of the main signal processing units may include a reference clock selection section for selecting a normal one of the reference RCKs of the work and protection main signal processing units. In the SDH transmission apparatus, the main signal processing units normally selects and uses a normal reference RCK free from a fault, and this contributes very much to increase of the reliability in main signal processing.

In this instance, each of the main signal processing units may include a clock selection setting interface section for performing setting for clock selection of the reference clock selection section in accordance with an external clock selection instruction. In the SDH transmission apparatus, it is possible to perform test changeover of the work/protection main signal processing units, compulsory changeover of the work/protection main signal processing units from the outside and so forth. Consequently, the convenience in maintenance and administration of the transmission apparatus can be improved.

Where the main signal processing unit has a redundancy configuration including an work main signal processing unit and a protection main signal processing unit as described above, each of the main signal processing units may mutually transfer intra-unit synchronizing timings based on the reference RCKs to synchronize reference FTs thereof with each other.

In the SDH transmission apparatus, even if changeover of the work/protection main signal processing units is performed, both of the main signal processing units can immediately operate with a normal reference FT. Consequently, the reliability in main signal processing is further increased.

In this instance, at least the frame timing production section of the work main signal processing unit may include a first counter section for performing a predetermined counting operation to produce the inter-unit synchronizing timing, and the frame timing production section of the protection main signal processing unit may include a clock phase protection section for performing clock phase protection for the inter-unit synchronizing timing produced by the first counter section and re-clocking the inter-unit synchronizing timing to a frame timing synchronized with the inter-unit reference frame timing of the work main signal processing unit based on the intra reference clock, a frame phase protection section for performing frame phase protection for the frame timing from the clock phase protection section, and a second counter section for performing a predetermined counting operation based on the frame timing after the frame phase protection by the frame phase protection section to produce an intra-apparatus reference frame timing for the protection main signal processing unit itself.

In the SDH transmission apparatus, the frame timing production section of the protection main signal processing unit absorbs a delay of the inter-unit synchronizing timing from the work main signal processing unit and can prevent load of a wrong inter-unit synchronizing timing by noise or the like. Therefore, the frame timing production section can produce (regenerate) a reference FT synchronized with a high degree of accuracy with the reference FT of the work main signal processing unit. Consequently, operation of the apparatus can be stabilized also upon changeover of the work/protection main signal processing units.

The clock phase protection section may include a first memory section for storing the inter-unit synchronizing timing and reading out the inter-unit synchronizing timing based on the reference RCK to synchronize the inter-unit synchronizing timing with the reference FT, a first frame timing production counter section for performing a predetermined counting operation based on the inter-unit synchronizing timing read out from the first memory section to produce the frame timing synchronized with the reference FT, and a first phase difference correction control section for detecting a phase difference of the inter-unit synchronizing timing before and after the inter-unit synchronizing timing passes the first memory section and performing correction control of the counting operation of the first frame timing production counter section so that the phase difference may be reduced to zero.

In the SDH transmission apparatus, the clock phase protection section can absorb a phase difference of the inter-unit synchronizing timing before and after it passes the first memory section to produce an FT, based on which the reference FT of the protection main signal processing section itself is to be produced (regenerated), normally synchronized with a high degree of accuracy with the reference FT of the work main signal processing unit.

The frame timing re-clocking section may include a second memory section for storing the reference FT produced by the frame timing production section and reading out the reference FT based on the MCK to synchronize the reference FT with the MCK, a second frame timing production counter section for performing a predetermined counting operation based on the reference FT read out from the second memory section to produce the reference FT synchronized with the MCK, and a second phase difference correction control section for detecting a phase difference of the reference FT before and after the reference FT passes the second memory section and performing correction control of the counting operation of the second frame timing production counter section so that the phase difference may be reduced to zero.

In the SDH transmission apparatus, the frame timing re-clocking section can absorb a phase difference of the reference FT before and after it passes the second memory section to produce the reference FT synchronized with a high degree of accuracy with the MCK. Consequently, unstable operation when the apparatus is started or in a like case can be suppressed.

The main signal processing unit may include a first transmission rate conversion setting interface section for performing setting for transmission rate conversion of the first transmission rate conversion section in accordance with an external transmission rate setting. Also each of the IF boards may include a second transmission rate conversion setting interface section for performing setting for transmission rate conversion of the second transmission rate conversion section in accordance with an external transmission rate setting.

In the SDH transmission apparatus, setting for transmission rate conversion of the first transmission rate conversion section or the second transmission rate conversion section can be changed suitably. Consequently, the SDH transmission apparatus can cope with main signals of arbitrary transmission rates and can accommodate IF boards ready for various network schemes.

BRIEF DESCRIPTION OF THE DRAWINGS

FIG. 12 is a block diagram showing a configuration of a frame phase protection section of the MFT circuit shown in FIG. 10;

FIG. 13 is a circuit diagram showing a detailed configuration of a 3-frame protection circuit shown in FIGS. 10 and 12;

FIG. 45 is a time chart illustrating an example of format conversion in an operation mode A;

FIG. 53 is a schematic view illustrating a format wherein an SPE address is applied to the SONET transmission frame illustrated in FIG. 51.

BEST MODE FOR CARRYING OUT THE INVENTION

In the following, an embodiment of the present invention is described with reference to the drawings.

(A) Description of the General Configuration of the SDH Transmission Apparatus

Figure 1:
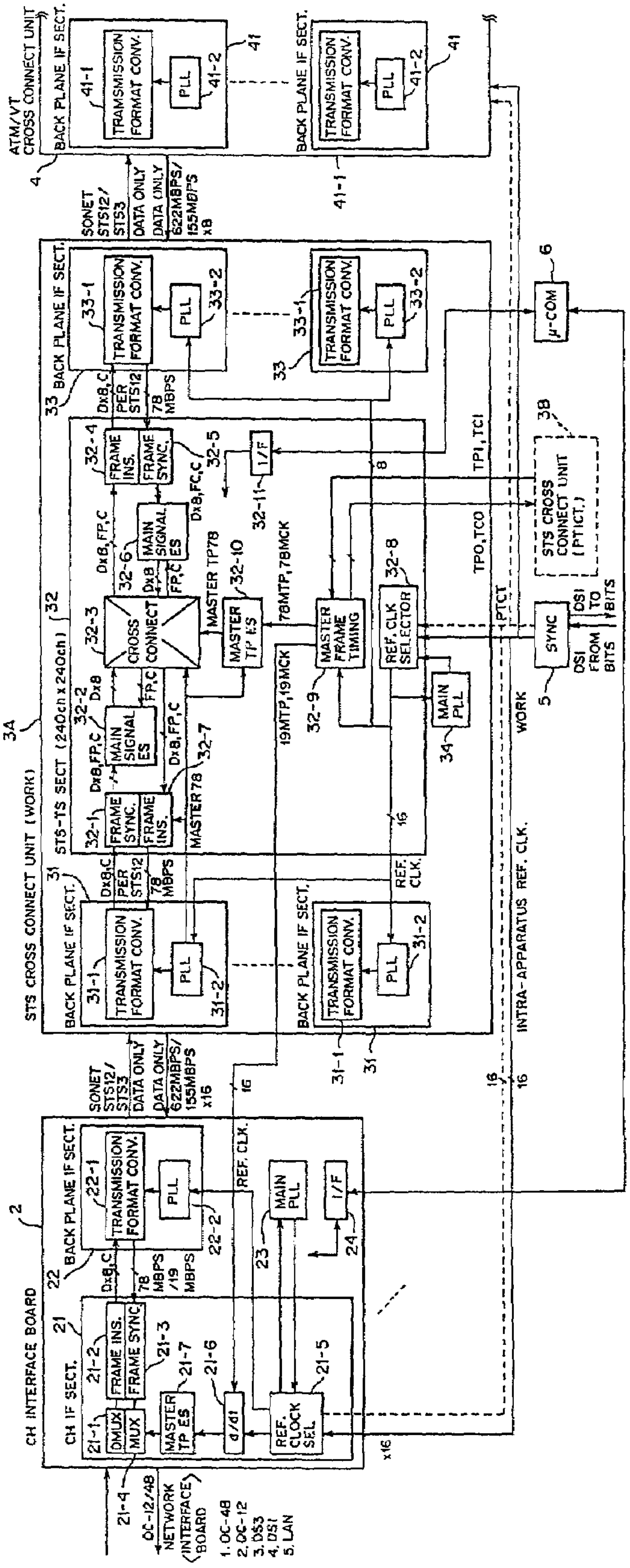
FIG. 1 is a block diagram showing a configuration of a SONET (SDH) transmission apparatus as an embodiment of the present invention.

FIG. 1 is a block diagram showing a configuration of a SONET (SDH) transmission apparatus as an embodiment of the present invention. As shown in FIG. 1, the transmission apparatus 1 of the present embodiment includes a plurality of (here, 16) channel interface units (IF boards) 2, a pair of STS cross connect units 3A and 3B of a redundancy configuration [work (operating)/protection (standby)], an ATM/VT cross connect unit 4, a synchronization card (SYNC) 5, a microcomputer (μ-COM) 6 (hereinafter referred to simply as "microcomputer 6"), and so forth.

The IF boards 2 are provided suitably in accordance with accommodated network applications (transmission frames) such as those for the OC-48, for the OC-12, for the DS3, for the DS1 and for a LAN and interface between accommodated networks and the STS cross connect units 3A (3B).

The STS cross connect unit 3A (work: main signal processing section) accommodates the IF boards 2 and performs, as main signal processing, cross connect processing in a unit of a channel wherein a main signal frame of an STS-1 frame is defined as 1 channel. The STS cross connect unit 3B (protection) functions as an operating unit when the operating STS cross connect unit 3A fails. However, the STS-XC units 3A and 3B may otherwise be used such that both of them function as operating units.

The ATM/VT cross connect unit 4 performs cross connect processing on the ATM cell or VT level accommodated (mapped) in a main signal frame of an STS-1 frame.

In short, in the present transmission apparatus 1, a transmission frame (main signal frame) received by any of the IF board 2 is passed, if it is necessary to perform cross connection of it on the STS-1 level, to the STS cross connect unit 3A (3B), but if it is necessary to perform cross connection on the ATM/VT level lower than the STS-1 level, then the transmission frame is passed to the ATM/VT cross connect unit 4.

The synchronization card 5 produces a 38 MHz reference clock (RCK: work/protection) in the transmission apparatus 1 for allowing the units 2, 3A (3B) and 4 described above to operate in synchronism with one another. The microcomputer 6 is provided for generally managing operation of the transmission apparatus 1 and can perform various settings (cross connect setting, transmission format conversion setting and so forth) in accordance with a maintenance command inputted by a maintenance engineer, collection and reporting of alarm information in the apparatus and so forth.

As shown in FIG. 1, each of the IF boards 2 includes a channel CH interface section 21, a back plane interface (BPIF) section 22, a main PLL (Phase Locked Loop) circuit 23, a microcomputer interface (I/F) section 24 and so forth.

The CH interface section 21 basically performs a process of converting (demultiplexing) a receive main signal (OC-12/48 or the like) from an accommodated network into a signal of a form in which the signal can be processed readily at a low rate and signaling the resulting signal to the STS cross connect unit 3A (3B). Further, the CH interface section 21 multiplexes a main signal from the STS cross connect unit 3A (3B) with a transmission main signal (OC-12/48 or the like) to an accommodated network and transmits the resulting signal to the accommodated network.

It is to be noted, however, that, in the present embodiment, the CH interface section 21 operates based on a master timing (19 MTP) of 8 kHz [19 Mbps (strictly, 19.44 Mbps) width] and a master clock (19 MCK) of 19 MHz distributed from the STS cross connector unit 3A (3B) as hereinafter described.

In short, the CH interface section 21 in the present embodiment functions as a main signal signaling processing section which performs signaling processing of a main signal to the STS cross connect unit (hereinafter referred to as STS-XC unit) 3A (3B) based on the 19 MTP and the 19 MCK distributed from the STS cross connect unit 3A (3B).

To this end, the CH interface section 21 includes a demultiplexing processing section (DMUX) 21-1 and a frame insertion section (Frame Ins.) 21-2 as a reception system, and a frame synchronizing section 21-3 and a multiplexing processing section (MUX) 21-4 as a transmission system. The CH interface section 21 further includes a reference clock (RCK) selector circuit 21-5, a differentiation circuit 21-6 and a master timing pulse (MTP) ES (Elastic Store) circuit 21-7.

The DMUX 21-1 demultiplexes (parallelizes) a receive main signal (for example, OC-12/48 serial data) from an accommodated network into a signal of a form in which the signal can be processed at a low rate. Here, the DMUX 21-1 performs also pointer processing similar to that in the prior art so that a displacement of the frame top position of the receive main signal is absorbed to some degree.

The frame insertion section (frame synchronizing signal application section) 21-2 applies (exchanges) a frame synchronizing signal (A1 and A2 bytes) to a main signal from the DMUX 21-1 because, when the frame top position is changed by the pointer processing described above by the DMUX 21-1, it is necessary to indicate the new frame top position.

In the present embodiment, the main signal whose A1 and A2 bytes have been exchanged in this manner is transmitted as it is to the STS-XC unit 3A (3B) through the BPIF section 22, and detection of the A1 and A2 bytes is performed by a frame synchronizing section 32-1 of an STS-TSI (Time Slot Interchange) section 32, which is hereinafter described, to establish frame synchronism of the main signal.

In short, a main signal is transmitted between any of the IF boards 2 and the STS-XC unit 3A (3B) (back plane) while it remains having the SONET transmission format (STS-3/12), and it is not necessary to transmit and receive a frame timing pulse for establishment of the frame synchronism together with the main signal as in the prior art (a wiring line for a frame timing pulse is not required any more). Accordingly, the restriction in regard to the layout is moderated, and a greater number of IF boards 2 can be accommodated while the apparatus scale of the transmission apparatus 1 is suppressed to the minimum.

The frame synchronizing section 21-3 establishes frame synchronism (detection of the A1 and A2 bytes) of a transmission main signal to an accommodated network after cross connection processing by the STS-XC unit 3A (3B) or the ATM/VT cross connect unit 4. The MUX 21-4 converts (multiplexes) the transmission main signals, whose frame synchronism has been established by the frame synchronizing section 21-3, into a signal of a transmission format (for example, OC-12/48 serial data) to an accommodated network and signals the resulting signal to the accommodated network.

The RCK selector circuit 21-5 selects a faultless (normal) reference RCK from between the work/protection reference RCKs of 38 MHz from the synchronization card 5, and the main PLL circuit 23 is formed which performs phase comparison between the reference RCK selected by the RCK selector circuit 21-5 and an output clock of a voltage controlled oscillator (VCXO: not shown) of 78 MHz to produce a 78 MHz reference RCK which is used as an intra-apparatus reference.

It is to be noted that, in the present embodiment, setting regarding such selection of a reference RCK as described above can be performed from the microcomputer 6 through the microcomputer I/F section 24 to perform a changeover test between the work/protection systems.

The differentiation circuit 21-6 uses the 78 MHz reference RCK obtained by the PLL processing by the main PLL circuit 23 to differentiate (edge detection) of the 19 MTP described above distributed from the STS-XC unit 3A (3B) with the 38 MHz reference RCK selected by the RCK selector circuit 21-5. The MTPES circuit 21-7 supplies an output of the differentiation circuit 21-6 to the DMUX 21-1 and the MUX 21-4 in synchronism with (with a re-clock to) an operation timing of the BPIF section 22 (which is produced based on the reference RCK of 78 MHz described above by a PLL circuit 22-2 which is herein after described).

The BPIF section 22 described above interfaces main signal transmission [inter-unit (back plane) transmission] between the IF board 2 and the STS-XC unit 3A (3B). For the back plane transmission, transmission with a SONET transmission format [STS-3/12 (155 Mbps/622 Mbps)] in accordance with an accommodated network application (OC-12/48 or the like) as described above is adopted.

To this end, the BPIF section 22 includes a transmission format conversion circuit 22-1 and a PLL circuit 22-2.

The PLL circuit 22-2 produces an operation clock (78 MHz/19 MHz) for the transmission format conversion circuit 22-1 based on the reference RCK of 78 MHz selected by the RCK selector circuit 21-5 and produced by the main PLL circuit 23. In short, the PLL circuit 22-2 operates normally in synchronism with the main PLL circuit 23. It is to be noted that the operation clock described above is used also as a timing re-clocking clock by the MTPES circuit 21-7 as described above.

The transmission format conversion circuit (first transmission rate conversion section) 22-1 converts the format (rate) of a receive main signal from the CH interface section 21 into the inter-unit transmission formation (STS-3/12) described herein above and transmits the resulting main signal to the STS-XC unit 3A (3B). Further, the transmission format conversion circuit 22-1 converts a transmission main signal transmitted thereto in the inter-unit transmission format (STS-3/12) from the STS-XC unit 3A (3B) into a signal of 19 Mbps/78 Mbps which is the operating rate of the CH interface section 21 and transmits the resulting signal to the CH interface section 21.

Since the BPIF section 22 having such a configuration as described above is provided, a main signal is back plane transmitted at the fixed transmission rate of STS-3/12 irrespective of the accommodate network application (transmission rate of an accommodated main signal). Therefore, IF boards 2 for various network applications can be provided without increasing the apparatus scale of the STS-XC unit 3A (3B) and hence of the transmission apparatus 1. It is to be noted that setting for the transmission rate conversion described above [operation mode setting: details are hereinafter described in item (F)] is performed by the microcomputer 6 through the microcomputer I/F section 24.

The microcomputer I/F section 24 includes registers (hereinafter referred to as microcomputer registers) not shown for storing information regarding the mode setting described above for the transmission format conversion circuit 22-1 from the microcomputer 6, work/protection system changeover controls for the RCK selector circuit 21-5, alarming in the IF board 2 to be reported to the microcomputer 6 and so forth, and performs various settings for the IF board 2, alarm reporting to the microcomputer 6 and so forth through the microcomputer registers.

In short, the microcomputer I/F section 24 functions as a first transmission rate conversion setting interface section for performing setting for transmission rate conversion to the transmission format conversion circuit 22-1 in accordance with transmission rate setting from the microcomputer 6.

The STS-XC unit 3A (3B) includes, as shown in FIG. 1, a back plane interface (BPIF) section 31 provided corresponding to each of the IF boards 2, an STS-TSI section 32, a plurality of (here, 8) BPIF sections 33, and a main PLL circuit 34.

Each of the BPIF sections 31 is an interface for transferring a main signal in the inter-unit transmission format described above to and from the BPIF section 22 of a corresponding one of the IF boards 2 and transferring a main signal in an intra-unit transmission format of 78 Mbps to and from the STS-TSI section 32.

To this end, also each of the BPIF sections 31 includes a transmission format conversion circuit 31-1 and a PLL circuit 31-2. The transmission formation conversion circuit (second transmission rate conversion section) 31-1 converts a receive main signal from the transmission format conversion circuit 22-1 of a corresponding one of the IF boards 2 into a signal of the intra-unit transmission rate of 78 Mbps described hereinabove and outputs the resulting signal to the STS-TSI section 32. Further, the transmission format conversion circuit 31-1 converts a transmission main signal of 78 Mbps from the STS-TSI section 32 into a signal of the inter-unit transmission rate (155 Mbps/622 Mbps) and outputs the resulting signal to the corresponding IF board 2.

It is to be noted that the setting (operation mode setting) of the transmission rate conversion by a microcomputer I/F section 32-11 is performed by the microcomputer 6 through a microcomputer I/F section 32-11. Details of the operation mode setting are hereinafter described in item (F).

The PLL circuit (sub PLL circuit) 31-2 produces an operation clock (622 MHz) for the transmission format conversion circuit 31-1. In the present embodiment, the PLL circuit 31-2 PLL processes a 78 MHz reference RCK (OREF78M) distributed by a reference clock (RCK) selector circuit 32-8 which is hereinafter described and PLL processed once by the main PLL circuit 34. Consequently, each PLL circuit 31-2 (BPIF section 31) operates normally in synchronism with a high degree of accuracy with the main PLL circuit 34, that is, the STS-TSI section 32.

It is to be noted that, in the present embodiment, the PLL circuit 31-2 of that one of the BPIF sections 31 which is positioned in the highest stage as seen in FIG. 1 produces a master clock (Master 78) of a period of 8 kHz (78 Mbps width) of an intra-apparatus reference based on the 78 MHz reference RCK distributed thereto from the RCK selector circuit 32-8 as described hereinabove, and the frame synchronizing section 32-1 and a cross connect section 32-3 of the STS-TSI section 32 operate in accordance with the master clock.

It is to be noted that the master clock (Master 78) need not necessarily be produced by the PLL circuit 31-2 of the BPIF section 31 positioned in the highest stage, but only it is required that at least it is produced by one of the PLL circuits 31-2 of the BPIF section 31.

The STS-TSI section 32 performs TSI in a unit of a channel (STS-1) in a condition wherein the frame top positions of receive main signals from the IF boards 2 are adjusted to one another. In the present embodiment, as seen in FIG. 1, the STS-TSI section 32 includes, for each BPIF section 31 (IF board 2), a frame synchronizing section (for reception) 32-1, a main signal ES circuit (for reception) 32-2, a frame insertion section (for reception) 32-4, a frame synchronizing section 32-5 (for transmission), a main signal ES circuit (for transmission) 32-6, and a frame insertion section (for transmission) 32-7. Further, the STS-TSI section 32 includes, commonly to the BPIF sections 31 (IF boards 2), a cross connect section 32-3, an RCK selector circuit 32-8, a master frame timing (MFT) circuit 32-9, a master timing pulse (MTP) ES circuit 32-10, and a microcomputer interface (I/F) section 32-11.

The RCK selector circuit 32-8 is similar to the RCK selector circuit 32-8 of the IF boards 2 and selects that one of the reference RCKs of 38 MHz of the work/protection systems from the synchronization card 5 which is free from a fault and is normal. Also in the STS-TSI section 32, a main PLL circuit 34 is formed which performs phase comparison between the selected reference RCK of 38 MHz and an output of a voltage controlled oscillator 78 MHz voltage controlled oscillator VCXO 34-1 (hereinafter described with reference to FIG. 2) to produce a reference RCK of 78 MHz. Consequently, selection (production) of a usually normal reference RCK of 78 MHz is realized.

In short, the RCK selector circuit 32-8 functions as a reference clock selection section for selecting a normal one of the reference RCKs of the work/protection systems.

It is to be noted that the reference RCK of 78 MHz produced (selected) in this manner is distributed to the BPIF section 31 (PLL circuit 31-2), MFT circuit 32-9, and BPIF section 33 (a PLL circuit 33-2). Also to the RCK selector circuit 32-8, setting regarding selection of a reference RCK can be performed from the microcomputer 6 through the microcomputer I/F section 32-11 to perform a changeover test between the work/protection systems.

The MFT circuit (frame timing production section) 32-9 produces an 8 kHz frame timing of an intra-apparatus reference based on the reference RCK of 78 MHz selected by the RCK selector circuit 32-8. More particularly, the MFT circuit 32-9 produces a frame timing pulse (78 MTP) of 8 kHz (78 Mbps width) on which a master frame timing pulse (Master tp 78) of 8 kHz (78 Mbps width) of an intra-apparatus reference is to be based and a 19 MTP (19 MCK) to be distributed to the IF boards 2 (CH interface sections 21) described hereinabove.

In short, the MFT circuit 32-9 functions also as a frame timing distribution section for distributing the produced 8 kHz frame timings (19 MTP and 19 MCK) of an intra-frame reference to the IF boards 2.

It is to be noted that the MFT circuit 32-9 transfers intra-unit synchronizing timings [8 kHz (19 Mbps width) timing pulse (Tp) and 38 Mbps clock (Tc)] based on the reference RCK of 78 MHz described hereinabove to and from the STS-XC unit of the protection system to synchronize 8 kHz frame timings (78 MTP and 19 MTP) of intra-apparatus references of the STS-XC units 3A and 8B with one another as hereinafter described in detail.

The MTPES circuit (frame timing re-clocking section) 32-10 re-clocks the frame timing pulse (78 MTP) of 8 kHz (78 Mbps width) produced by the MFT circuit 32-9 with the 78 MHz master clock (Master 78) of an intra-apparatus reference produced by the PLL circuit 31-2 which is an operation clock of the BPIF section 31 positioned in the highest stage in FIG. 1 to establish synchronism to produce an 8 kHz master frame timing pulse (Master TP 78) of an intra-apparatus reference described above.

The "Master TP 78" is supplied as an operation timing for the cross connect section 32-3 and hence as a readout timing common to the main signal ES circuits 32-2. Consequently, each of the main signal ES circuit (main signal timing re-clocking sections) 32-2 performs timing re-clocking of a main signal to the "Master TP 78" (intra-apparatus reference 8 kHz frame timing) to absorb displacements of the frame top positions of the main signals from the IF boards 2.

It is to be noted that also the microcomputer I/F section 32-11 includes microcomputer registers not shown for storing information regarding the mode setting to the transmission format conversion circuit 22-1 from the microcomputer 6, changeover control between the work/protection systems by the RCK selector circuit 32-8, an alarm in any of the IF boards 2 to be reported to the microcomputer 6 and so forth. The microcomputer I/F section 32-11 performs various settings for the STS-XC unit 3A (3B), reporting of an alarm to the microcomputer 6 and so forth through the microcomputer registers.

In short, the microcomputer I/F section 32-11 functions not only as a clock selection setting interface section for performing setting for clock selection of the RCK selector circuit 32-9 in accordance with a clock selection instruction from the outside (microcomputer 6) but also as a second transmission rate conversion setting interface for performing setting (operation mode setting) for transmission rate conversion of the transmission format conversion circuit 31-1 in accordance with a transmission rate setting from the microcomputer 6.

The frame synchronizing section (for reception) 32-1 performs detection of the A1 and A2 bytes (a frame synchronizing signal) from a main signal (78 Mbps) from the transmission format conversion circuit 31-1 of a corresponding one of the BPIF sections 31 to establish frame synchronism of the main signal. The cross connect section 32-3 performs cross connection in a unit of a channel (STS-1) for each of main signals, whose frame top positions have been adjusted to one another, from the main signal ES circuits 32-2 in accordance with a setting from the microcomputer 6 through the microcomputer I/F section 32-11.

The frame insertion section (for reception) 32-4 performs insertion (exchange) of a frame synchronizing signal (the A1 and A2 bytes) into a main signal outputted from the cross connect section 32-3 for which it is necessary to perform cross connection of the ATM/VT level. The main signal after the exchange of the A1 and A2 bytes is transmitted to a pertaining one of BPIF sections 41 of the ATM/VT cross connect unit 4 through the pertaining BPIF section 33.

Each of the BPIF sections 33 is similar to the BPIF section 22 of the IF boards 2 and includes a transmission format conversion section 33-1 similar to the transmission format conversion circuit 22-1 and a PLL circuit 33-2 similar to the PLL circuit 22-2. The BPIF sections 41 are provided corresponding to the BPIF sections 33, and each of the BPIF sections 41 is similar to the BPIF section 31 and includes a transmission format conversion circuit 41-1 similar to the transmission format conversion circuit 31-1 and a PLL circuit 41-2 similar to the PLL circuit 31-2.

In short, also in regard to back plane transmission between the STS-XC unit 3A (3B) and the ATM/VT cross connect unit 4, the transmission apparatus 1 performs transmission with the SONET transmission format (STS-3/12) similarly as in back plane transmission between the IF board 2s and the STS-XC unit 3A (3B).

Each of the frame synchronizing sections (for transmission) 32-5 establishes frame synchronism (detection of the A1 and A2 bytes) for main signals transmitted back thereto from the ATM/VT cross connect unit 4 after cross connection of the ATM/VT level has been performed for them.

Each of the main signal ES circuits (for transmission) 32-6 re-clocks the timing of a main signal from the frame synchronizing section (for transmission) 32-5 to the 8 kHz master frame timing (Master TP 78) of an intra-apparatus reference to synchronize the main signal similarly to the main signal ES circuit (for reception) 32-2.

Each of the frame insertion sections (for transmission) 32-7 performs exchanging of the A1 and A2 bytes of the main signal from the cross connect section 32-3 because the timing of the main signal has been re-clocked by the main signal ES circuit 32-2 or 32-6.

In the following, an outline of operation of the transmission apparatus 1 of the present embodiment having such a configuration as described above is described. It is assumed here that the STS-XC unit 3A operates as the work system.

First, in the STS-XC unit 3A (3B), 38 MHz reference clocks (for the work and protection systems) are inputted to the RCK selector circuit 32-8. The RCK selector circuit 32-8 supervises the input reference clocks to detect a fault [for example, a LOS (Loss of Signal) and so forth] and selects a normal one of the reference clocks.

Then, the selected reference clock and an output clock of a 78 MHz voltage controlled oscillator VCXO 34-1 which serves as an intra-apparatus reference are compared in phase with each other by the main PLL circuit 34 to produce a 78 MHz RCK of an intra-apparatus reference. The 78 MHz RCK is supplied (distributed) as a reference clock to the PLL circuits 31-2 of 622 MHz of the BPIF sections 31.

Meanwhile, the MFT circuit 32-9 produces 8 kHz frame timings (78 MTP, 78 MCK, 19 MTP, 19 MCK) of an intra-apparatus reference from the 78 MHz RCK produced in such a manner as described above by the RCK selector circuit 32-8 and the main PLL circuit 34, and produces inter-unit synchronizing timings [8 kHz (19 Mbps width) Tp and 38 MHz Tc].

Of the timings mentioned, the 78 MTP and the 78 MCK are supplied to the MTPES circuit 32-10 and the 19 MTP and the 19 MCK are supplied to the IF boards 2 (CH interface sections 21) while the 8 kHz (19 Mbps width) Tp and the 38 MHz Tc are outputted to the MFT circuit 32-9 of the other STS-XC unit 3B (STS-XC unit 3A).

In short, the inter-unit synchronizing timings [8 kHz (19 Mbps width) Tp and 38 MHz Tc] are transferred between the STS-XC units 3A and 3B. Consequently, synchronism of the 8 kHz frame timings of intra-frame references produced by the STS-XC units 3A and 3B (details are hereinafter described) can be established. As a result, the STS-XC unit 3B of the protection system is placed in a protection state in which it can start its operation as the work system at any time.

Meanwhile, each of the IF boards 2 (CH interface sections 21) having received the 19 MTP and the 19 MCK described above operates based on the 19 MTP and the 19 MCK to perform a process of signaling a main signal received from an accommodated network to the STS-XC unit 3A.

In particular, for demultiplexing processing and pointer processing by the DMUX 21-1, insertion processing of the A1 and A2 bytes by the frame insertion section 21 and so forth, a signal obtained by differentiating the 19 MTP distributed from the STS-XC unit 3A (3B) using the 78 MHz reference RCK PLL-processed by the main PLL circuit 23 with the 38 MHz reference RCK selected by the RCK selector circuit 21-5 and synchronizing the resulting signal with the operation clock of the BPIF section 22 by the MTPES circuit 21-7 is used.

Then, the main signal into which the A1 and A2 bytes have been inserted by the frame insertion section 21 is converted into a signal of the inter-unit transmission format (STS-3/12) by the transmission format conversion circuit 22-1 of the BPIF section 22 and back plane transmitted to the STS-XC unit 3A.

In short, in the present transmission apparatus 1, each of the IF boards 2 operates subordinately to the STS-XC unit 3A (3B) based on the 8 kHz frame timings (19 MTP and 19 MCK) of an intra-apparatus reference distributed thereto from the STS-XC unit 3A (3B). Further, the BPIF sections 31 have the same configuration, and besides, all of the PLL circuits 31-2 for producing operation clocks for the BPIF sections 31 operate in synchronism with the main PLL circuit 34. In short, the present transmission apparatus 1 is so structured that the phase variation of reference frame timings of 8 kHz distributed in the apparatus including the IF boards 2 can be suppressed to the minimum.

Consequently, displacements (bit delays) of the frame top positions of main signals which come from the IF boards 2 to the main signal ES circuits 32-2 of the STS-XC unit 3A (3B) appear uniformly originating principally from a difference in physical distance (wiring line distance) between the IF boards 2 and the STS-XC unit 3A (3B). Consequently, a dispersion in displacement of the frame top position is suppressed to the minimum.

Accordingly, if the main signal ES circuits 32-2 include a number of ES stages (memory capacity) by which the dispersion in "displacement" suppressed to the minimum in this manner can be absorbed, then it is possible to perform frame timing re-clocking of main signals with the minimum memory capacity to synchronize the main signals with a frame timing of 8 kHz of an intra-apparatus reference without using the pointer processing technique.

Figure 49:
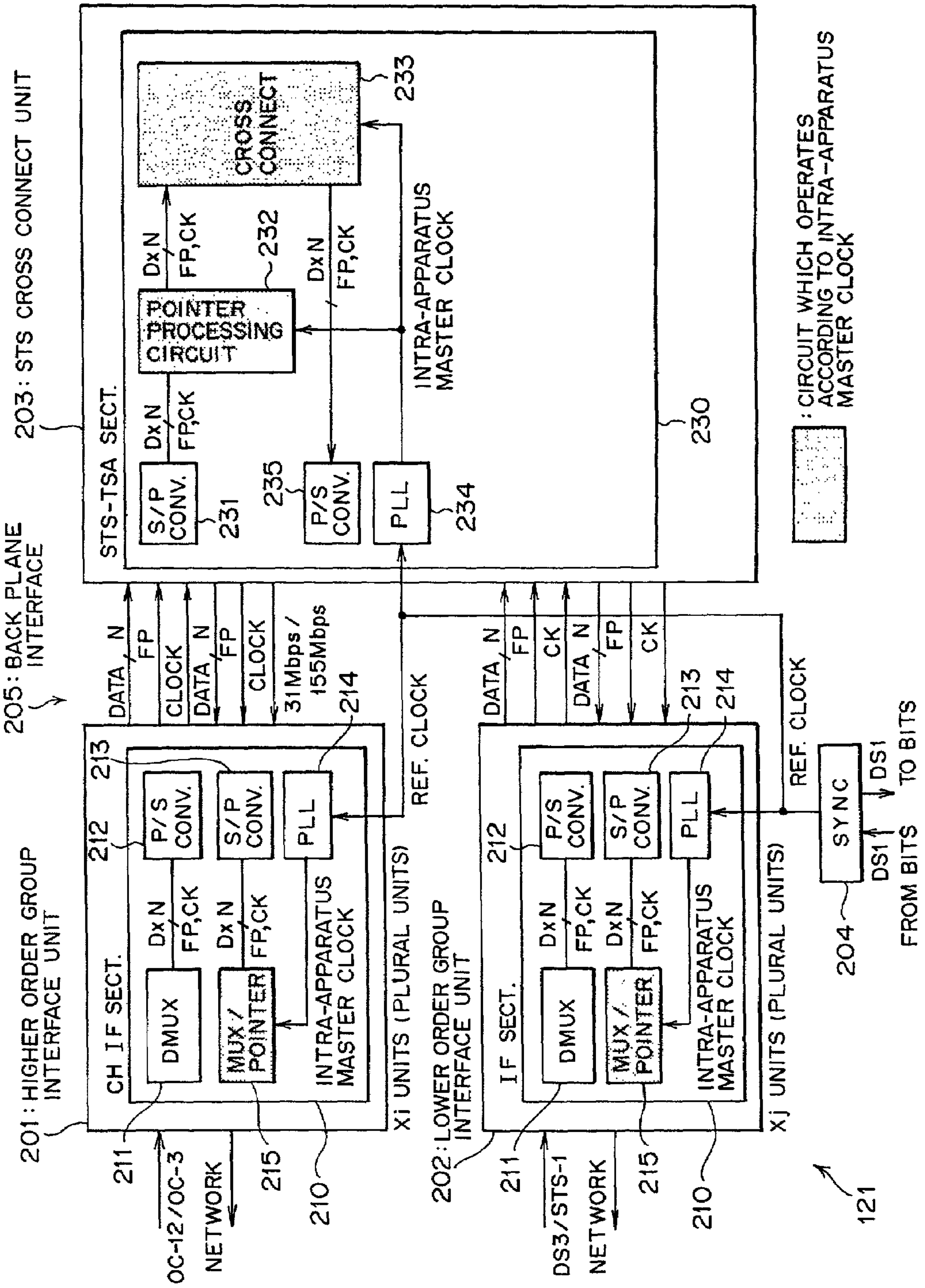
FIG. 49 is a block diagram showing an example of a configuration of essential part of a SONET (SDH) transmission apparatus.
Figure 50:
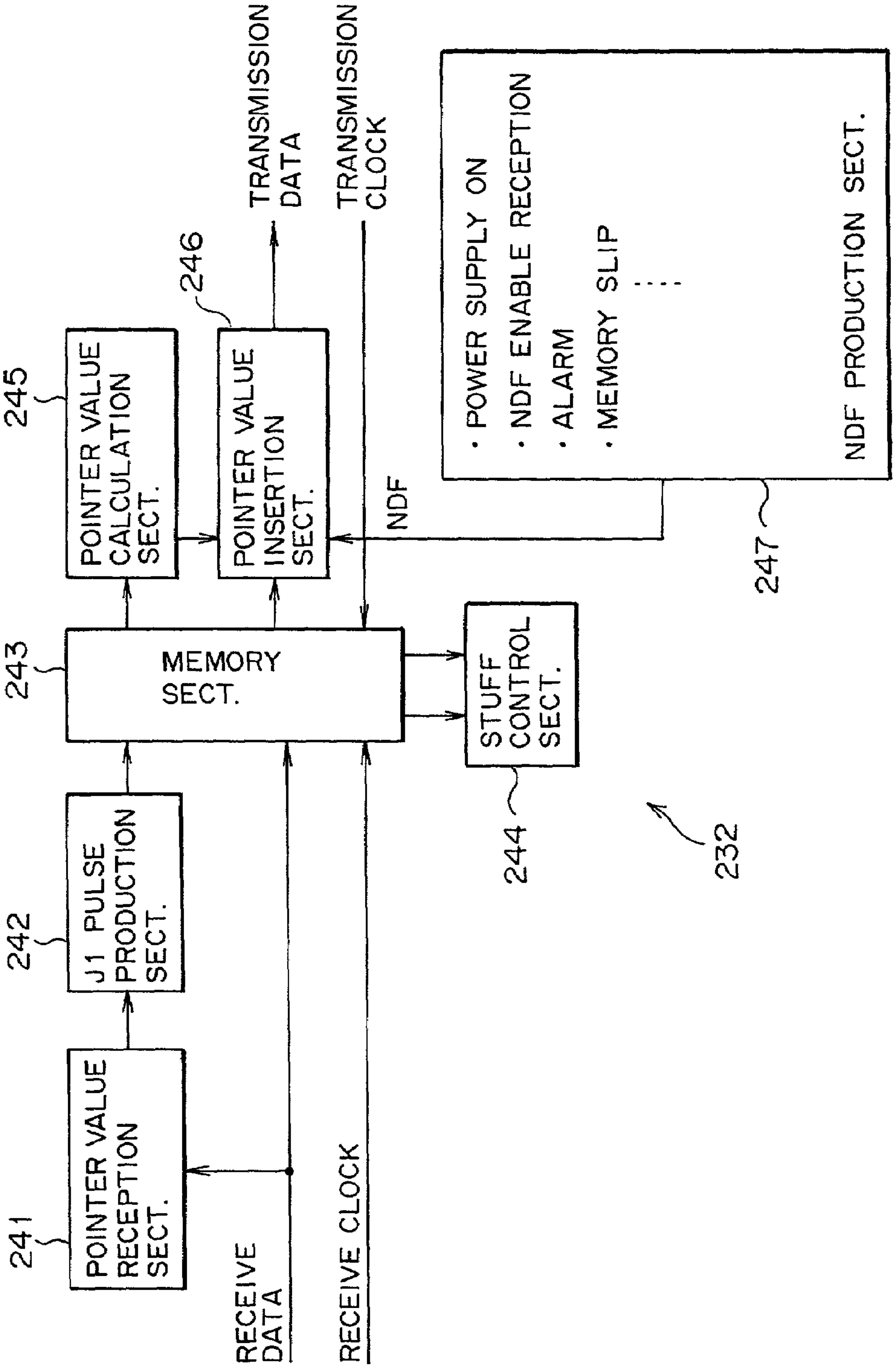
FIG. 50 is a block diagram showing an example of a detailed configuration of a pointer processing circuit 232.
Figure 51:
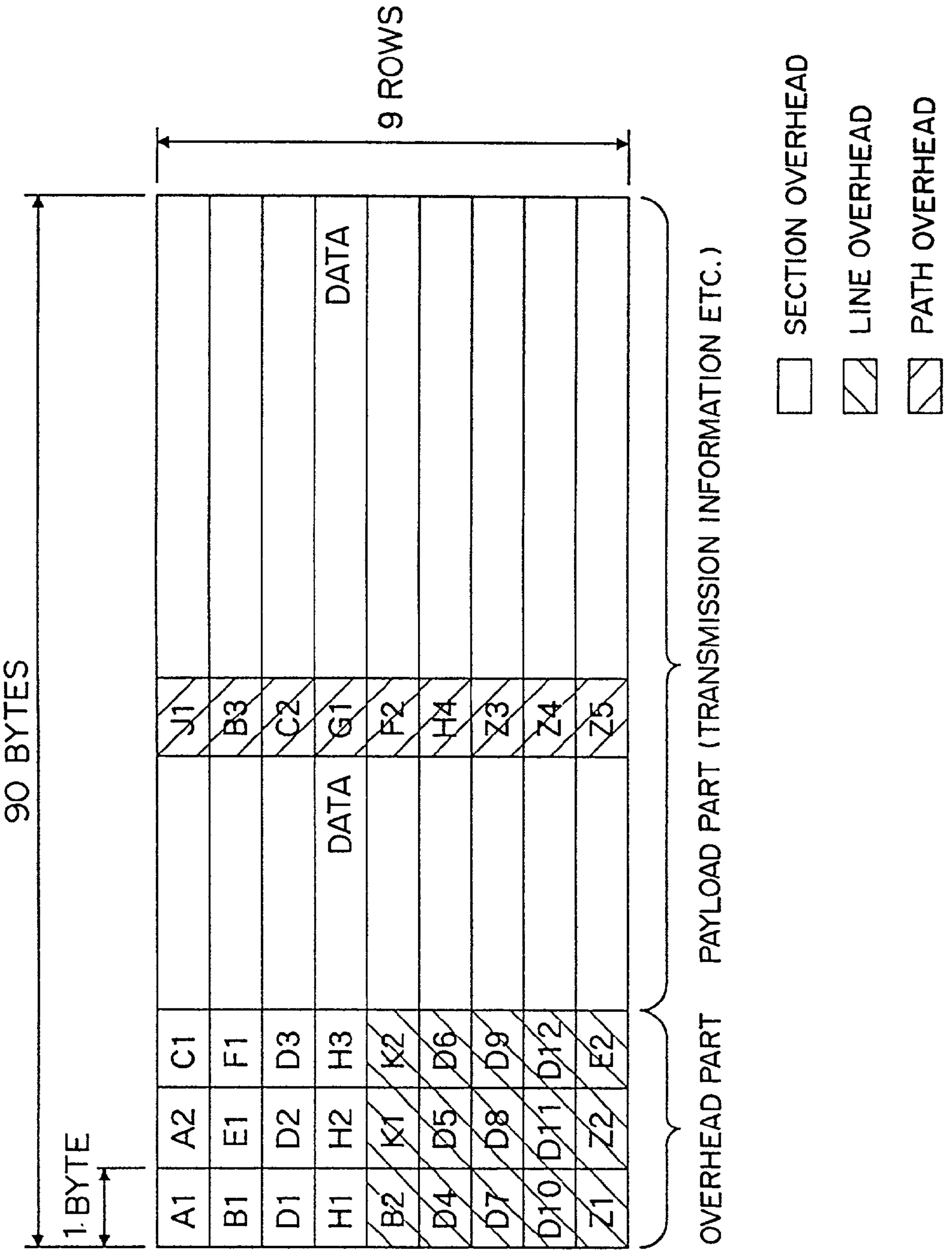
FIG. 51 is a schematic view illustrating a format of a SONET transmission frame (STS-1)
Figure 52:
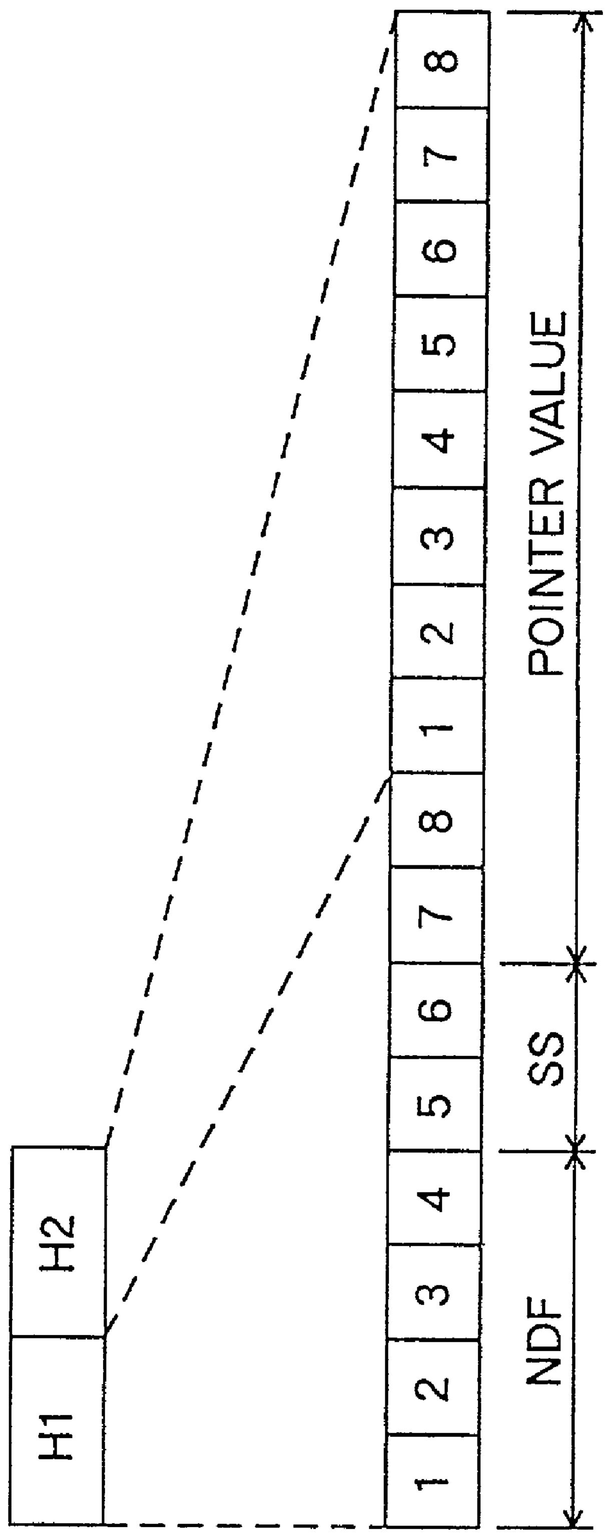
FIG. 52 is a schematic view illustrating a format of pointer bytes (H1 and H2) bytes of the SONET transmission frame.

As a result, different from such an existing apparatus 121 which uses the pointer processing technique for frame timing re-clock of main signals while the IF boards 201 and 202 and the STS-XC unit 203 operate independently of one another as described hereinabove with reference to FIG. 49, the apparatus scale can be suppressed to the minimum even if the number of channels to be processed increases as the number of accommodated IF boards increases.

Then, the main signals whose displacements of the frame top positions have been absorbed by the main signal ES circuits 32-2 in such a manner as described above are inputted to the cross connect section 32-3. Thus, the cross connect section 32-3 performs cross connect (TSI) for those of the main signals for which cross connect setting on the STS level has been performed from the microcomputer 6. Then, the resulting signals are folded back as transmission main signals to the STS-TSI section 32 side and transmitted to the pertaining ones of the accommodated networks through the pertaining BPIF sections 31 and IF boards 2.

On the other hand, those of the main signals for which cross connect setting on the ATM/VT level has been performed pass through the cross connect section 32-3 and are transmitted through the frame insertion section 32-4 and the BPIF section 33 to the ATM/VT cross connect unit 4, by which cross connection of them on the ATM/VT level is performed. Thereafter, the resulting signals are processed successively by the BPIF section 33→frame synchronizing section 32-5→main signal ES circuit 32-6→cross connect section 32-3→frame insertion sections 32-7→BPIF sections 31→IF boards 2 and transmitted to the accommodated networks.

In the following, details of the RCK selector circuit 32-8, main PLL circuit 34, MFT circuit 32-9, MTPES circuit 32-10, main signal ES circuit 32-2, and transmission format conversion circuits 22-1 and 31-1 in the STS-XC unit 3A (3B) described above are described.

(B) Detailed Description of the RCK Selector Circuit 32-8 and the Main PLL Circuit 34

Figure 2:
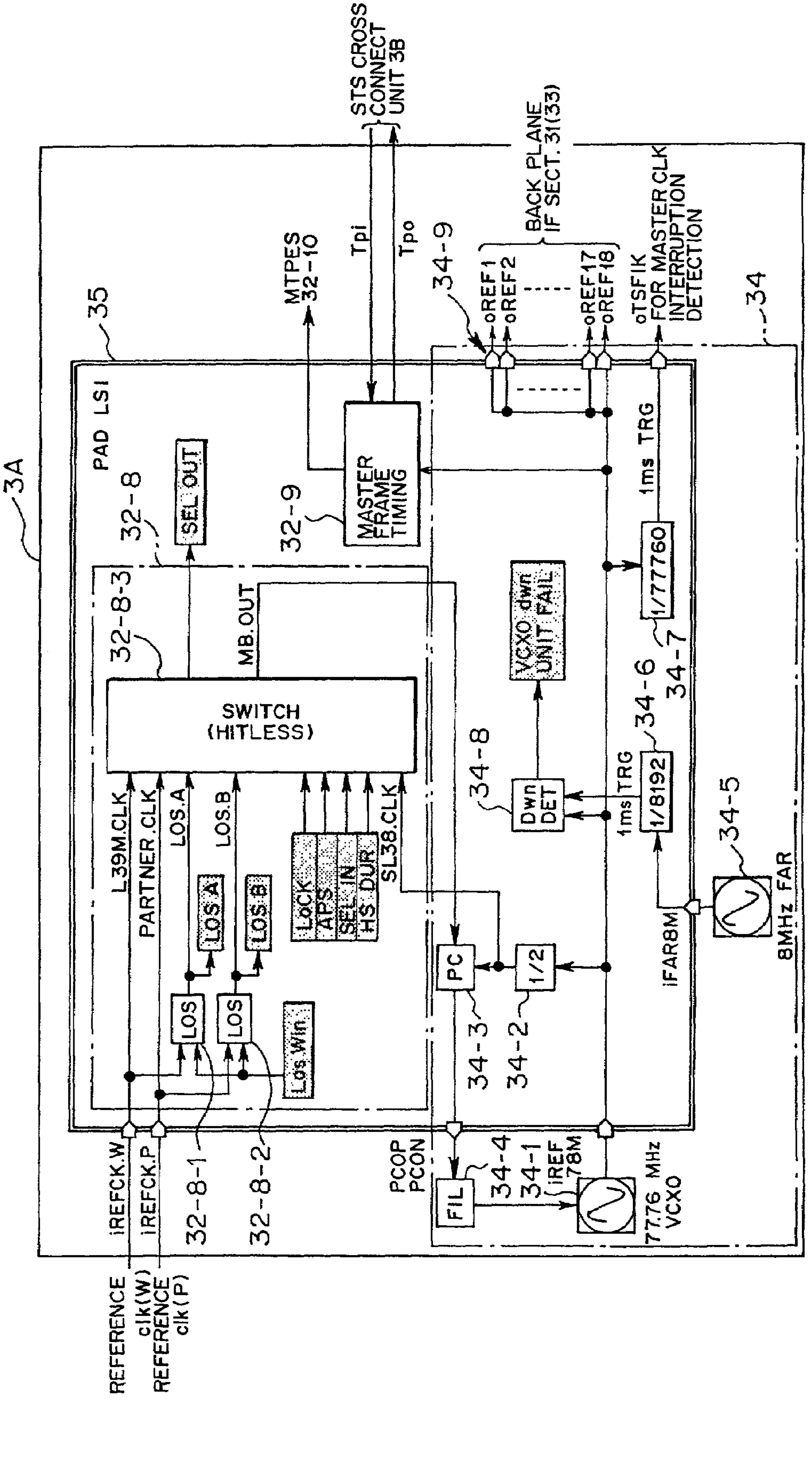
FIG. 2 is a block diagram showing a detailed configuration with attention paid to a main PLL circuit and a reference clock selection circuit of the SONET transmission apparatus shown in FIG. 1.

FIG. 2 is a block diagram showing a detailed configuration of the STS-XC unit 3A (3B) with attention paid to the RCK selector circuit 32-8 and the main PLL circuit 34 described hereinabove. As shown in FIG. 2, the RCK selector circuit 32-8 includes a pair of clock interruption detection sections 32-8-1 and 32-8-2 and a clock selection switch 32-8-3. The main PLL circuit 34 includes a voltage controlled oscillator (VCXO) 34-1 of 78 MHz (strictly 77.76 MHz), a divider 34-2, a phase comparator (PC) 34-3, a filter 34-4, a voltage controlled oscillator 34-5 of 8 kHz, a pair of dividers 34-6 and 34-7, a clock interruption detection section (Dwn DET) 34-8, and a clock distribution interface section 34-9.

It is to be noted that, in FIG. 2, it is shown that the components of the main PLL circuit 34 except the RCK selector circuit 32-8, VCXO 34-1, filter 34-4 and oscillator 34-5 described above and the MFT circuit 32-9 described above are implemented by the same LSI (PAD LSI) 35. Further, in FIG. 2, each screened element represents information reported to the microcomputer 6 through the microcomputer I/F section 32-11 or information set from the microcomputer 6.

In the RCK selector circuit 32-8 shown in FIG. 2, the clock interruption detection sections (LOS) 32-8-1 and 32-8-2 perform clock interruption detection of the reference RCKs of 38 MHz (strictly 38.88 MHz) from the synchronization card 5. If clock interruption is detected, then a changeover trigger (LOS A or LOS B) is generated and inputted to the clock selection switch 32-8-3.

Figure 3:
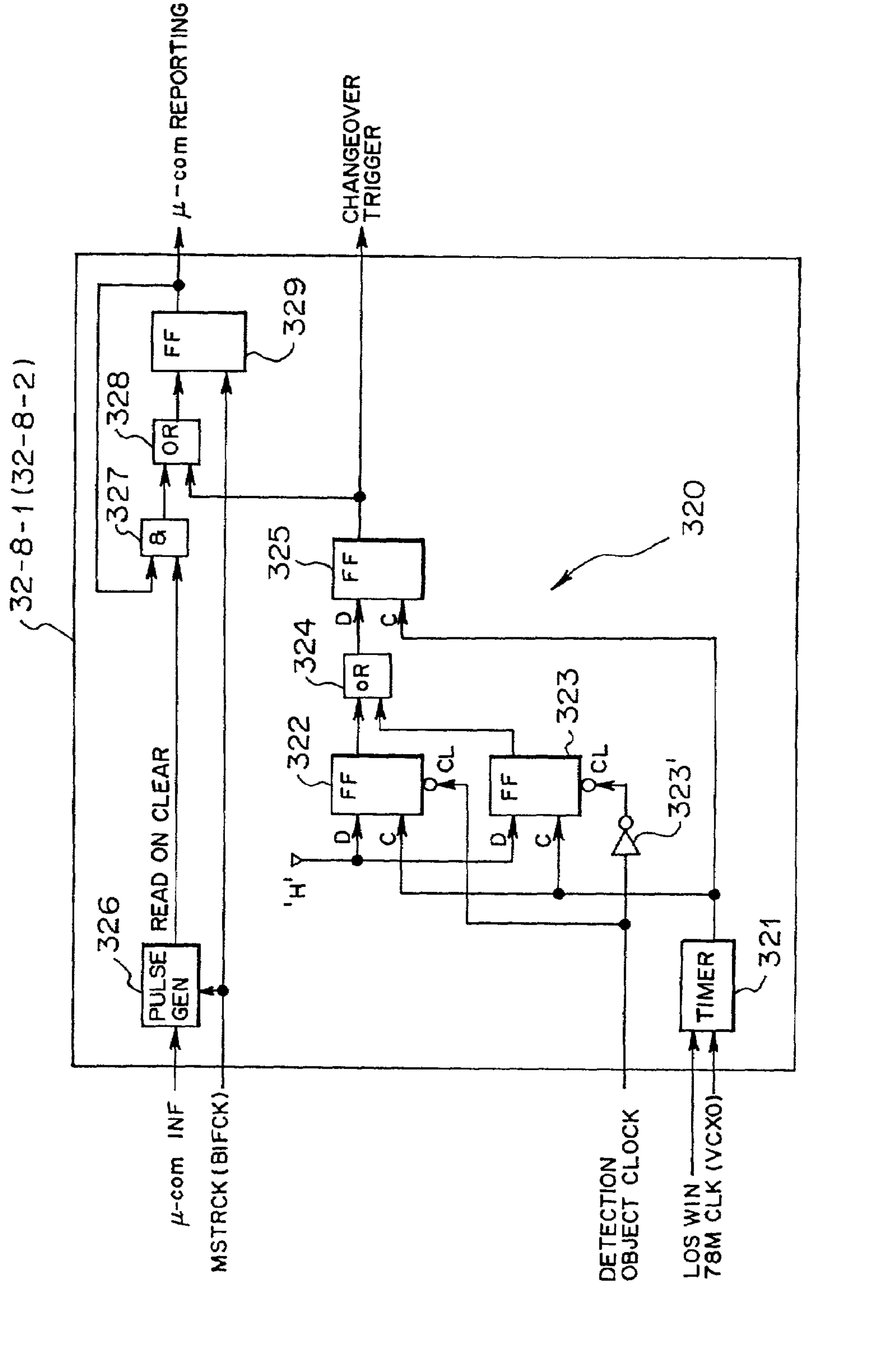
FIG. 3 is a block diagram showing a detailed configuration of a clock interruption detection circuit (LOS) shown in FIG. 2.

More particularly, each of the clock interruption detection sections 32-8-1 and 32-8-2 is configured, for example, in such a manner as shown in FIG. 3 and detects an edge of the corresponding reference RCK (detection object clock) of 38 MHz described above from the synchronization card 5 within a predetermined count (sampling) period of a timer circuit 321 by means of a clock interruption detection circuit 320 which includes flip-flop (FF) circuits 322, 323 and 325, an invertor 323' and an OR circuit 324.

Figure 4A:
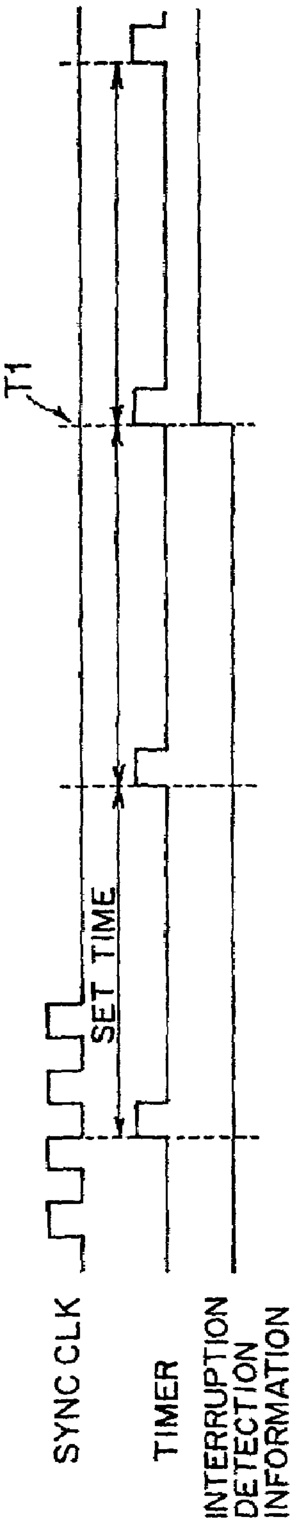
FIGS. 4A and 4B are time charts illustrating operation of the clock interruption detection circuit shown in FIG. 3.
Figure 4B:
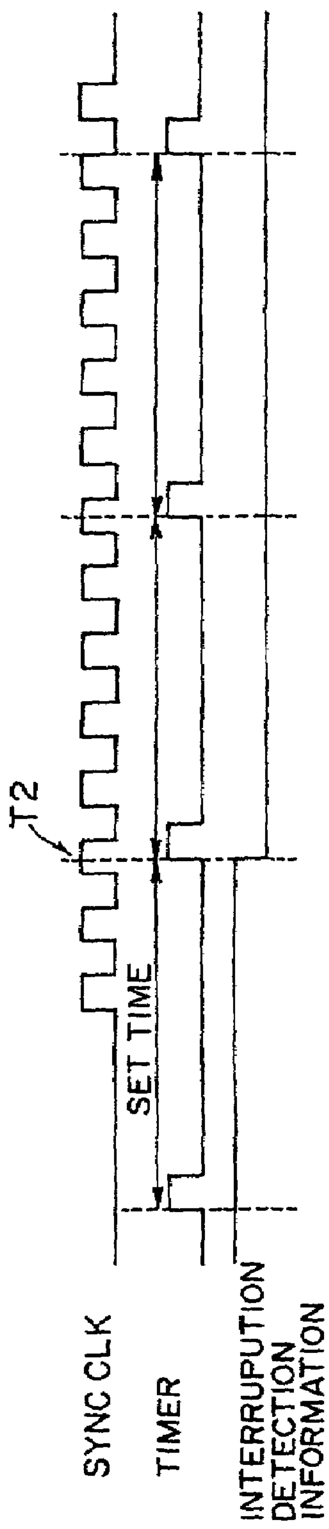

If no edge of the reference RCK of 38 MHz is detected within the predetermined sampling period of the timer circuit 321, then a changeover trigger (interruption detection information) from the work system to the protection system is generated (refer to timing T1 of FIG. 4A). However, if at least one edge of the reference RCK of 38 MHz is detected within the predetermined sampling period, then the changeover trigger (LOS state) is cancelled (refer to timing T2 of FIG. 4B).

If the LOS state described above is detected (a changeover trigger is generated), then the state is stored into an FF circuit 329 through an OR circuit 328 and reported to the microcomputer 6 through the microcomputer I/F section 32-11. After the state is reported to the microcomputer 6, a read on clear signal is produced by a pulse generator 326 in response to a trigger from the microcomputer 6 (microcomputer I/F section 32-11) to validate an output of an AND circuit 327, and consequently, the stored information (LOS state) of the FF circuit 329 is cleared.

It is to be noted that the sampling period by the timer circuit 321 described above is produced based on the reference RCK of 78 MHz, and in the present embodiment, the sampling period can be suitably set or changed from the microcomputer 6 through the microcomputer I/F section 32-11.

More particularly, the setting or change is performed with LOS window setting information (LOS WIN) of 4 bits. For example, if the LOS window setting information is "0000", then the sampling period is 25.7 nanoseconds (ns) (corresponding to a clock period obtained by dividing the 78 MHz reference RCK by 4), but if the LOS window setting information is "0001", then the sampling period is set to 77.2 (ns) (corresponding to a clock period obtained by dividing the 78 MHz reference RCK by 8).

Figures 5, 6:
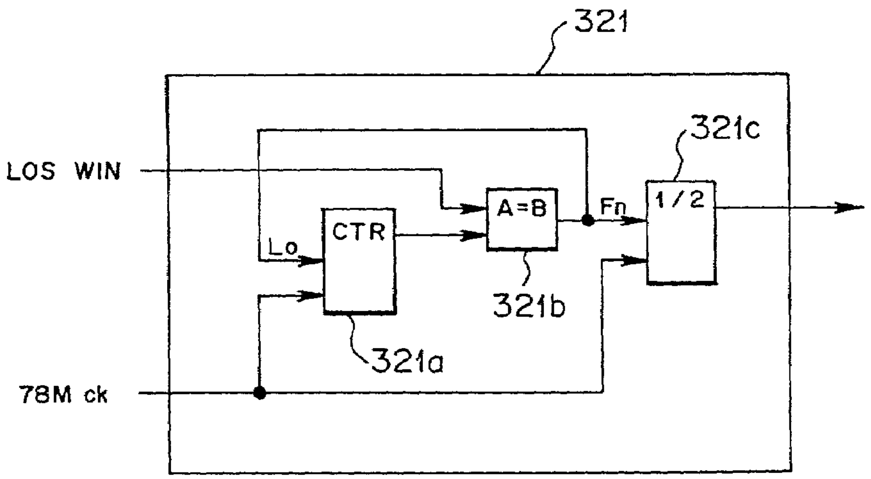
FIG. 5 is a view illustrating detection period setting of the clock interruption detection circuit shown in FIG. 3.
FIG. 6 is a block diagram showing a detailed configuration of a timer circuit in the clock interruption detection circuit shown in FIG. 3.

To this end, the timer circuit 321 includes, for example, as shown in FIG. 6, a counter 321*a*, a comparator 321*b* and a ½ divider 321*c* and can change the dividing ratio of the 78 MHz reference RCK in response to the LOS window setting information by comparing the LOS window setting information described above and the count value of the counter 321*a* to produce a load timing for the counter 321*a*.

By making it possible to vary the setting of the sampling period in this manner, the detection sensitivity of the LOS state of the 38 MHz reference RCK from the synchronization card 5 can be adjusted suitably in accordance with a request.

Referring back to FIG. 2, the clock selection switch 32-8-3 described above selectively outputs the 38 MHz reference RCK with regard to which the changeover trigger is not generated from the clock interruption detection section 32-8-1 (32-8-2) described hereinabove, that is, from which clock interruption (a LOS state) is not detected (the protection system). Consequently, the STS-XC unit 3A (3B) normally selects and uses the normal reference RCK free from a fault, and this contributes very much to improvement in the reliability in main signal processing.

It is to be noted that, since the clock selection can be changed over by setting from the microcomputer 6 through the microcomputer I/F section 32-11 as described hereinabove, test changeover, compulsory changeover or the like of the work/protection systems by a maintenance engineer can be carried out suitably, and this can improve the convenience in maintenance and administration significantly.

The reference RCK of 38 MHz selected in such a manner as described above is inputted to the PC 34-3, by which it is compared in phase with a clock obtained by dividing an output clock (78 MHz) of the VCXO 34-1 by means of the divider 34-2. A resulting signal from the PC 34-3 is fed back as a phase control signal (PCON) for the VCXO 34-1 to the VCXO 34-1 through the filter 34-4.

Figure 7:
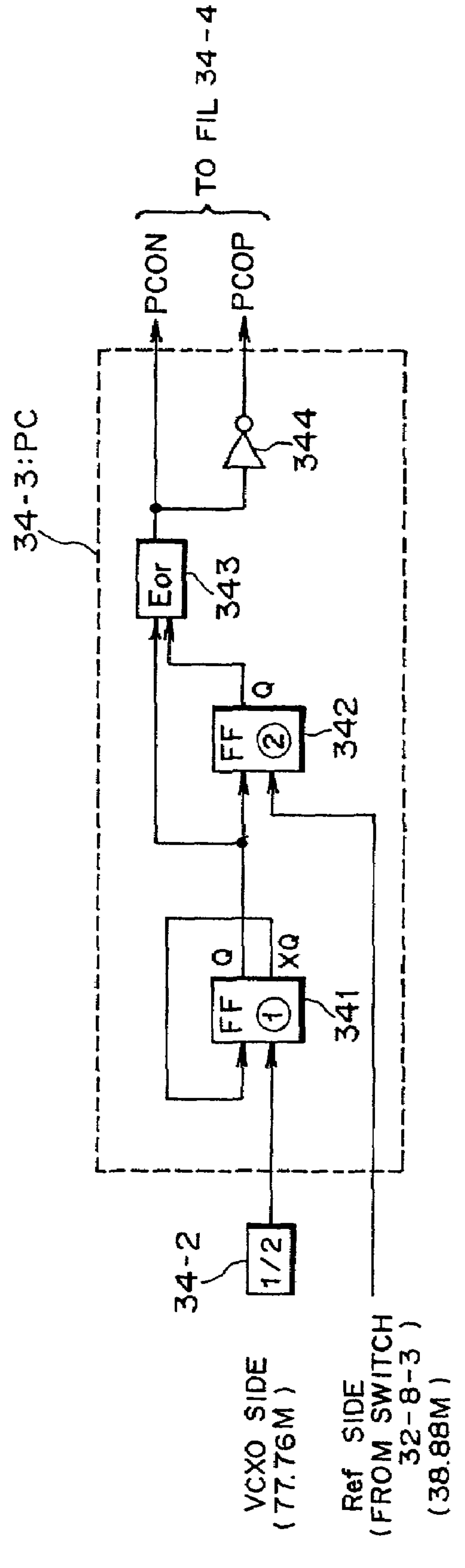
FIG. 7 is a circuit diagram showing a detailed configuration of a phase comparator (PC) shown in FIG. 2.
Figure 8A:
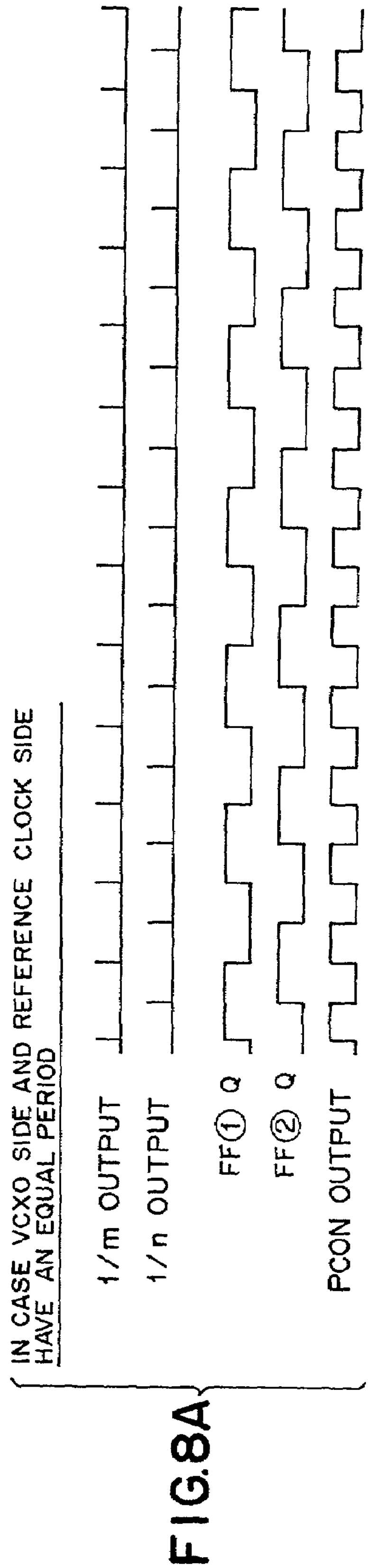
FIG. 8A is a time chart illustrating operation of a PC shown in FIG. 7(when the frequency of a VCXO and the frequency of a reference clock are equal to each other)

More particularly, the PC 34-3 described above includes, for example, as shown in FIG. 7, a pair of FF circuits 341 and 342, an EXOR (exclusive OR) circuit 343 and an invertor 344. For example, as shown in FIG. 8A, if a clock (1/m output) from the VCXO 34-1 side (divider 34-2) and the reference RCK (1/n output) of 38 MHz selected by the clock selection switch 32-8 have an equal period (equal frequency), then the phase control signal (PCON) described above becomes fixed, and the oscillation frequency of the VCXO 34-1 is maintained at the oscillation frequency then.

Figure 8B:
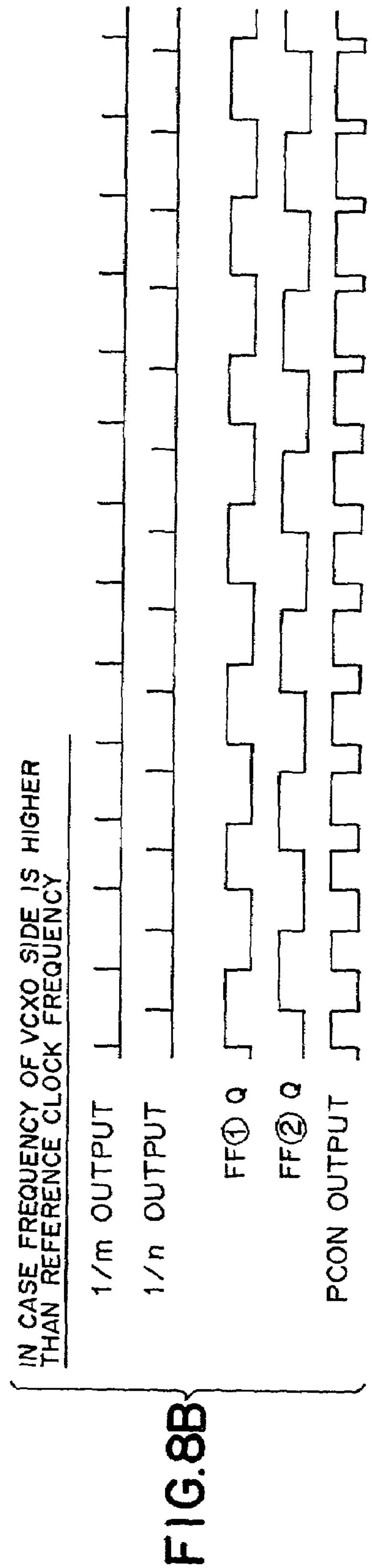
FIG. 8B is a time chart illustrating operation of the PC shown in FIG. 7 (when the frequency of the VCXO is higher than the frequency of the reference clock are equal)
Figure 9A:
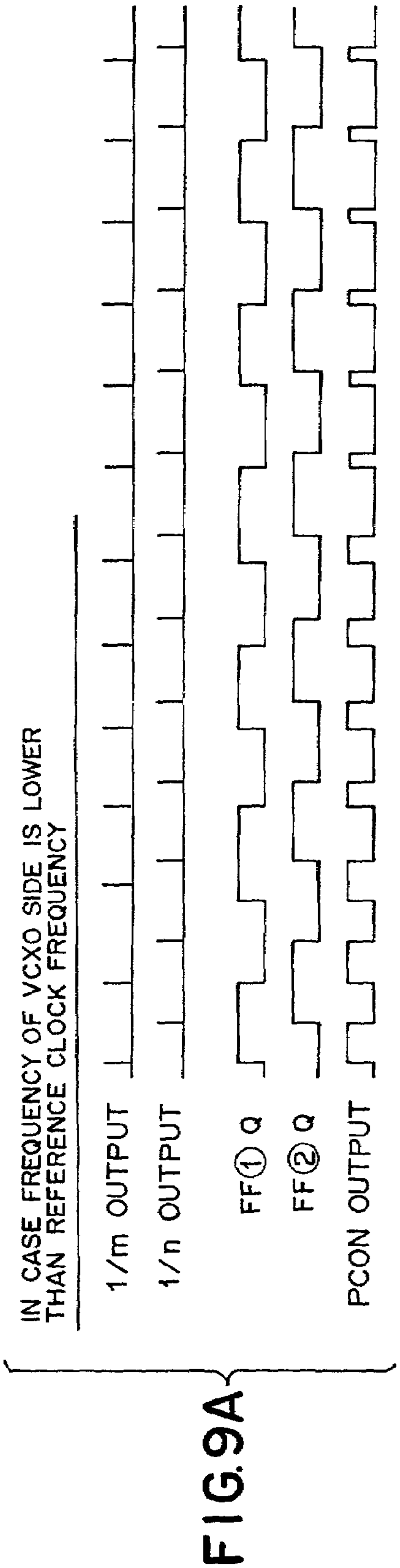
FIG. 9A is a time chart illustrating operation of the PC shown in FIG. 7 (when the frequency of the VCXO is lower than the frequency of the reference clock are equal)

On the other hand, if the clock (1/m output) from the VCXO 34-1 side is higher than the frequency of the reference RCK (1/n output) of 38 MHz, then as shown in FIG. 8B, the PCON becomes a pulse of a direction in which the H level width (Duty) thereof increases. On the contrary, if the clock (1/m output) from the VCXO 34-1 side is lower than the frequency of the reference RCK (1/n output) of 38 MHz, then as shown in FIG. 9A, the PCON becomes a pulse of a direction in which the H level width (Duty) thereof decreases. Consequently, the oscillation frequency of the VCXO 34-1 is adjusted so that the frequencies of the two clocks may coincide with each other.

Figure 9B:
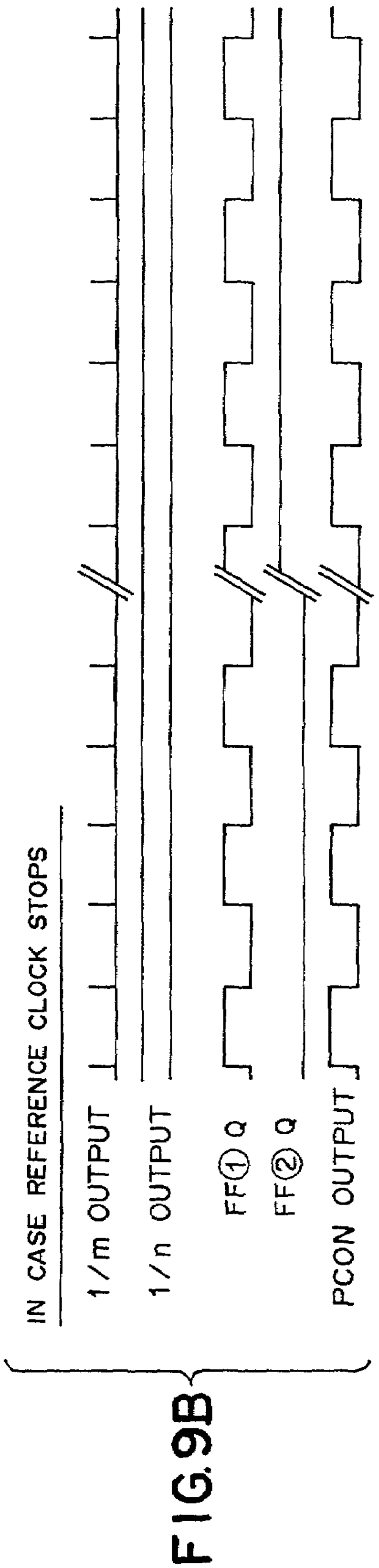
FIG. 9B is a time chart illustrating operation of the PC shown in FIG. 7 (when the reference clock stops)

It is to be noted that, if the reference RCK (1/n output) of 38 MHz stops, then the PCON is outputted with the frequency of 19.44 MHz and the Duty of 50% as shown in FIG. 9B.

The output clock of the VCXO 34-1 is fixed to 78 MHz with a high degree of accuracy in such a manner as described above. The output clock of the VCXO 34-1 is branched to 18 branches (it is to be noted that two branches are for reservation) by a clock distribution interface section 37 and distributed one by one to the PLL circuits 31-2 of the BPIF sections 31 (33) described above.

In short, the clock distribution interface section 37 functions as a distribution output section for an intra-apparatus reference RCK of 78 MHz for which the PLL processing described above has been performed separately to the PLL circuits 31-2.

Where the intra-apparatus reference RCK of 78 MHz is outputted separately to the PLL circuits 31-2 in this manner, waveform deterioration of the 78 MHz reference RCK distributed to each of the PLL circuit 31-2 can be prevented, and as a result, each of the PLL circuits 31-2, that is, each of the BPIF sections 31, can be synchronized with the main PLL circuit 34 (VCXO 34-1) with a high degree of accuracy.

Accordingly, the bit delays of main signals from the IF boards 2 caused by processing (transmission format conversion) by the BPIF sections 31 are almost equal among the main signals, and the dispersion in displacement of the frame top positions of the main signals can be suppressed to the minimum as described hereinabove.

(C) Detailed Description of the MFT Circuit 32-9

Figure 10:
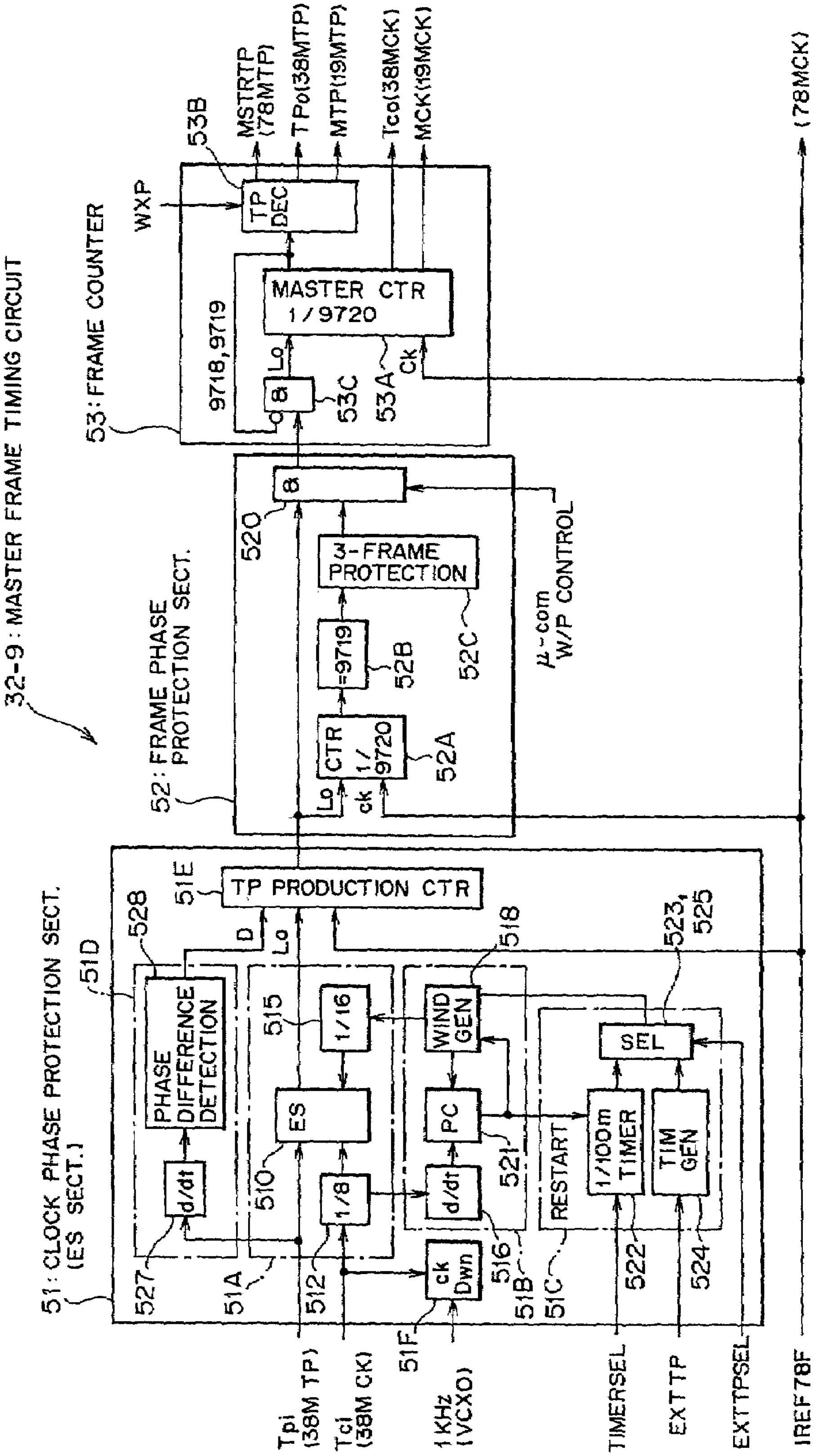
FIG. 10 is a block diagram showing a detailed configuration of a master frame timing (MFT) circuit shown in FIG. 1.
Figure 11:
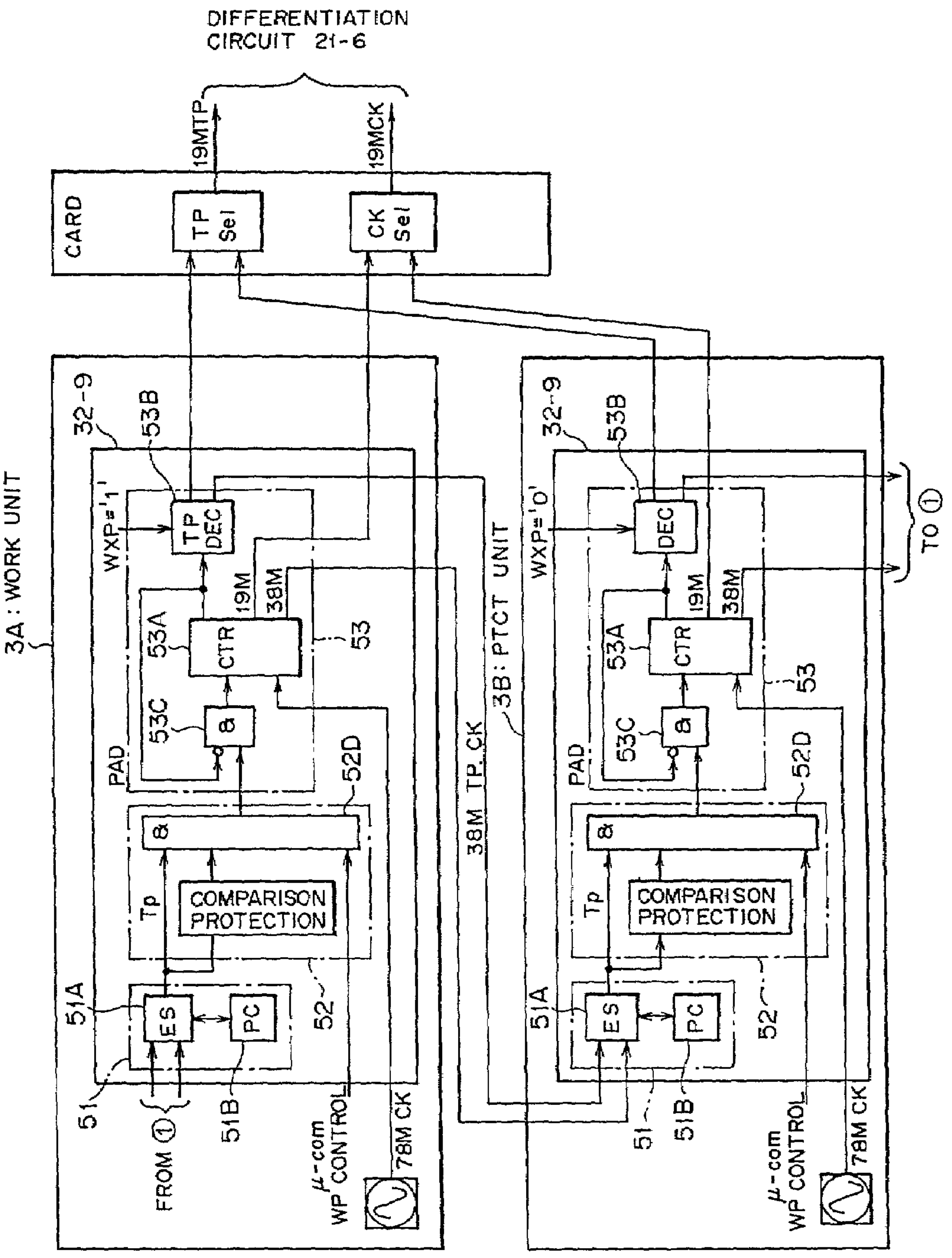
FIG. 11 is a block diagram showing a mutual connection configuration of the MFT circuit in an STS cross connect of a redundancy configuration.

FIG. 10 is a block diagram showing a detailed configuration of the MFT circuit 32-9 described hereinabove, and FIG. 11 is a block diagram showing a mutual connection configuration of the MFT circuit 32-9 of each of the STS-XC units 3A and 3B (work unit 3A and protect unit 3B). As shown in FIGS. 10 and 11, the each of the MFT circuits 32-9 includes a clock phase protection section 51, a frame phase protection section 52 and a frame counter section 53.

The clock phase protection section 51 receives the inter-unit synchronizing timing pulse (38 MTP) described above produced by the frame counter section (first counter section) 53 of the MFT circuit 32-9 of the STS-XC unit 3A which is operating as the work system to protect the phase of the clock and re-clocks the timing pulse to the 78 MTP while absorbing phase variations or jitters of the 38 MTP.

To this end, the clock phase protection section 51 includes an ES section (first memory section) 51A, a phase comparison (PC) section 51B, a window timer section 51C, a phase difference detection section 51D, a timing pulse (TP) production counter section 51E and a clock interruption detection section 51F.

The clock phase protection section 51 generally performs such processing as described below. In particular, the timing of the input 38 MTP is re-clocked to that of the 78 MTP by the ES section 51A. Upon such re-clocking, the write phase and the readout phase of the 38 MTP into and from the ES section 51A are compared (supervised) with each other by the PC section 51B, and if the phases approach each other until they are going to overlap with each other, that is, if a memory slip is estimated to occur, then the readout phase is adjusted so that the relationship between the phases is corrected to a normal phase relationship.

The supervision of the phase relationship described above is performed based on a window pulse signal (initial or normal window pulse which is hereinafter described) of a predetermined period produced by the window timer section 51C, and the adjustment of the readout phase is performed so that the readout phase (timing) may coincide with the central position of the window pulse width.

The 38 MTP whose timing has been re-clocked to the 78 MTP as described above is supplied as a load pulse for the TP production counter section 51E. At this time, the phase difference of the 38 MTP between the phases before and after the timing re-clocking (before and after the 38 MTP passes) is detected by the phase difference detection section (first phase difference correction control section) 51D, and the production (output) timing of the 78 MTP by the TP production counter section (first frame timing production counter section) 51E is controlled so that the phase difference may be reduced to zero.

Consequently, a phase variation of the 78 MTP caused by the timing re-clocking by the ES section 51A is absorbed, and the 78 MTP produced is held in synchronism with a high degree of accuracy with the 8 kHz frame timing (38 MTP) produced by the MFT circuit 32-9 of the work unit 3A. It is to be noted that further details of the clock phase protection section 51 are hereinafter described with reference to FIG. 18. Also details of the clock interruption detection section 51F are hereinafter described.

The frame phase protection section 52 described above performs phase protection of the 78 MTP produced by the clock phase protection section 51 in such a manner as described above for 3 frames (it is to be noted that one frame here is 9,720 bits). To this end, the frame phase protection section 52 includes, as shown in FIGS. 10 and 12, a frame counter 52A [14-bit (divided into 1/9,720) counter], a decoder 52B, a 3-frame protection circuit 52C, and an AND circuit 52D.

In the frame phase protection section 52, the frame counter 52A starts its counting operation from a count value (load value) "0000h" using a timing pulse (78 MTP) received from the clock phase protection section 51 as a trigger and supervises the period of the 78 MTP. It is to be noted that the frame counter 52A is loaded only with the 78 MTP and stops after it counts 14 bits.

Each time the count value of the frame counter 52A becomes equal to "9,719", an H pulse is outputted from the decoder 52B. In short, the decoder 52B confirms whether or not the period of the 78 MTP is equal to a period obtained by dividing the intra-frame reference 78 MHz clock by 9,720.

The H pulse is stored into the 3-frame protection circuit 52C, and if three H pulses are successively outputted from the decoder 52B, that is, if the distance between the 78 MTPs received from the clock phase protection section 51 is 9,720 bits successively by three times, then it is discriminated that the 78 MTP is reliable and an enable signal (EN) is supplied to the AND circuit 52D.

Consequently, the 78 MTP passes through the AND circuit 52D [since protect setting (H) has been performed for the AND circuit 52 from the microcomputer 6] and is outputted as a load timing for the frame counter section 53.

In order to implement such a three-frame protection function as described above, the 3-frame protection circuit 52C described above includes, for example, as shown in FIG. 13, a pair of FF circuits 52C-1 and 52C-2 and an AND circuit 52C-3. The output of the decoder 52B preceding by two frames is stored in the FF circuit 52C-2 and the output of the decoder 52B preceding by one frame is stored in the decoder 52B, and if the outputs of the FF circuits 52C-1 and 52C-2 and the output of the decoder 52B for the current frame exhibit the H level, then the enable signal is produced by the AND circuit 52C.

Figure 14A:
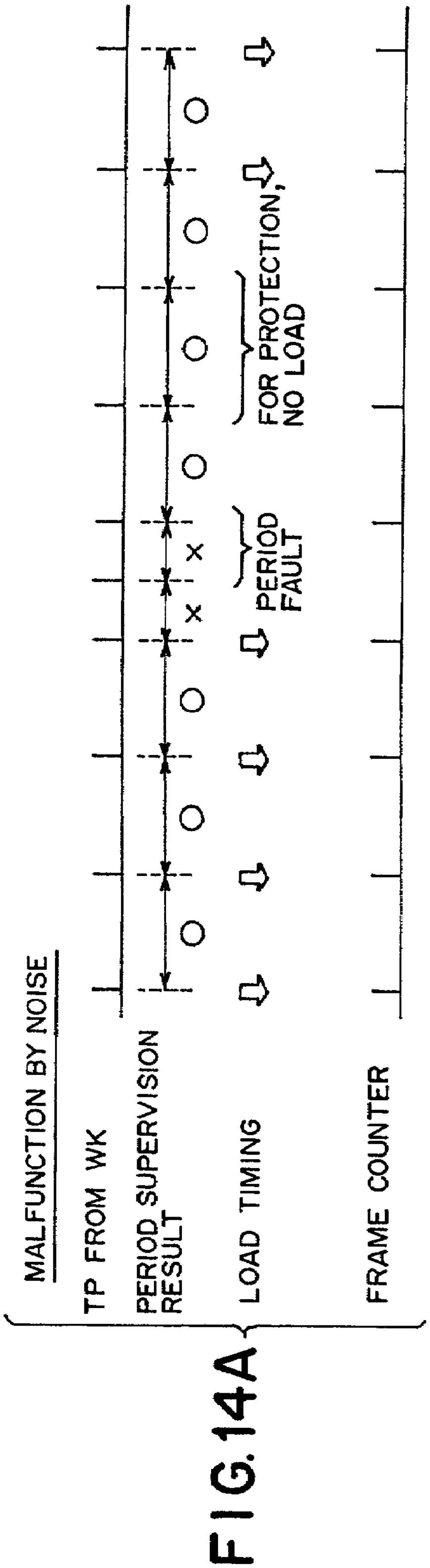
FIGS. 14A and 14B are time charts illustrating operation of the 3-frame protection circuit.
Figure 14B:
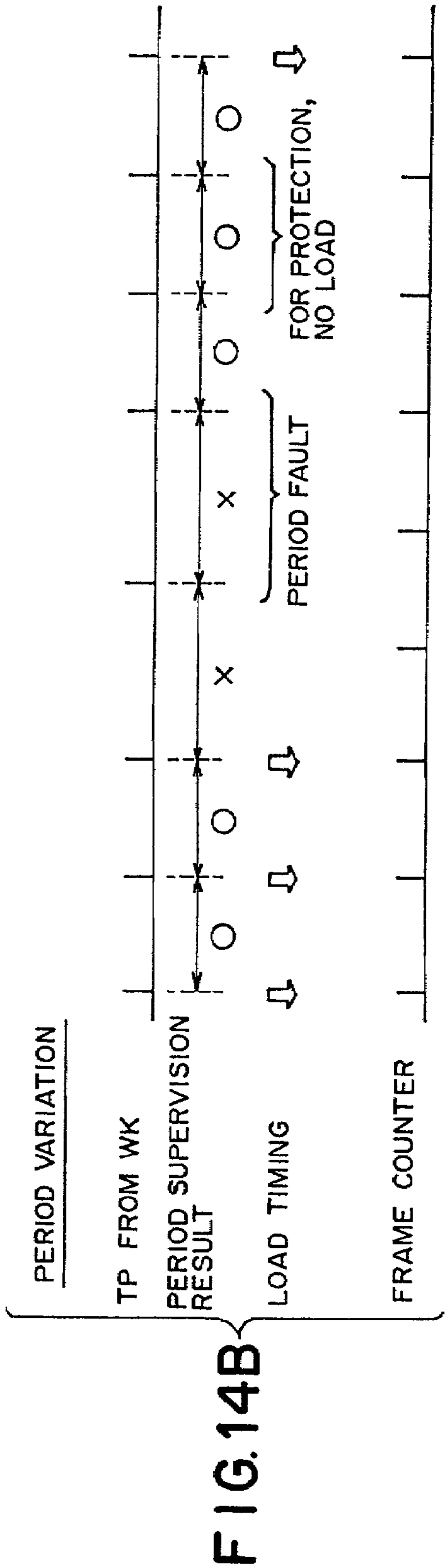

Consequently, for example, if some period fault occurs with the 78 MTP from the clock phase protection section 51 (if the period of the 78 MTP is displaced from the normal period at least once) as seen in FIGS. 14A and 14B, then even if the period fault disappears, the load timing described above for the frame counter section 53 is not outputted immediately, but only after the 78 MTP of the normal period is received successively by three frames after the period fault disappears, the load timing is outputted to the frame counter section 53.

As a result, such a situation that the MFT circuit 32-9 of the protect unit 3B receives the 78 MTP, which is wrong because of noise or the like, from the work unit 3A can be prevented.

It is to be noted that, although the MFT circuit 32-9 of the work unit 3A performs such clock phase protection and three-frame protection as described above for the 78 MTP produced by the MFT circuit 32-9 of the protect unit 3B because work setting (L) has been performed for the AND circuit 52D of the frame phase protection section 52 and an output of the AND circuit 52D is masked, the 78 MTP thus produced is not outputted as a load pulse for the frame counter section 53.

To this end, the frame counter section 53 of the MFT circuit 32-9 of the work unit 3A is operates as a free-running counter. It is to be noted that the reason why such clock phase protection and three-frame protection as described above are performed also in the work unit 3A although the frame counter section 53 operates as a free-running counter is that it is intended to keep the clock phase protection section 51 and the frame phase protection section 52 in a standby state so that the work unit 3A may operate as the protect unit 3B immediately when it is set from the microcomputer 6 that the work unit 3A itself becomes a protect system or the like.

The frame counter section 53 produces various frame timings (78 MTP, 38 MTP, 38 MCK, 19 MTP, 19 MTP) of 8 kHz to be used as intra-apparatus references and includes a master frame counter 53A, a decoder circuit 53B and a load mask circuit (one-input negated AND circuit) 53B.

The master frame counter 53A is a 14-bit (dividing into ⅑,720) counter and functions, in the work unit 3A, a free-running counter (first counter section) as described above, but functions, in the protect unit 3B, a subordinate counter (second counter section) whose counting operation is started at the load timing from the frame phase protection section 52 described above (subordinately to the work unit 3A).

Figure 15:
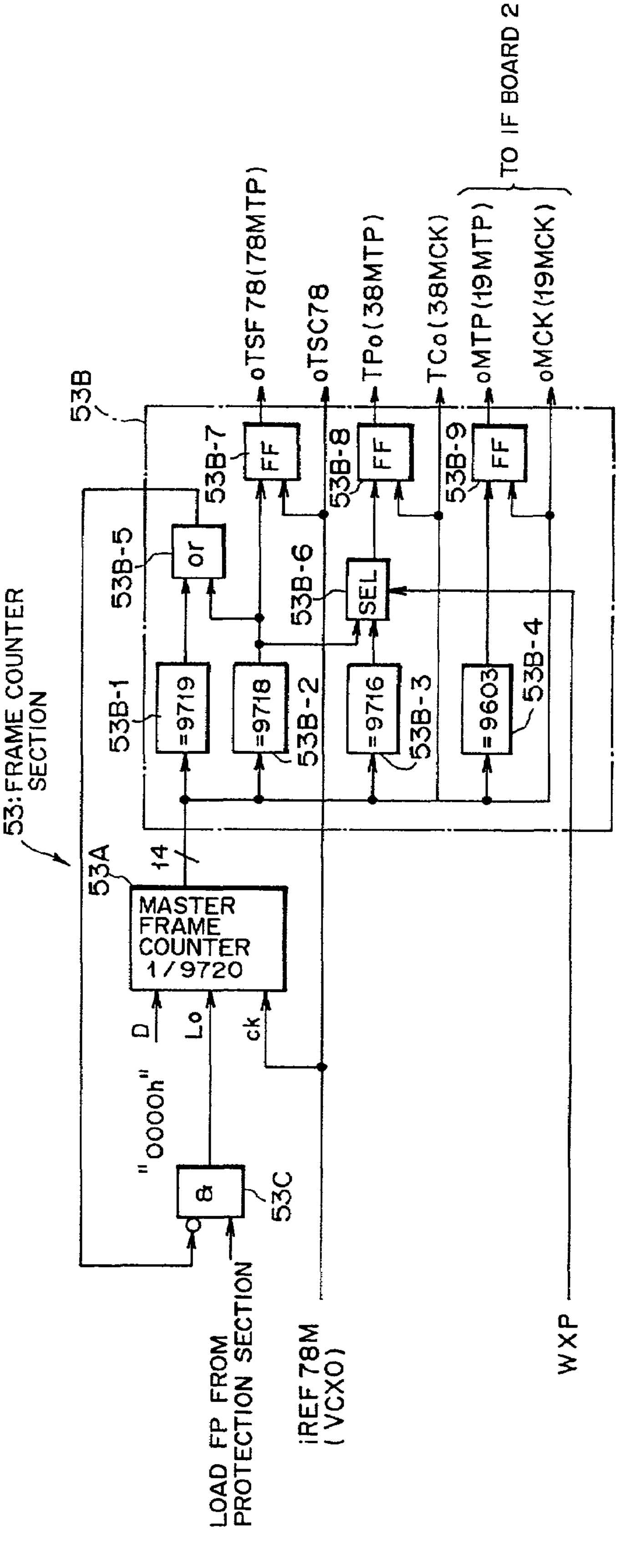
FIG. 15 is a block diagram showing a detailed configuration of a frame counter section shown in FIG. 10.

The decoder circuit 53B uses, as shown in FIG. 15, decoders 53B-1 to 53B-4, an OR circuit 53B-5, a selector (SEL) 53B-6 and FF circuits 53B-7 to 53B-9 to produce the 78 MTP, 38 MTP, 38 MCK, 19 MTP and 19 MTP described above based on the outer value of the master frame counter 53A described above.

It is to be noted that the selector 53B-6 described above selects one of outputs of the decoder circuits 53B-2 and 53B-3 in response to the work/protect setting (WXP) from the microcomputer 6 (microcomputer I/F section 32-11), and in response to the work setting (in the work unit 3A), the output of the decoder 53B-2 is selected, but in response to the protect setting (in the protect unit 3B), the output of the decoder 53B-3 is selected.

Consequently, from the decoder circuit 53B of the protect unit 3B, the 38 MTP (inter-unit synchronizing timing pulse) is outputted at a timing earlier by 2 bits (=9,718−9,716) than the 38 MTP from the work unit 3A. This configuration is used taking it into consideration that a delay (bit delay) for 2 bits appears in establishment of synchronism by mutual transfer of the 38 MTP between the STS-XC units 3A and 3B.

The loadmask circuit (one-input negated AND circuit) 53B prevents the master frame counter 53A of the protect unit 3B from being loaded at the load positions "9,718" and "9,719" of the master frame counter 53A of the work unit 3A because the 38 MTP is outputted at a timing earlier by 2 bits to establish synchronism between the work unit 3A and the protect unit 3B as described above.

Figure 16A:
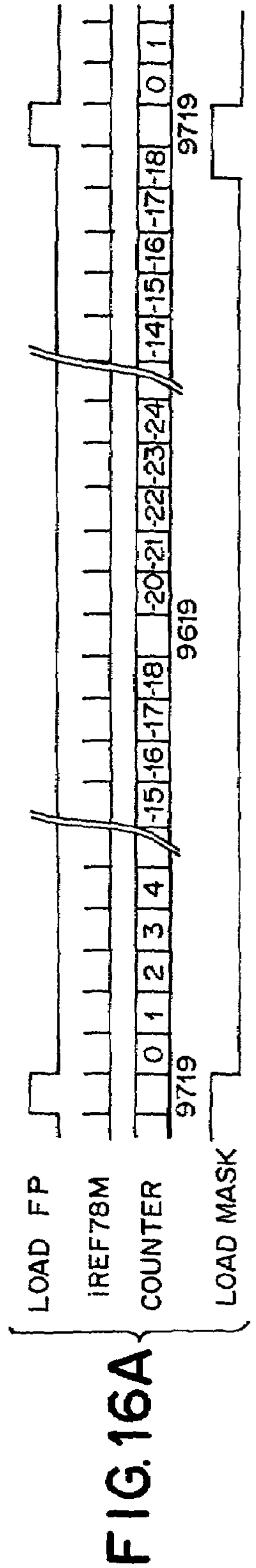
FIGS. 16A and 16B are time charts illustrating operation of the frame counter section shown in FIG. 15.
Figure 16B:
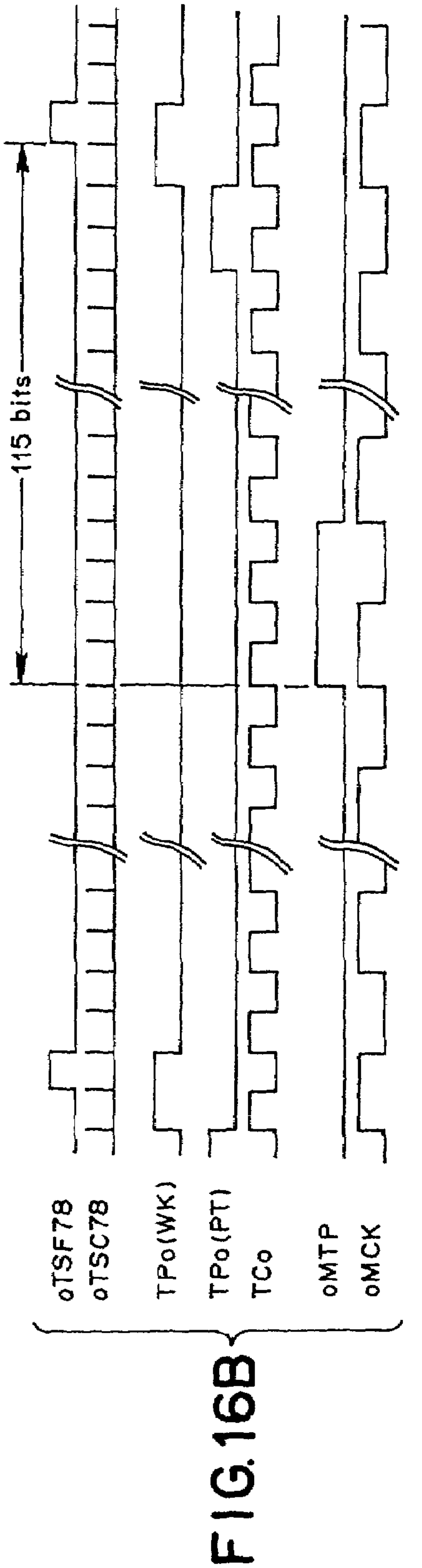

In such a configuration as described above, the frame counter section 53 operates, for example, in such a timing as seen in FIG. 16A and outputs various timing pulses (78 MTP, 78 MCK, 38 MTP, 38 MCK, 19 MTP and 19 MTP) of such waveforms as shown in FIG. 16B.

Now, operation for synchronism establishment between the work unit 3A and the protect unit 3B are described below with reference to FIGS. 17A to 17C based on such configuration and operation of the MFT circuit 32-9 as described above.

Figures 17A, 17B, 17C:
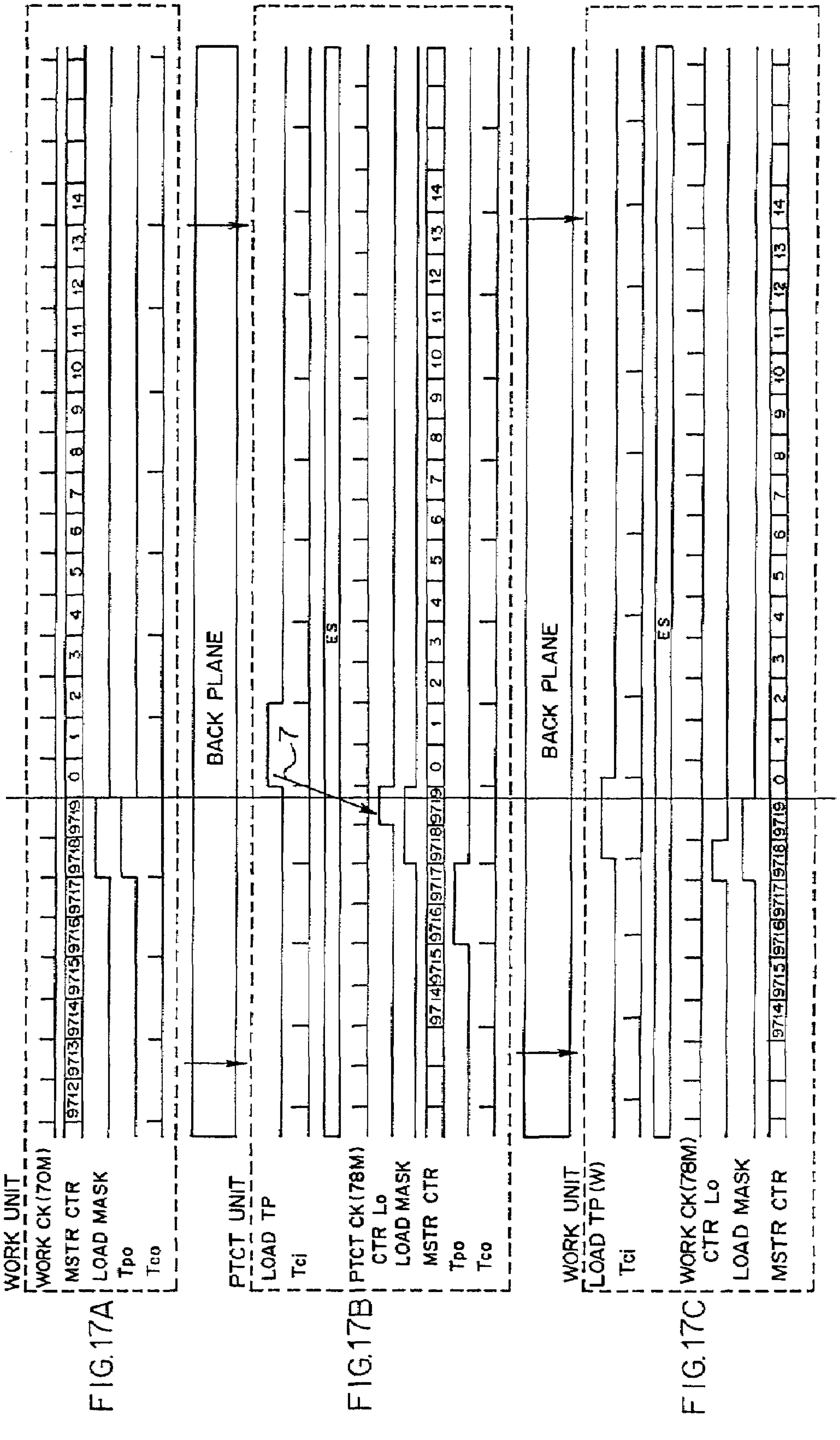
FIGS. 17A to 17C are time charts illustrating establishment of synchronism between STS cross connect units of a redundancy configuration.

First, the MFT circuit 32-9 of the work unit 3A side produces the 38 MTP (Tpo) and the 38 MCK (Tco) through free-running of the frame counter section 53 (master frame counter 53A) as seen in FIG. 17A and inputs them to the MFT circuit 32-9 of the protect unit 3B.

The MFT circuit 32-9 of the protect unit 3B loads the 38 MTP (Tpi) and the 38 MCK (Tci) and re-clocks the timing of the 38 MTP to that of the 78 MTP as described above by the clock phase protection section 51 (ES section 51A) thereof as shown in FIG. 17B.

Then, the 78 MTP is supplied as a load timing to the TP production counter section 51E. At this time, the TP production counter section 51E outputs the 78 MTP by a timing earlier by the phase difference detected by the phase difference detection section 51D (refer to reference numeral 7). The 78 MTP is subject to phase protection for 3 frames by the frame phase protection section 52 and then supplied as a load timing for the master frame counter 53A of the frame counter section 53.

The master frame counter 53A starts its counting operation at the load timing. Then, when the count value "9,716" of the master frame counter 53A is decoded by the decoder circuit 53B (decoder 53B-3), the 38 MTP to the work unit 3A is produced at a timing earlier by 2 bits than the 38 MTP in the work unit 3A.

The 38 MTP is outputted together with the 38 MCK to the MFT circuit 32-9 of the work unit 3A. At this time, while the frame counter section 53 of the work unit 3A side is freely running, similarly as in the protect unit 3A side, the timing re-clocking to that of the 78 MTP and the three-frame phase protection of the loaded 38 MTP are performed.

By such operation as described above, the displacement in counting operation among the master frame counters 53A of the work unit 3A and the protect unit 3B is always suppressed within one bit as seen from timing T3 in FIGS. 17A to 17C, and synchronism in frame timing between the units 3A and 3B is established with a high degree of accuracy.

In this manner, in the MFT circuit 32-9 of the protect unit 3B, since a bit delay of the 8 kHz frame timing loaded from the work unit 3B can be absorbed and pulling-in of a wrong frame timing caused by noise or the like can be prevented, a frame timing normally synchronized with a high degree of accuracy with the 8 kHz frame timing in the work unit 3A can be produced.

Accordingly, also upon changeover between the work/protect, the STS-XC units 3A and 3B can immediately operate with an 8 kHz frame timing of a normal intra-apparatus reference, and the operation of the transmission apparatus 1 can be stabilized and the reliability in cross connect processing can be improved significantly.

Now, the clock phase protection section 51 described hereinabove is described in more detail.

Figure 18:
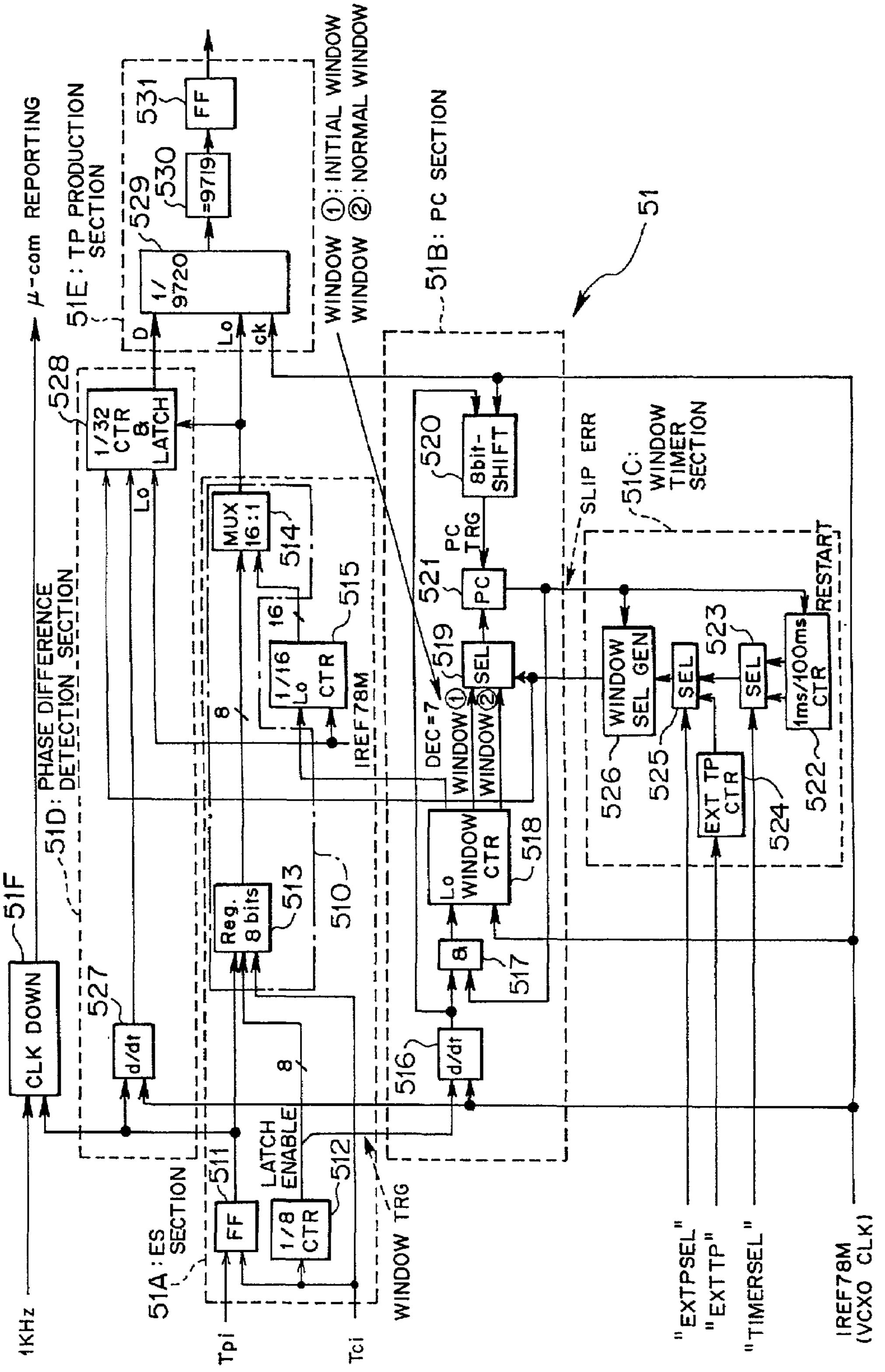
FIG. 18 is a block diagram showing a detailed configuration of a clock phase protection section shown in FIG. 10.

FIG. 18 is a block diagram showing a detailed configuration of the clock phase protection section 51. As shown in FIG. 18, the clock phase protection section 51 includes, as the ES section 51A described hereinabove, an FF circuit 511, a write counter 512, an ES circuit 510 formed from an 8-bit register 513 and a multiplexing section 514, and a read counter 515.

Further, the clock phase protection section 51 includes, as the PC section 51B described hereinabove, a differentiation circuit 516, an AND circuit 517, a window counter 518, a window selector 519, an 8-bit shift circuit 520 and a phase comparator (PC) 521, and includes, as the window timer section 51C described hereinabove, a 1 ms/100 ms counter 522, selectors 523 and 525, an external timing counter 524, and a window selection signal production circuit 526.

Furthermore, the clock phase protection section 51 includes, as the phase difference detection section 51D described hereinabove, a differentiation circuit 527 and an offset counter/latch section 528, and includes, as the TP production counter section 51E described hereinabove, a frame production counter 529, a decoder 530 and an FF circuit 531.

In the ES section 51A, the FF circuit 511 latches the 38 MTP (Tpi) from the work unit 3A (protect unit 3B). The write counter 512 produces a write address (write enable pulse) for the 38 MTP latched by the FF circuit 511 into the 8-bit register 513. Here, the write counter 512 is formed as a ⅛ dividing counter in order to write the 38 MTP in an eightfold period into the register (8-bit) 513.

The register 513 stores the 38 MTP in accordance with the write address from the write counter 512. The read counter 515 is a 1/16 dividing counter which receives the reference RCK (78 MCK) from the VCXO 34-1 and normally operates in synchronism with (subordinate to) the window counter 518 of the PC section 51B. Here, after the window counter 518 is loaded in response to a pulse (window trigger) produced by differentiation of the write enable pulse by means of the differentiation circuit 516, the count value "7" is loaded into the read counter 515. Consequently, the read counter 515 can produce 16 read addresses (read enable pulses) for the multiplexing section 514 in a phase displaced by one half period from the write counter 512.

Actually, however, the read addresses are associated with the write addresses in such a manner as given in Table 1 below, and the 8-bit data (38 MTP) stored in the register 513 is read out with eight read enable pulses by outputting every other one of the read addresses of the read counter 515 (in other words, the addresses for the remaining eight read enable pulses are not used).

TABLE 1

Write Address/Read Address Correspondence Table

| Write Address | Reg. No. | Read Address |
|---|---|---|
| 000 | Reg[0] | 00001 |
| 001 | Reg[1] | 00011 |
| 010 | Reg[2] | 00101 |
| 011 | Reg[3] | 00111 |
| 100 | Reg[4] | 01001 |
| 101 | Reg[5] | 01011 |
| 110 | Reg[6] | 01101 |
| 111 | Reg[7] | 01111 |

The multiplexing section 514 multiplexes the data (38 MTP) from the register 513 at the ratio of 16:1 in accordance with the read address from the read counter 515 described hereinabove.

Figure 21:
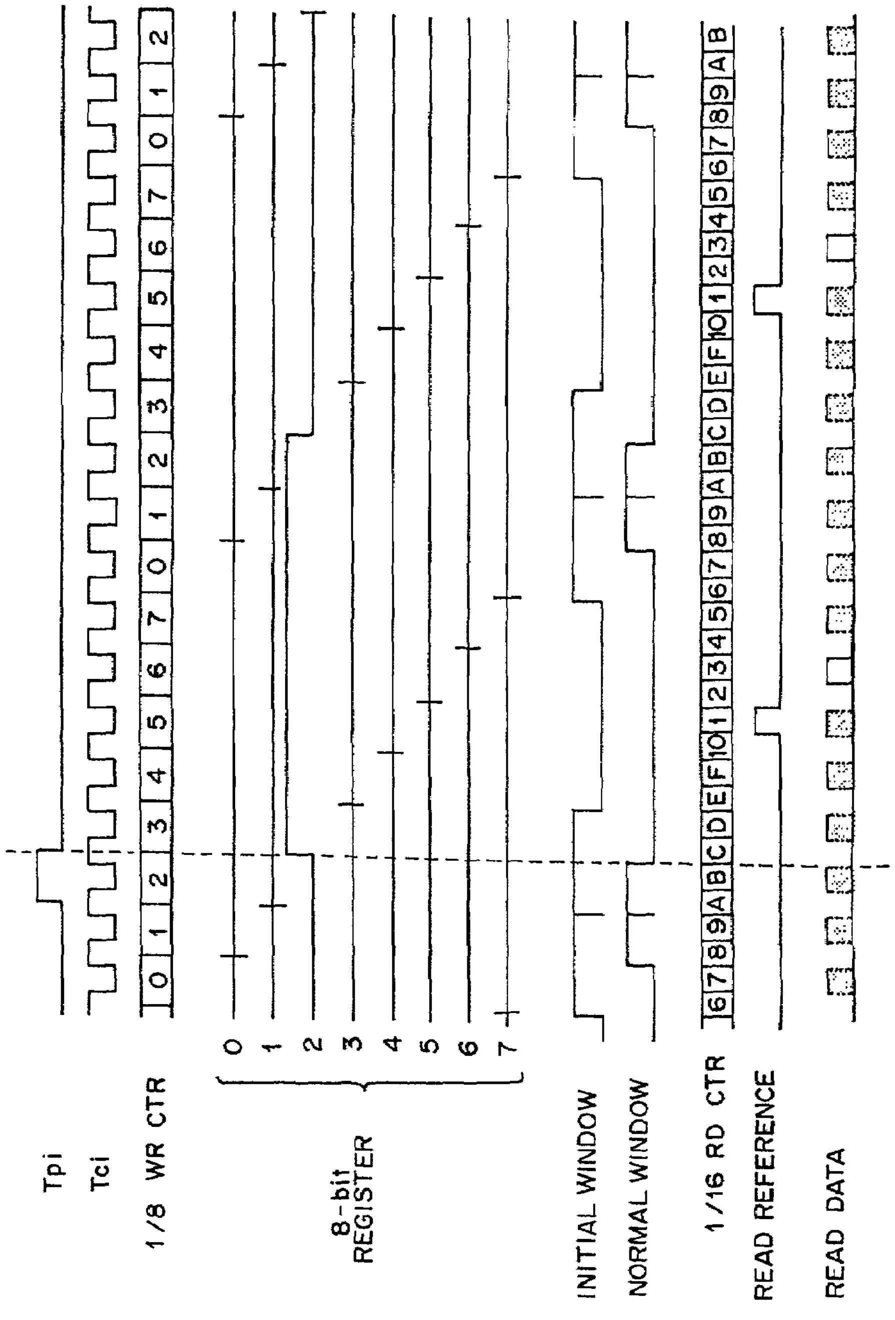
FIG. 21 is a time chart illustrating operation of an ES section shown in FIG. 18.

Consequently, as seen in FIG. 21, the data (38 MTP: data indicated by screening) are successively read out from the register 513 in accordance with the read addresses associated in such a manner as given in Table 1 above whereas data "0 (L)" (data any other than the data indicated by screening) is read out from each of the non-used read addresses which are not associated, whereby re-clocking from the 38 MTP to the 78 MTP is performed.

In short, the ES section 51A described above reads out, after it stores the inter-unit synchronizing timing (38 MTP) described above, the 38 MTP timing based on the intra-apparatus RCK (78 MCK) to synchronize the 38 MTP timing with the intra-apparatus reference frame timing (78 MTP).

In the PC section 51B, the differentiation circuit 516 differentiates the output (enable pulse) of the write counter 512 with the 78 MHz clock produced by the VCXO 34-1 to detect an edge of the enable pulse. The window counter 518 is loaded at the edge detection timing (window trigger).

The AND circuit 517 validates/invalidates the window trigger described above. In particular, if excessive approaching [a memory slip state (slip error)] of the write phase and the readout phase is detected by the PC 521, or after the apparatus is started up (power-on-reset), the window trigger is validated to re-load the window counter 518 (to re-start the window counter 518), but in any other case, the window trigger is masked to allow the window counter 518 to run freely.

Figure 20:
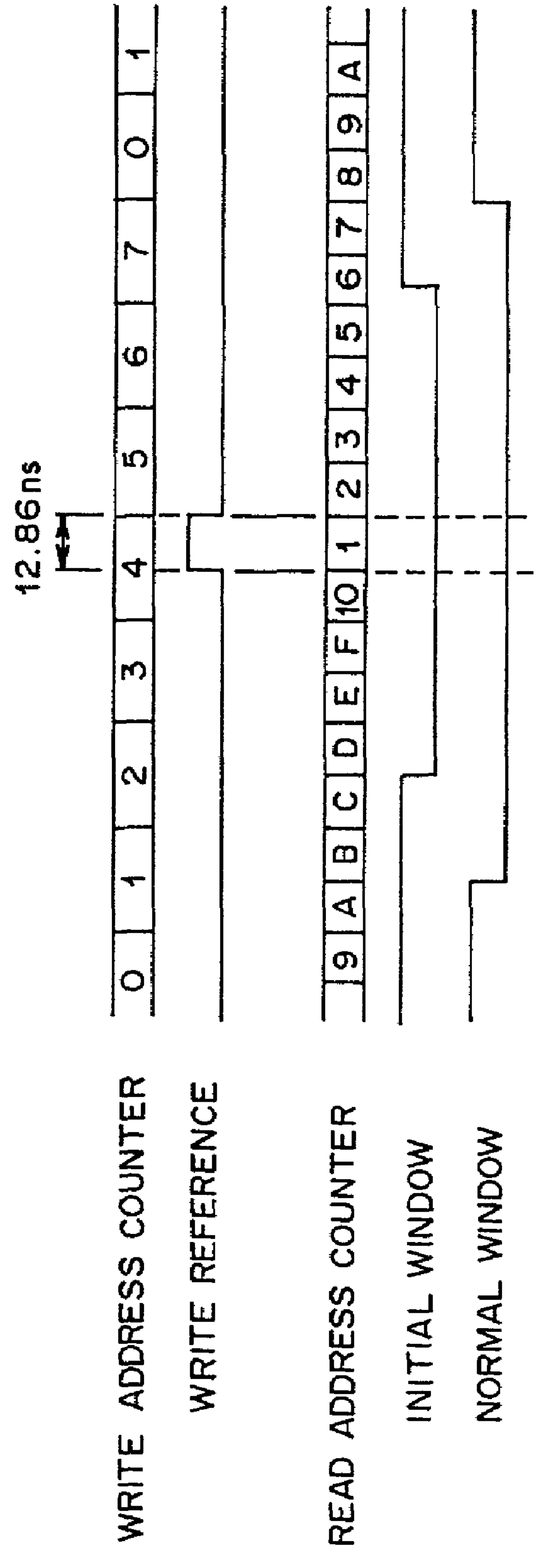
FIG. 20 is a time chart illustrating phase supervision by a phase comparison (PC) section shown in FIG. 18.

The window counter 518 is a 1/16 dividing free-running counter which starts its free-running in response to the window trigger described above, and produces such an initial window pulse for supervising the relationship between the write phase and the readout phase described hereinabove and an ordinary (normal) window pulse longer than the period of the initial window pulse as shown in FIG. 20.

It is to be noted that, where the count value of the window counter 518 ranges from 1 to 16, each time the count value "7" is decoded, the multiplexing section 514 is loaded so that it operates with a period displaced by one half period of operation of the window counter 518 thereby to displace the write phase and the readout phase for the register 513 by one half period from each other. Accordingly, if a slip error occurs, then in the present embodiment, if only the counting operation of the window counter 518 is controlled, then collision of the write/readout timings is prevented.

The window selector 519 selects one of the window pulses (a window pulse is hereinafter referred to simply as "window") produced by the window counter 518. When the apparatus is started up (until the reference RCK (78 MCK) from the VCXO 34-1 is stabilized) or when a slip error occurs, in order to strictly perform the phase supervision, the initial window of the shorter period is selected, but if the phase supervision with the initial window does not detect occurrence of a slip error continuously for a predetermined time, then the normal window of the supervision period longer than that of the initial window is selected.

Consequently, a margin can be provided to the phase supervision by a PC section 82, and frequent occurrences of variation of the TP period by re-starting (hereinafter described) of a window counter 823 when a slip error occurs can be suppressed. It is to be noted that window changeover described above is performed by the window timer section 51C.

The 8-bit shift circuit 520 shifts the output (write enable pulse) of the differentiation circuit 516 described above by 8 bits to adjust the phase comparison timing with the window by the PC 521. The PC 521 compares the phase of the write enable pulse described above with the phase of the window selected by the window selector 519 to supervise whether or not the write enable pulse partially overlaps with an edge of the window. If the write enable pulse partially overlaps with an edge of the window, then the PC 521 determines this as a memory slip state and generates a slip error.

If a slip error is generated, then the window counter 518 is re-started so that the readout phase by the read counter 515 is returned to its normal position (timing). At this time, the window selector 519 is controlled by the window timer section 51C so that it selects the initial window, and the phase supervision with the initial window is started.

In the window timer section 51C, the 1 ms/100 ms counter 522 [supervision (internal) timer] counts the phase supervision period (1 ms/100 ms) with the initial window. It is to be noted that the 1 ms/100 ms counter 522 is re-started if a slip error is detected by the PC 521.

The selector 523 selects one of the phase supervision periods (1 ms/100 ms) produced by the window timer section 51C in accordance with a setting ("TIMERSEL") from the microcomputer 6 (microcomputer I/F section 32-11). The external timing counter (external timer) 524 counts the phase supervision period with an arbitrary initial window other than 1 ms/100 ms given above. The supervision period of the external timing counter 524 is set suitably with an external setting signal ("EXTTP") from the microcomputer 6 (microcomputer I/F section 32-11).

The selector 525 selects one of the supervision period produced by the external timer 524 and the supervision period (1 ms/100 ms) selected by the selector 523 in accordance with a setting ("EXTPSEL") from the microcomputer 6 (microcomputer E/F section 32-11).

In short, the window timer section 51C in the present embodiment can select (set) the phase supervision period (timer period) with the initial window by the PC 521 suitably from among 1 ms, 100 ms and an external setting. An example of such setting is given in Table 2 below.

TABLE 2

Timer Setting Table

| TIMERCEL (External Setting) | EXTTPSEL (External Setting) | Supervision Period |
|---|---|---|
| 0 | 1 | 100 msec |
| 1 | | 1 msec |
| * | 0 | External Timer (External pin: EXTTP |

The window selection signal production circuit 526 supervises whether or not a slip error is detected by the PC 521 within the timer period selected finally by the selector 525 described above. If the timer period elapses without detection of a slip error within the timer period, then the window selection signal production circuit 526 produces a changeover signal for causing the window selector 519 to select the normal window. It is to be noted, however, that, if a slip error is detected by the PC 521, then irrespective of whether or not the detection of the slip error is within the timer period, the window selection signal production circuit 526 produces a changeover signal for causing the window selector 519 to select the initial window.

Figure 22A:
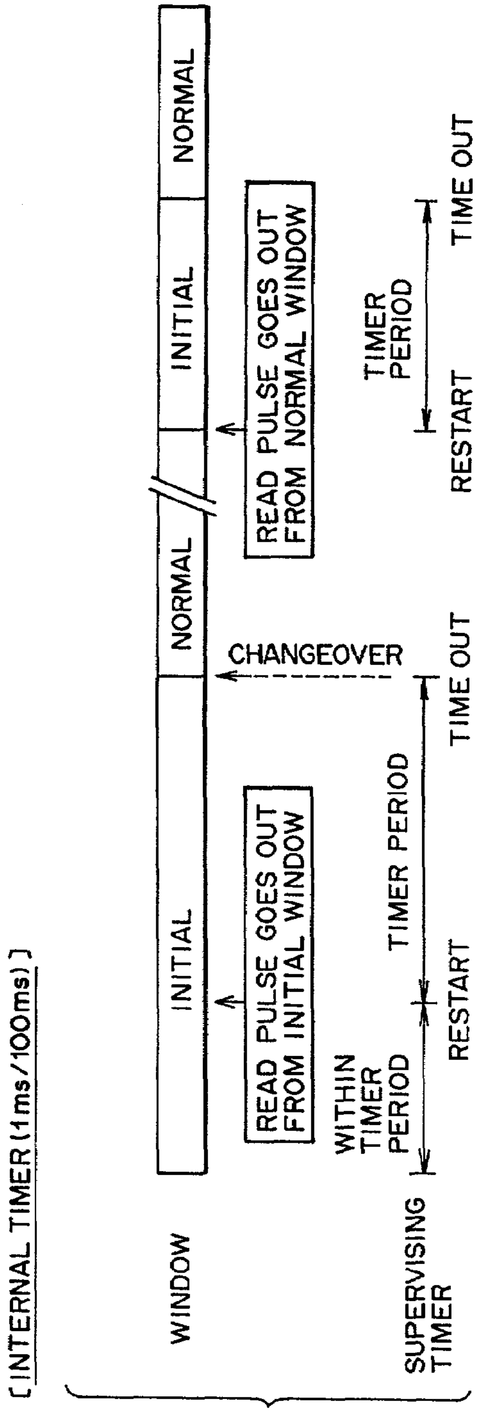
FIGS. 22A and 22B are time charts illustrating window changeover operation of a window timer section shown in FIG. 18.
Figure 22B:
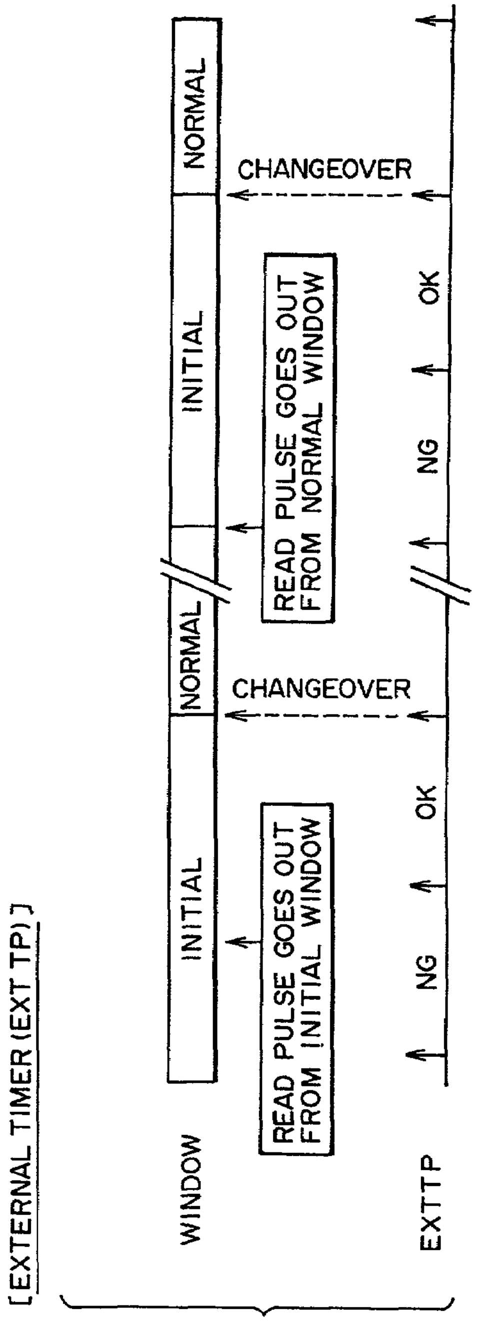

Consequently, for example, as shown in FIGS. 22A and 22B, if the read enable pulse is displaced from a window and a slip error occurs during phase supervision with the initial window or the normal window, then the initial window is selected to perform phase supervision with the initial window, and if a slip error does not occur within the timer period during the phase supervision with the initial window and the timer period elapses, then changeover from the initial window to the normal window is performed and phase supervision with the normal window is performed.

In FIG. 22B, however, if the read enable pulse is not displaced from the window within a sampling period from ↑ to next ↑ of EXTTP, then changeover to the initial window is performed, and therefore, actually the changeover time for a window is the maximum timer period×2. It is to be noted that changeover to the initial window is performed not only when a slip error occurs as described above, but also when the apparatus is started up (upon power-on-resetting). Further, the changeover of a window is performed, for example, when the write address of the write counter 512 is 0.

In the phase difference detection section 51D, the differentiation circuit 527 differentiates the 38 MTP latched in the FF circuit 511 of the ES section 51A with the 78 MHz clock produced by the VCXO 34-1 of the main PLL circuit 34 to detect an edge of the 38 MTP. The offset counter/latch section 528 starts its 1/32 dividing counting operation at the edge detection timing, and loads the count value as a detected offset value (phase difference) into the frame production counter 529. The offset counter/latch section 528 operates in the following manner.

① While phase supervision with the initial window is performed by the PC section 51B, since it is considered that the readout phase described above for the ES section 51A is not stabilized as yet, the count value at the time is latched with the 78 MTP after the timing re-clocking by the ES section 51A for each period (each frame) and is loaded into the TP production counter section 51E.

② While phase supervision with the normal window is performed by the PC section 51B, since it is considered that the readout phase described above is stabilized to some degree, the count value latched lastly during the phase supervision with the initial window is loaded into the frame production counter 529 for each frame.

Consequently, the frame production counter 529 normally starts its counting from the offset value (phase difference) detected by the offset counter/latch section 528, and therefore, if a pulse when the count value "9,719" of the frame production counter 529 is decoded by the decoder 530 is outputted after it is delayed by one bit by the FF circuit 531, then the frame timing pulse is outputted at the timing of the count value "0". In short, the frame timing is outputted at a time prior by the offset value, and consequently, a phase difference of the frame timing after it passes the ES section 51A is absorbed.

Figure 19:
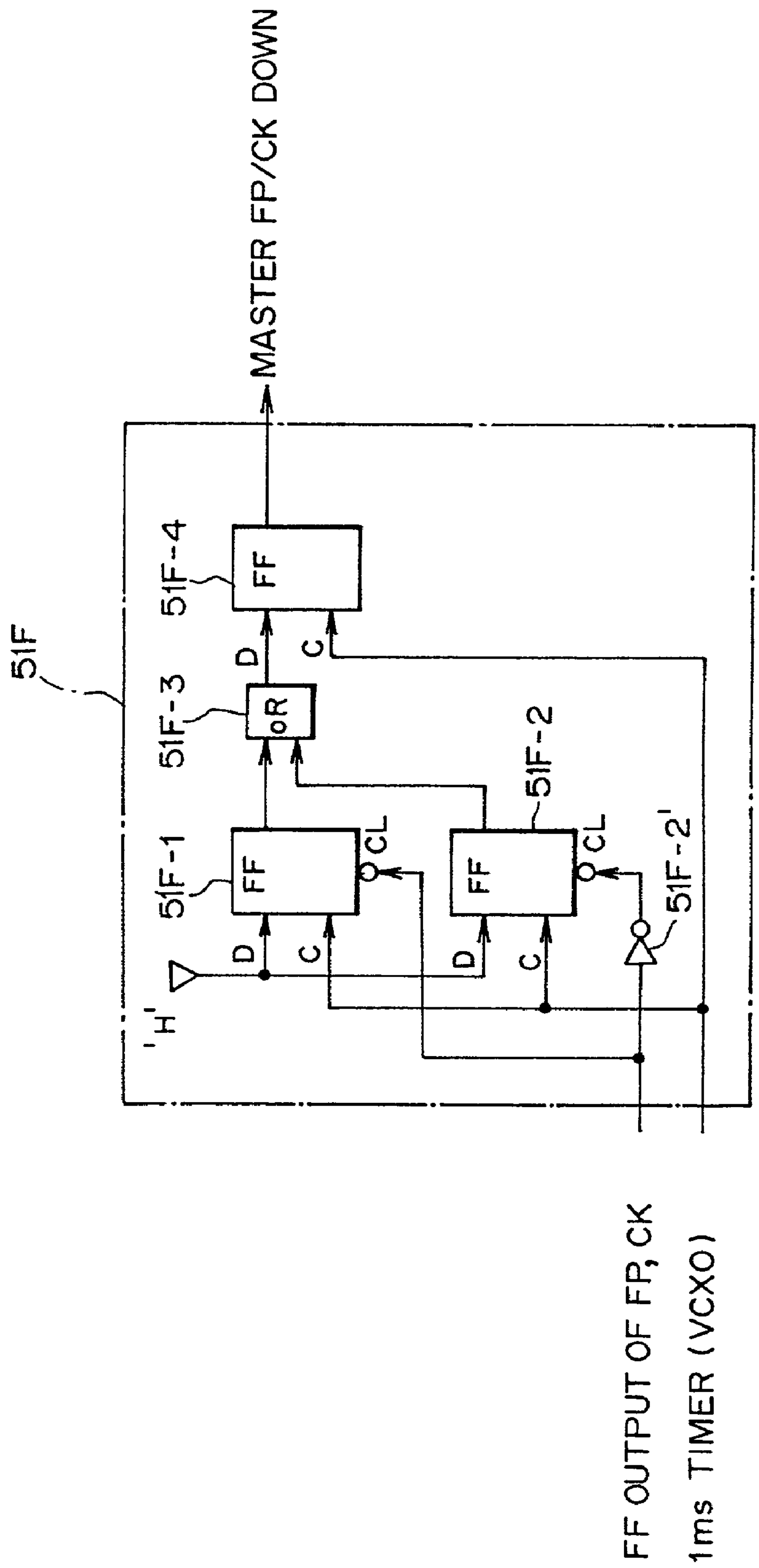
FIG. 19 is a block diagram showing a detailed configuration of a clock interruption detection circuit shown in FIGS. 10 and 18.

It is to be noted that, in FIG. 18, the clock interruption detection section 51F detects clock interruption of the 38 MCK pulled in from the work (protection) unit 3A (3B) and has, as shown in FIG. 19, a circuit configuration which uses FF circuits 51F-1, 51F-2 and 51F-4, an invertor 51F-2' and an OR circuit 51F-3 similar to that of the clock interruption detection circuit 320 (refer to FIG. 3) of the clock interruption detection sections 32-8-1 and 32-8-2 (refer to FIG. 2) of the RCK selector circuit 32-8 described hereinabove. If clock interruption is detected by the clock interruption detection section 51F, then this is reported to the microcomputer 6 through the microcomputer I/F section 32-11.

In the clock phase protection section 51 of the protection unit 3B side having such a configuration as described above, the inter-unit synchronizing timing pulse (Tpi: 38 MTP) of 8 kHz from the work unit 3A is written into the register 513 in an eightfold period of the 38.88 Mbps timing by writing the inter-unit synchronizing clock (Tci: 38 MCK) of 38.8

MHz inputted together with the 38 MTP in accordance with the write enable pulse from the write counter 512.

On the other hand, the data (38 MTP) written in the register 513 are read out in accordance with read enable pulses [eight enable pulses outputted with every other read addresses (refer to Table 1 given hereinabove)] obtained by division of the reference RCK of the 78 MHz produced by the VCXO 34-1 into 1/16 by means of the read counter 515, and are multiplexed by the multiplexing section 514. As a result, re-clocking of the timing from the 38 MTP to the 78 MTP is performed.

Figure 23:
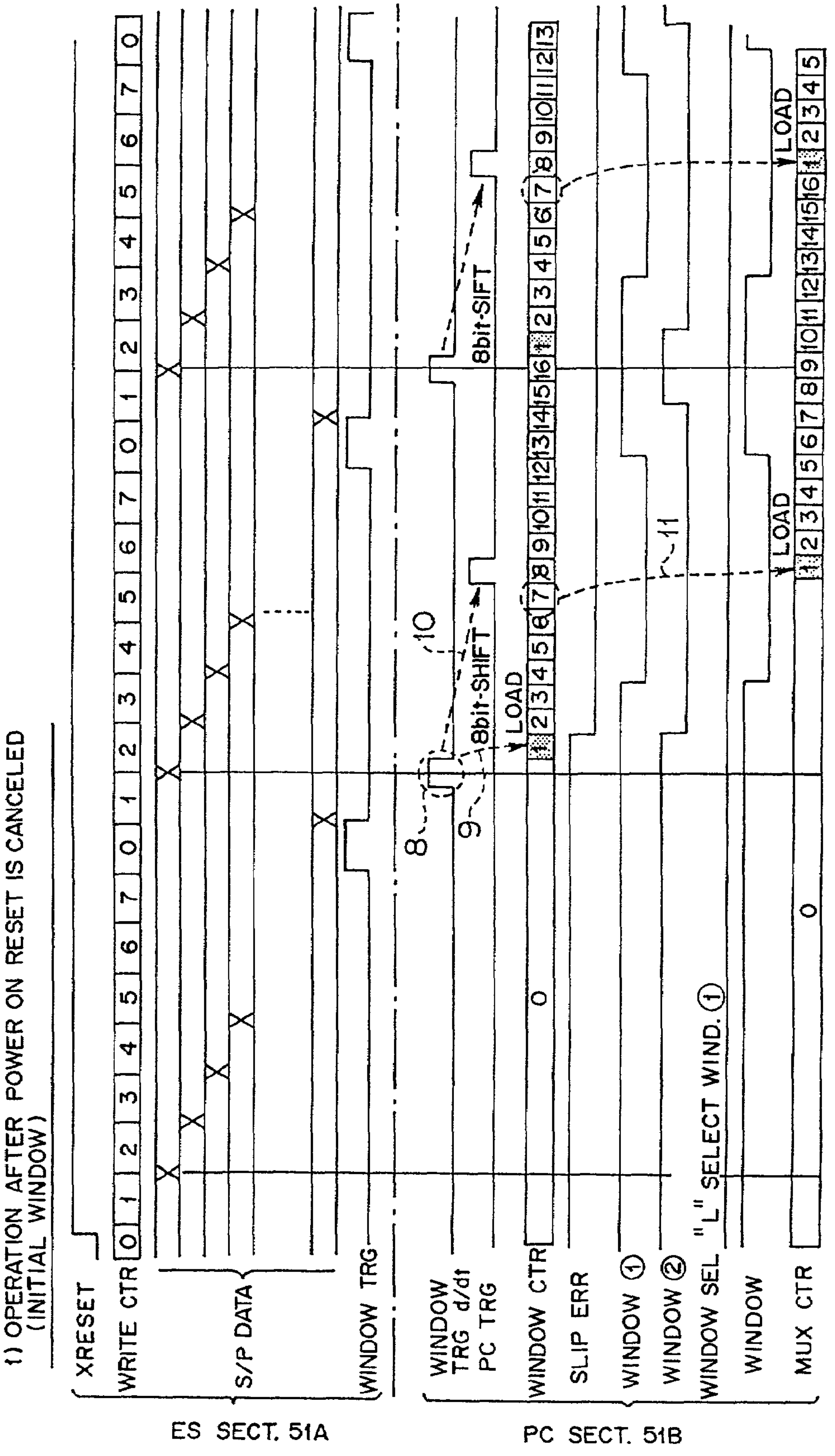
FIG. 23 is a time chart illustrating operation (after power-on resetting is cancelled) of the ES section and the PC section shown in FIG. 18.

At this time, in the PC section 51B, supervision of the phase difference is performed by the PC 521 using the window described above so that the write phase and the readout phase described hereinabove do not overlap with other. For example, after power-on resetting is canceled, the PC section 51B operates in such a manner as seen in FIG. 23.

In particular, the window counter 518 is loaded (refer to a broken line arrow mark 9) using a differentiation signal (refer to reference numeral 8) of the write enable pulse of the write counter 512 as a trigger and the counting operation of the window counter 518 is started (free-running). Meanwhile, the write enable pulse described above is shifted by 8 bits (refer to a broken line arrow mark 10) by the 8-bit shift circuit 520, and phase comparison between the write enable pulse (PC trigger) after the 8-bit shift and the initial window is performed by the PC 521.

At this time, if readout is performed at a timing at which the PC trigger is positioned at the center of the initial window, then since the write phase and the readout phase have a normal phase relationship (wherein they are displaced by one half period from each other), the multiplexing section 514 is loaded at a point of time when the count value of the window counter 518 becomes "7" (refer to a broken line arrow mark 11).

Figure 24:
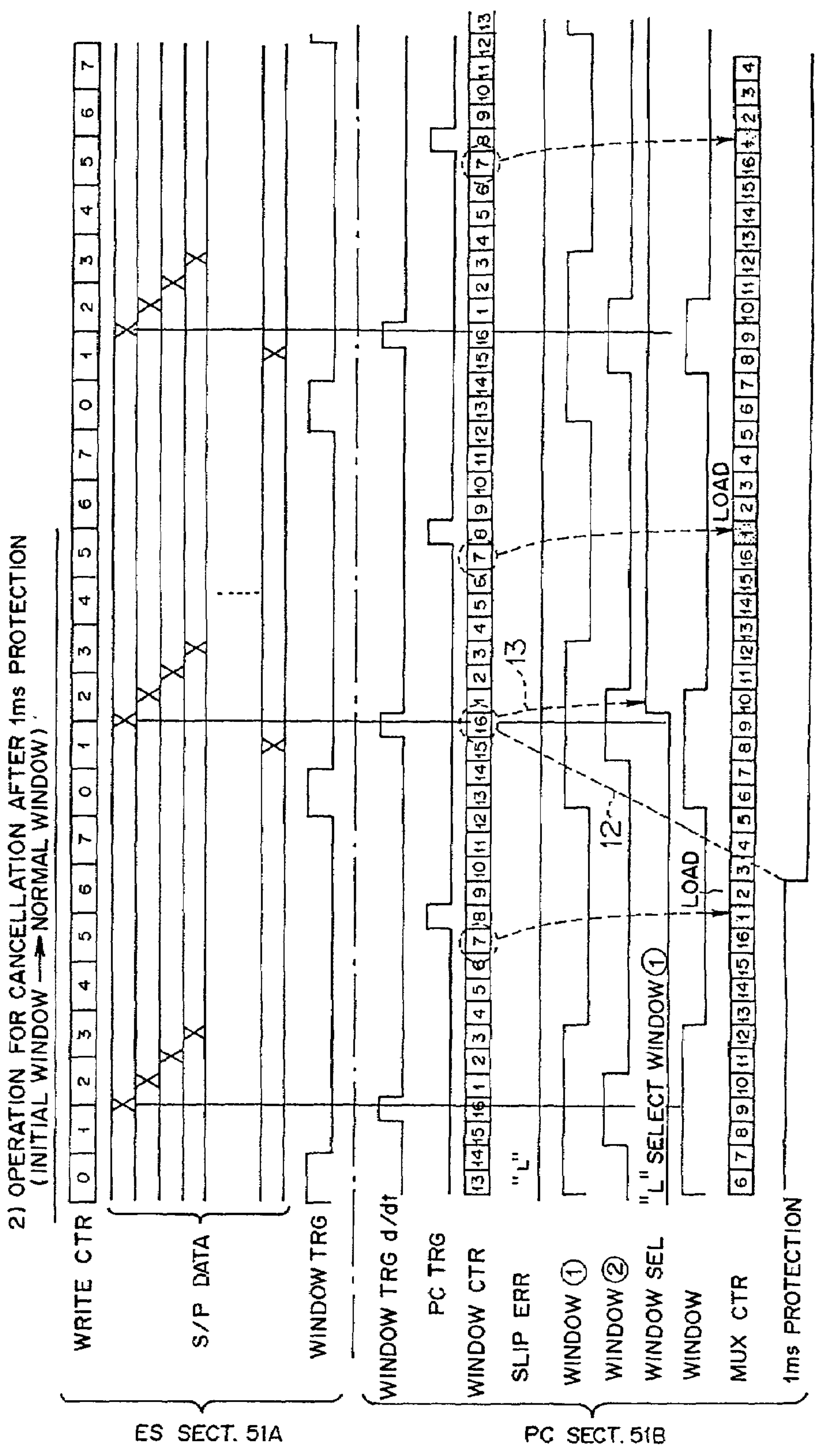
FIG. 24 is a time chart illustrating operation (after timeout of a supervising timer) of the ES section and the PC section shown in FIG. 18.

Thereafter, unless the PC trigger does not go out of the window, the window counter 518 and the selector 525 continue their free-running. Then, if a time-out (in FIG. 24, the timer period=1 ms) of the supervising timer 522 of the window timer section 51C occurs while the PC trigger does not goes out of the initial window during phase supervision with the initial window, then the window changeover signal is supplied to the window selector 519 at a position at which the count value of the window counter 518 is "0" (in FIG. 24, at the position of "1" because the count value ranges from 1 to 16) so that window changeover from the initial window to the normal window is performed by the window selector 519 (refer to broken line arrow marks 12 and 13).

Figure 25:
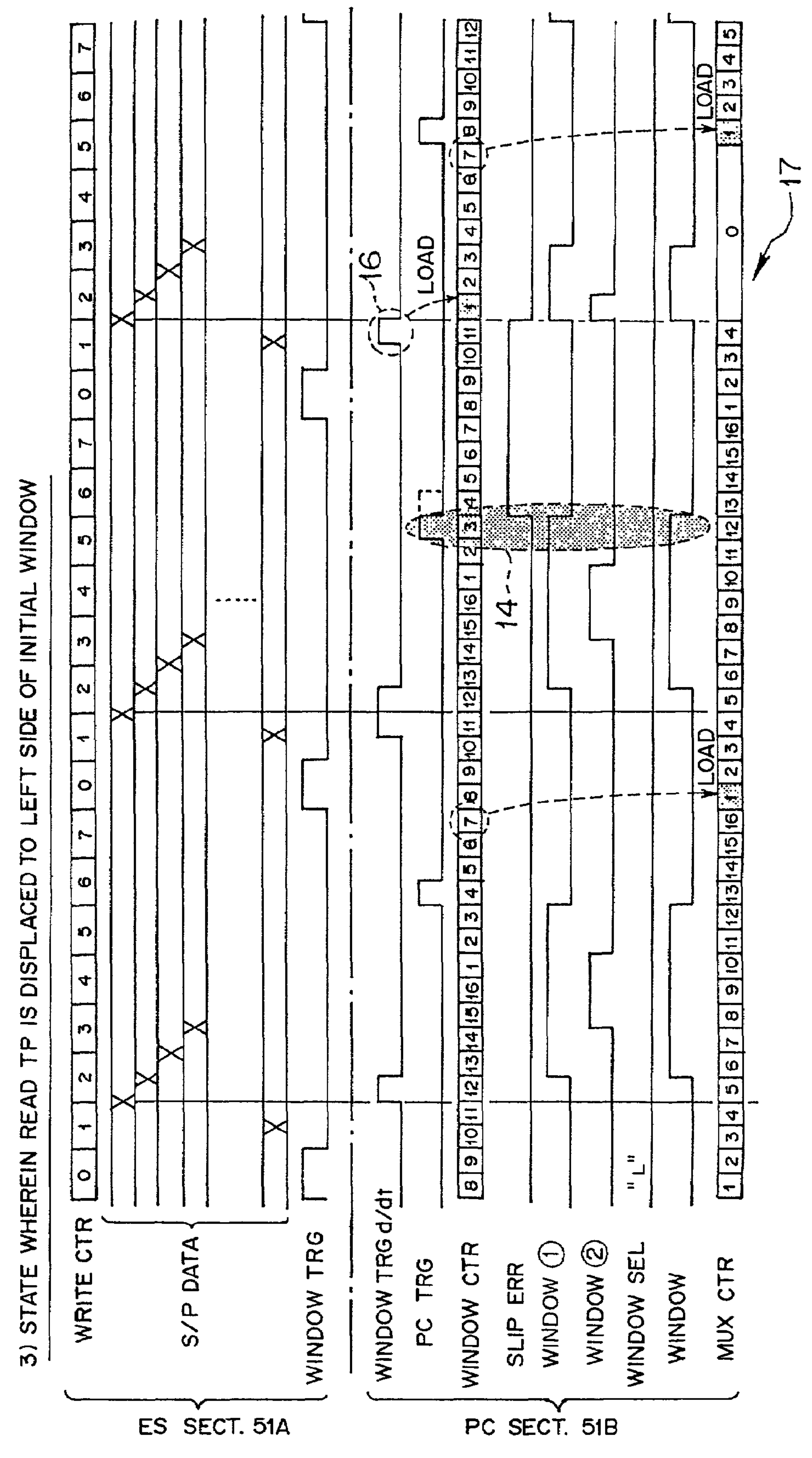
FIG. 25 is a time chart illustrating operation of the ES section and the PC section shown in FIG. 18 (when a readout TP is displaced to the left side of an initial window)
Figure 26:
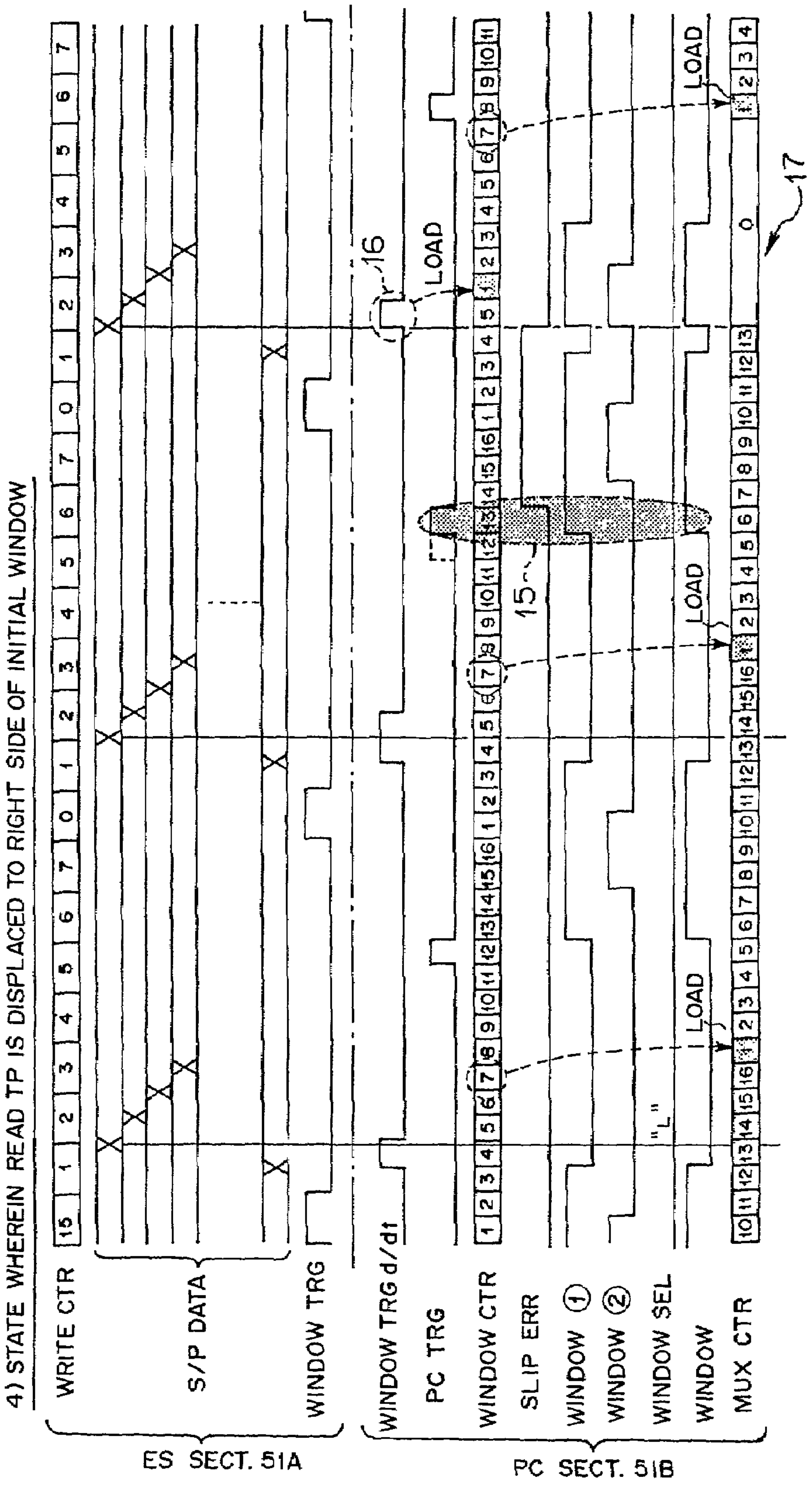
FIG. 26 is a time chart illustrating operation of the ES section and the PC section shown in FIG. 18 (when the readout TP is displaced to the right side of the initial window)

On the other hand, if the PC trigger is displaced to the left side of the initial window as denoted by a screened portion 14 in FIG. 25 or displaced to the right side of the initial window as denoted by a screened portion 15 in FIG. 26 during phase supervision with the initial window, then in either case, the slip error signal exhibits the H level, and the window counter 518 is re-loaded in response to the differentiation signal (refer to reference numeral 16) of the write enable pulse of the write counter 512 to re-establish the initial window and also the read counter 515 is set to its initial state (refer to reference numeral 17).

Figure 27:
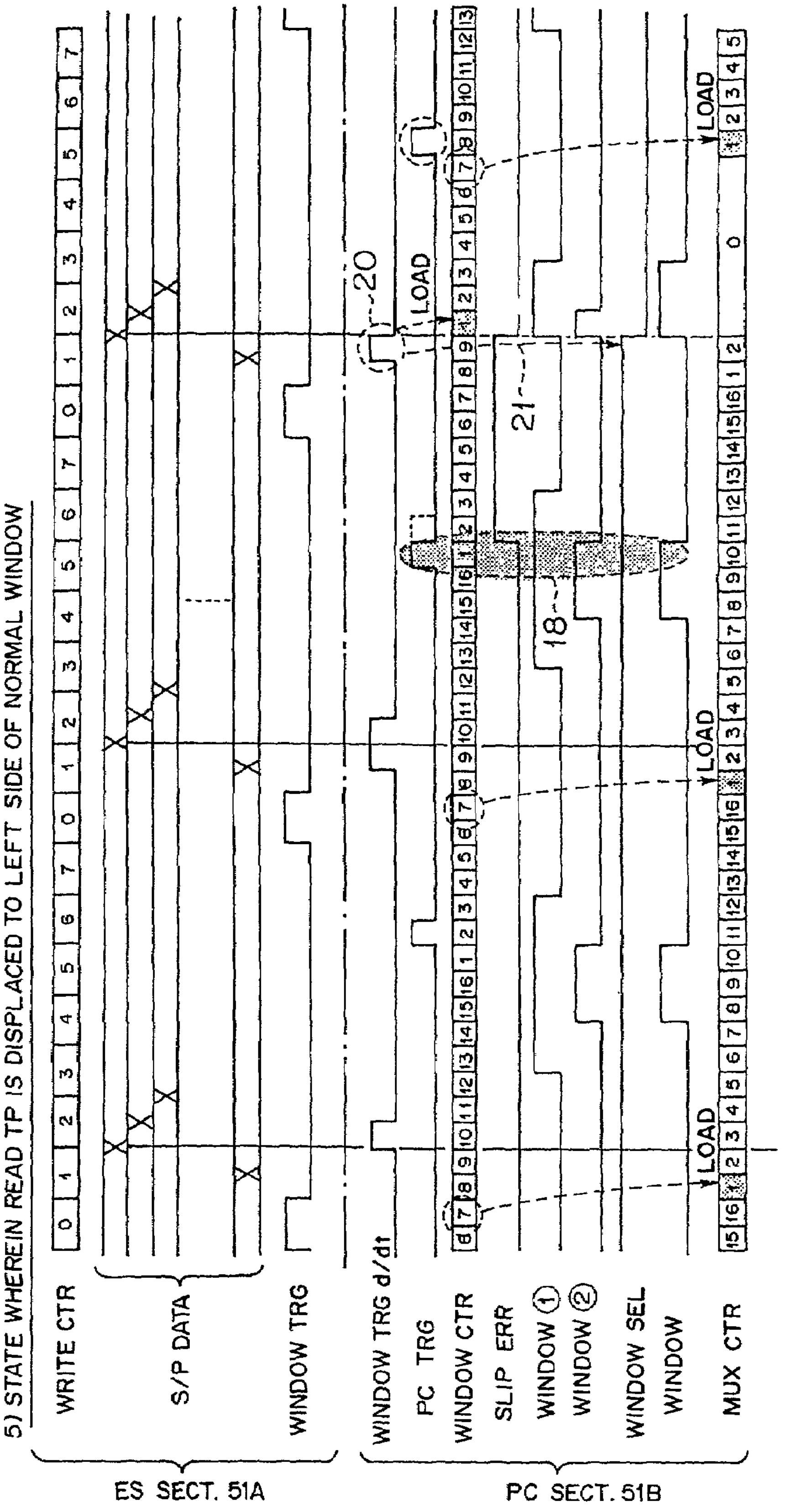
FIG. 27 is a time chart illustrating operation of the ES section and the PC section shown in FIG. 18 (when the readout TP is displaced to the left side of a normal window)
Figure 28:
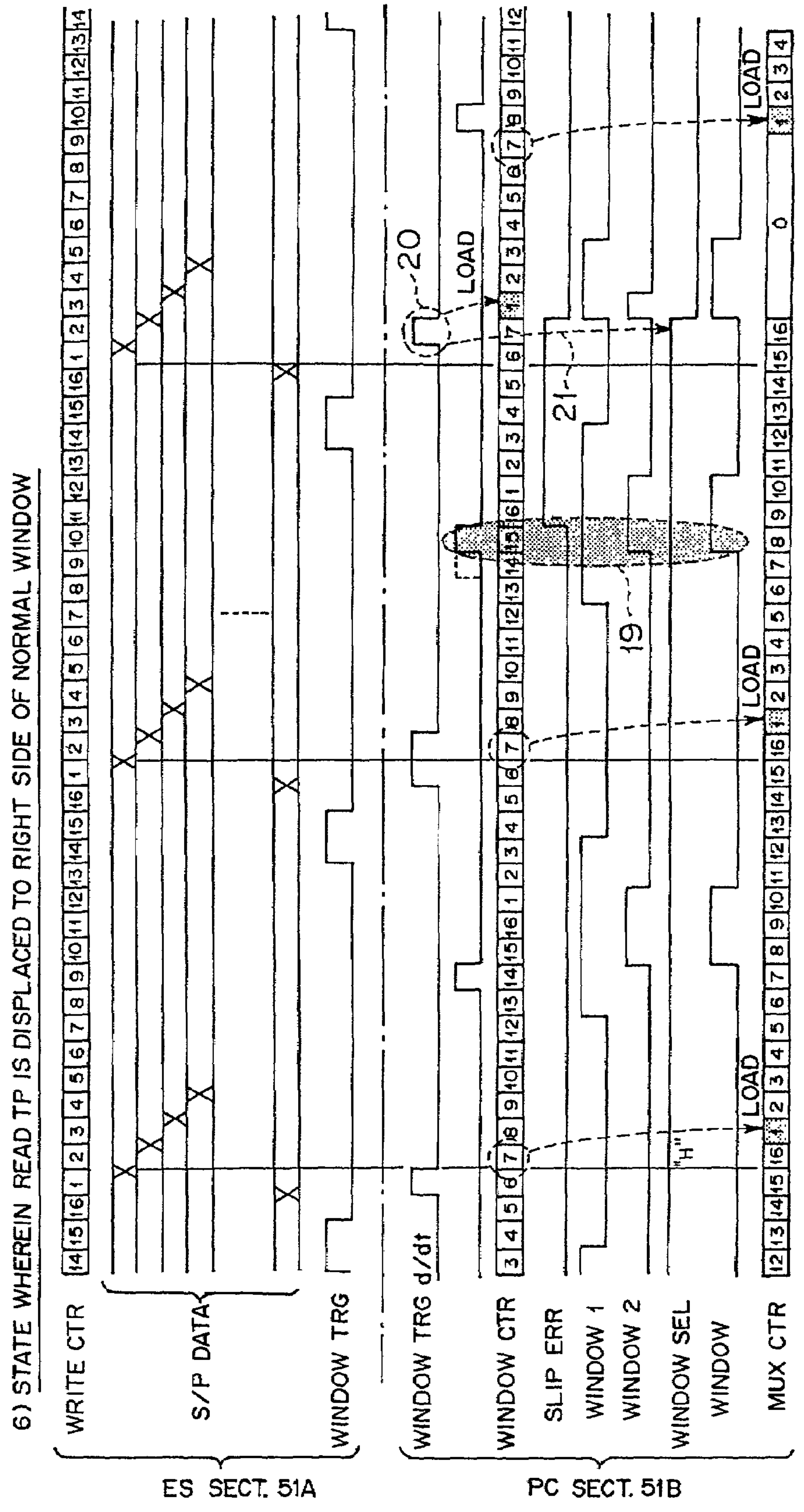
FIG. 28 is a time chart illustrating operation of the ES section and the PC section shown in FIG. 18 (when the readout TP is displaced to the right side of the normal window)

Further, if the PC trigger is displaced to the left side of the initial window as denoted by a screened portion 18 in FIG. 27 or displaced to the right side of the initial window as denoted by a screened portion 19 in FIG. 28 during phase supervision with the normal window, then in either case, the slip error signal exhibits the H level, and the window counter 518 is re-loaded in response to the differentiation signal (refer to reference numeral 20) of the next write enable pulse of the write counter 512 and the window is changed over to the initial window (refer to reference numeral 21).

Each time an excessive approach (slip error) between the write phase and the readout phase is detected, the window counter 518 is re-started to return the readout phase to its appropriate position and phase supervision with the initial window is performed in such a manner as described above.

By the way, when timing re-clocking by the ES section 51A is performed in such a manner as described above, a phase difference (offset value) between the inputted 38 MTP and the 78 MTP after it passes the ES section 51A is detected by the phase difference detection section 51D.

Figure 29:
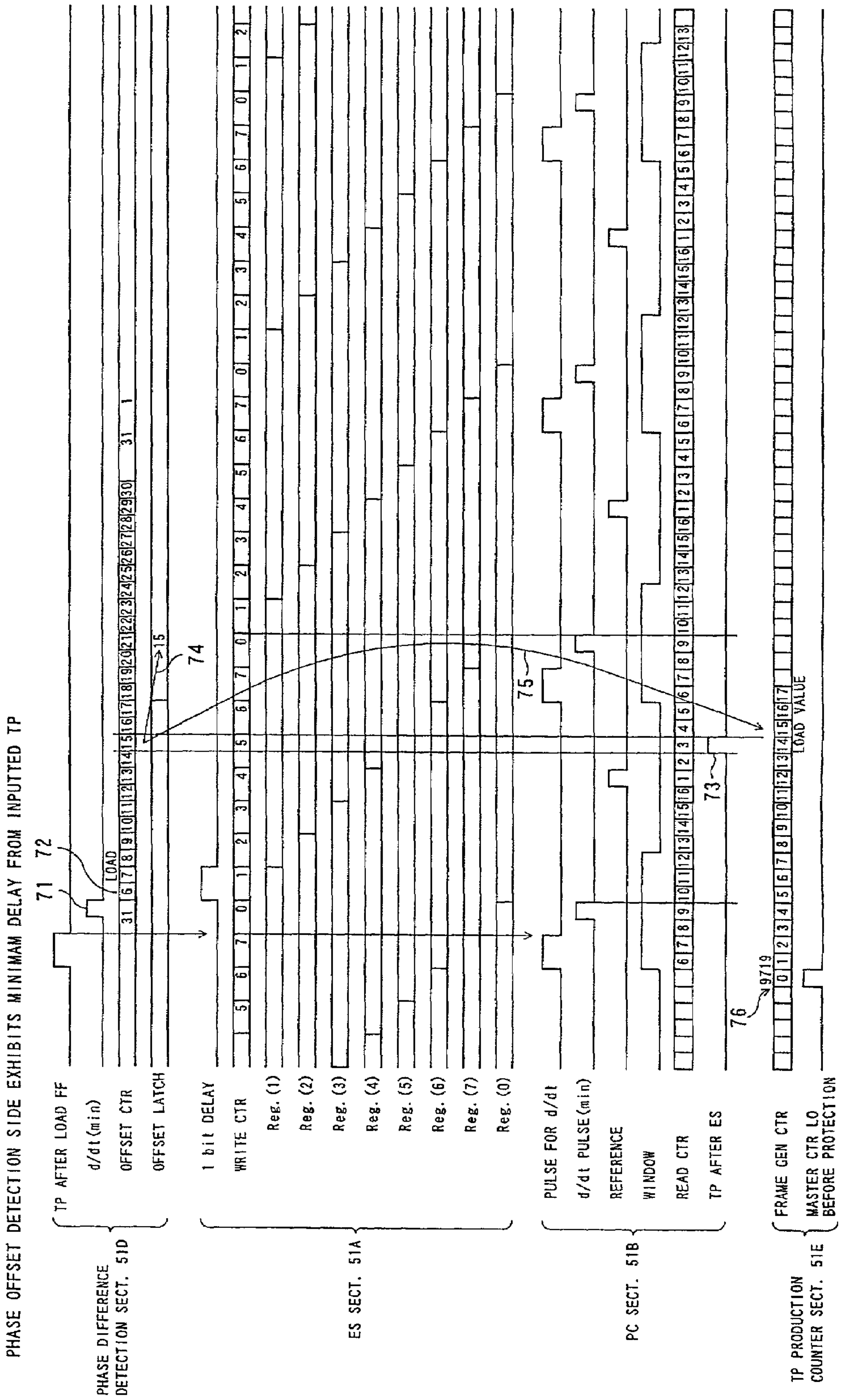
FIG. 29 is a time chart illustrating operation of the clock phase protection section shown in FIG. 18 (when the bit delay of the phase difference detection side is in the minimum)
Figure 30:
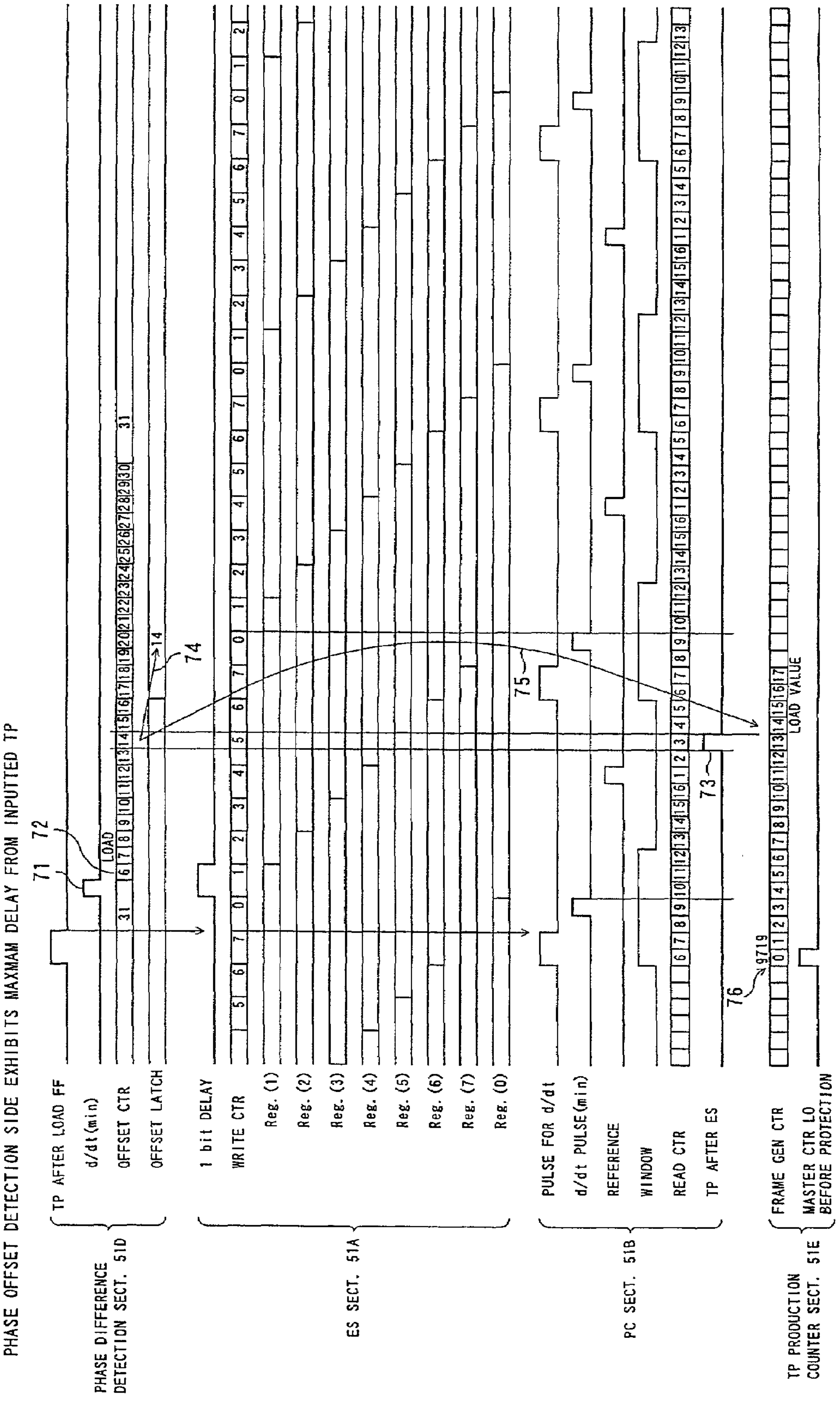
FIG. 30 is a time chart illustrating operation of the clock phase protection section shown in FIG. 18 (when the bit delay of the phase difference detection side is in the maximum)

In particular, for example, as shown in FIGS. 29 and 30, the offset counter/latch section 528 is loaded with the load value "6" (refer to an arrow mark 72) in response to a pulse (refer to reference numeral 71) obtained by differentiating the receive 38 MTP by the differentiation circuit 527 and starts its counting operation (free-running).

At this time, if phase supervision with the initial window is performed by the PC section 51B, then the offset counter/latch section 528 loads the count value then (in FIG. 29, the count value is "15" when the bit delay by phase difference detection is in the minimum, and in FIG. 30, the count value is "14" when the bit delay is in the maximum) with regard to the 78 MTP (refer to an arrow mark 73) re-clocked by the ES section 51A as a detected phase difference (offset value) into the frame production counter 529 (refer to an arrow mark 75) and latches the count value (refer to an arrow mark 74).

It is to be noted that the offset value latched then is loaded as an offset value during phase supervision with the normal window after changeover from the initial window to the normal window into the frame production counter 529 for each frame.

Then, the frame production counter 529 starts its counting from the loaded offset value, and each time the decoder 530 decodes the count value "9,719" of the frame production counter 529, the TP is delayed by one bit by the FF circuit 531 and outputted. Consequently, the 78 MTP after the timing re-clocking by the ES section 51A is outputted at a timing preceding by the latched offset value (refer to an arrow mark 76). As a result, a phase difference between the 8 kH frame timings before and after passage through the ES section 51A (before and after the timing re-clocking).

It is to be noted that, if the 78 MTP after the timing re-clocking by the ES section 51A is displaced from the normal timing, then the 78 MTP is produced and outputted at a wrong timing. However, since such three-frame protection by the frame phase protection section 52 in the following stage as described above is adopted, the 78 MTP is invalidated. Further, one-bit delay by the FF circuit 511 illustrated in FIGS. 29 and 30 is used to perform readout from the register 513 within a range within which the offset counter/latch section 528 of the phase difference detection section 51D is operating. Furthermore, also the clock phase protection section 51 of the work unit 3A side loads the inter-unit synchronizing timings (38 MTP and 38 MCK) from the protect unit 3B side and performs similar processing to that described above.

As described above, the clock phase protection section 51 of the protect unit 3B side can produce the 78 MTP of 8 kHz normally synchronized with a high degree of accuracy with the 8 kHz frame timing of the work unit 3A side based on the inter-unit synchronizing timing pulse (38 MTP) loaded from the MFT circuit 32-9 of the work unit 3A.

(D) Detailed Description of the MTPES Circuit 32-10

Figure 31:
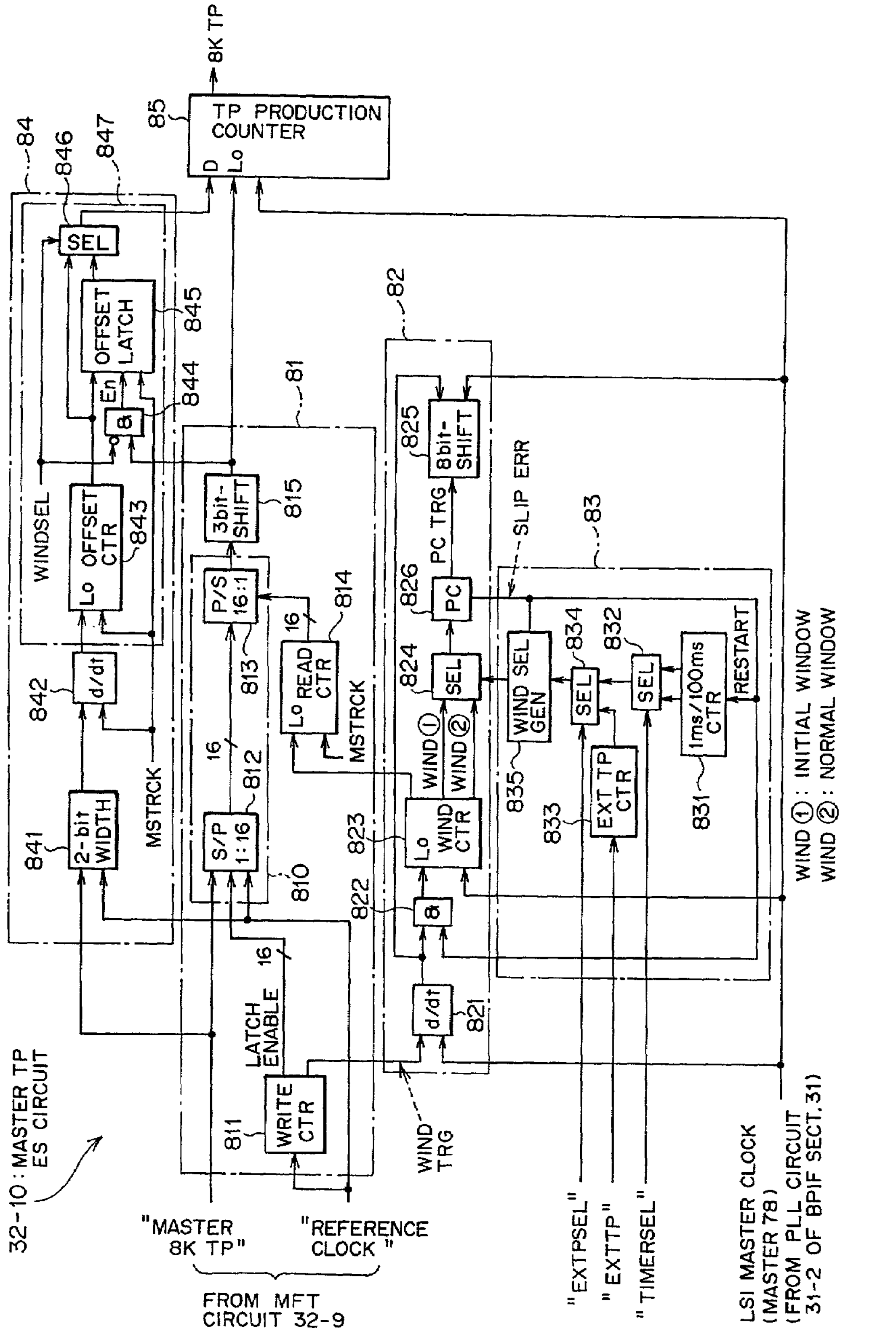
FIG. 31 is a block diagram showing a detailed configuration of a master timing pulse (MTP) ES circuit shown in FIG. 1.

FIG. 31 is a block diagram showing a detailed configuration of the MTPES circuit 32-10 described hereinabove. As shown in FIG. 31, the MTPES circuit 32-10 in the present embodiment has a configuration substantially similar to that of the clock phase protection section 51 described hereinabove. In particular, the MTPES circuit 32-10 includes an ES section (second memory section) 82, a phase comparison (PC) section 82, a window timer section 83, a phase difference detection section (second phase difference correction control section) 84 and a TP production counter section (second frame timing production counter section) 85.

While the clock phase protection section 51 described above is provided to synchronize the inter-unit synchronizing timing (38 MTP) with the 8 kHz frame timing (78 MTP) produced by the work unit 3A (or the protect unit 3B) side, the MTES circuit 32-10 is different only in that it is provided to synchronize the 8 kHz frame timing (78 MTP: denoted as Master 8K TP in FIG. 31) produced by the MFT circuit 32-9 with the master clock (LSI Master Clock (Master 78)) of 78 MHz produced by the PLL circuit 31-2 of the BPIF section 31.

To this end, the ES section 81 includes an ES circuit 810 composed of a serial/parallel (S/P) conversion circuit 812 and a parallel/serial (P/S) conversion circuit 813, a write counter (1/16 dividing counter) 811, a read counter (1/16 dividing counter) 812 and a 3-bit shift circuit 815. The PC section 82 includes a differentiation circuit 821, an AND circuit 822, a window counter 823, a window selector 824, an 8-bit shift circuit 825 and a phase comparator (PC) 826.

Further, the window timer section 83 includes a 1 ms/100 ms counter (supervising timer) 831, a pair of selectors 832 and 834, an external timing counter (external timer) 833 and a window selection signal production circuit 835. The phase difference detection section 84 includes a 2-bit width pulse decompression circuit 841, a differentiation circuit 842, an offset counter 843, a one-input negated AND circuit 844, an offset latch circuit 845 and an offset selector 846.

In the ES section 81, the write counter 811 divides the reference RCK of 78 MHz supplied thereto from the main PLL circuit 34-1 through the MFT circuit 32-9 into 1/16 to produce 16 write addresses (write enable pulses) for the S/P conversion circuit 812. The S/P conversion circuit 812 performs S/P conversion of the 8 kHz frame timing pulse (78 MTP) produced by the MFT circuit 32-9 at 1:16 in accordance with the write enable pulse from the write counter 811.

The read counter 814 is a 1/16 dividing counter which receives the master clock of 78 MHz described hereinabove and operates normally in synchronism with (subordinate to) the window counter 823 of the PC section 82 similarly to the read counter 515 of the clock phase protection section 51 described hereinabove. Also in this instance, the read counter 814 is loaded with, for example, the count value "7" of the window counter 823 and produces 16 read addresses (read enable pulses) with a phase displayed by one half period from that of the write counter 811 (in this instance, however, no unused address is involved).

Figure 32:
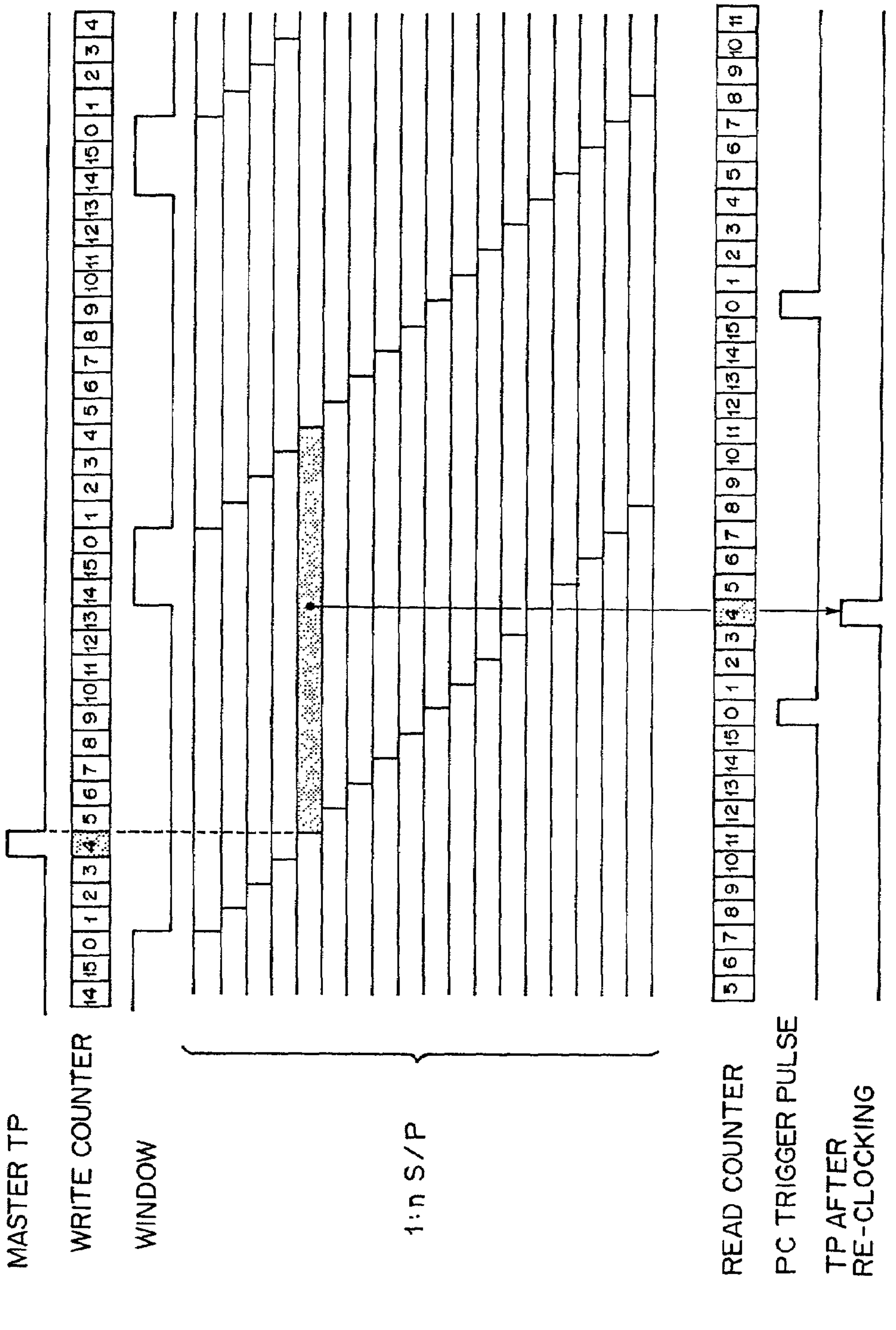
FIG. 32 is a time chart illustrating operation of an ES section shown in FIG. 31.

The P/S conversion circuit 813 performs P/S conversion of 16 parallel data (78 MTP) from the P/S conversion circuit 813 in accordance with the read address (read enable pulse) from the read counter 814 to multiplex the data. Consequently, timing re-clocking, for example, from the 8 kHz frame timing pulse (78 MTP) produced by the MFT circuit 32-9 to the 78 MHz master clock from the BPIF section 31 is performed as seen in FIG. 32. It is to be noted that the 3-bit shift circuit 815 shifts (delays) the 78 MTP after the P/S conversion by 3 bits.

In the phase difference detection section 84, the 2-bit width pulse decompression circuit 841 decompresses the 8 kHz frame timing (Master 8K TP: 1 bit width) described above from the MFT circuit 32-9 so as to have a 2-bit width so that the 8 kHz frame timing may be differentiated with the master clock (Master 78) from the BPIF section 31 by the differentiation circuit 842 in the following stage. The differentiation circuit 842 differentiates the 8 kHz frame timing (Master 8K TP) decompressed to the 2-bit width in this manner with the master clock (Master 78) to obtain a differentiation pulse (edge detection timing).

The offset counter 843 is a counter which is loaded in response to the differentiation pulse from the differentiation circuit 842 and freely runs with the master clock (Master 78) to detect a phase difference (offset value). The offset latch circuit 845 latches the count value (offset value) of the offset counter 843 with the 78 MTP after the timing re-clock shifted by 3 bits by the 3-bit shift circuit 815.

It is to be noted, however, that, also in this instance, this latching is performed only when phase supervision with the initial window is performed by the PC section 82, but when phase supervision with the normal window is performed, the latch enable pulse is masked by the AND circuit 844 and the offset value detected lastly by the phase supervision with the initial window is held.

The offset selector 846 selects one of the offset value detected by the offset counter 843 and the offset value latched in the offset latch circuit 845. More particularly, the offset selector 846 selects the offset value detected by the offset counter 843 when phase supervision with the initial window is performed by the PC section 82, but selects the offset value latched in the offset latch circuit 845 when phase supervision with the normal window is performed.

Consequently, during phase supervision with the initial window, the offset value detected by the offset counter 843 is loaded into the TP production counter section 85 for each period (each frame), but during phase supervision with the normal window, the offset value latched into the offset latch circuit 845 lastly in the phase supervision with the initial window is loaded into the TP production counter section 85 for each period.

In short, the offset counter 843, AND circuit 844, offset latch circuit 845 and offset selector 846 forms an offset counter/latch section 847 similar to the offset counter/latch section 528 of the phase difference detection section 51D of the clock phase protection section 51.

It is to be noted that the PC section 82 and the window timer section 83 are similar in configuration to the PC section 51B and the window timer section 51C, respectively, and therefore, detailed description of them is omitted. Also the TP production counter section 85 has a configuration similar to that of the TP production counter section 51E shown in FIG. 18.

Figure 33:
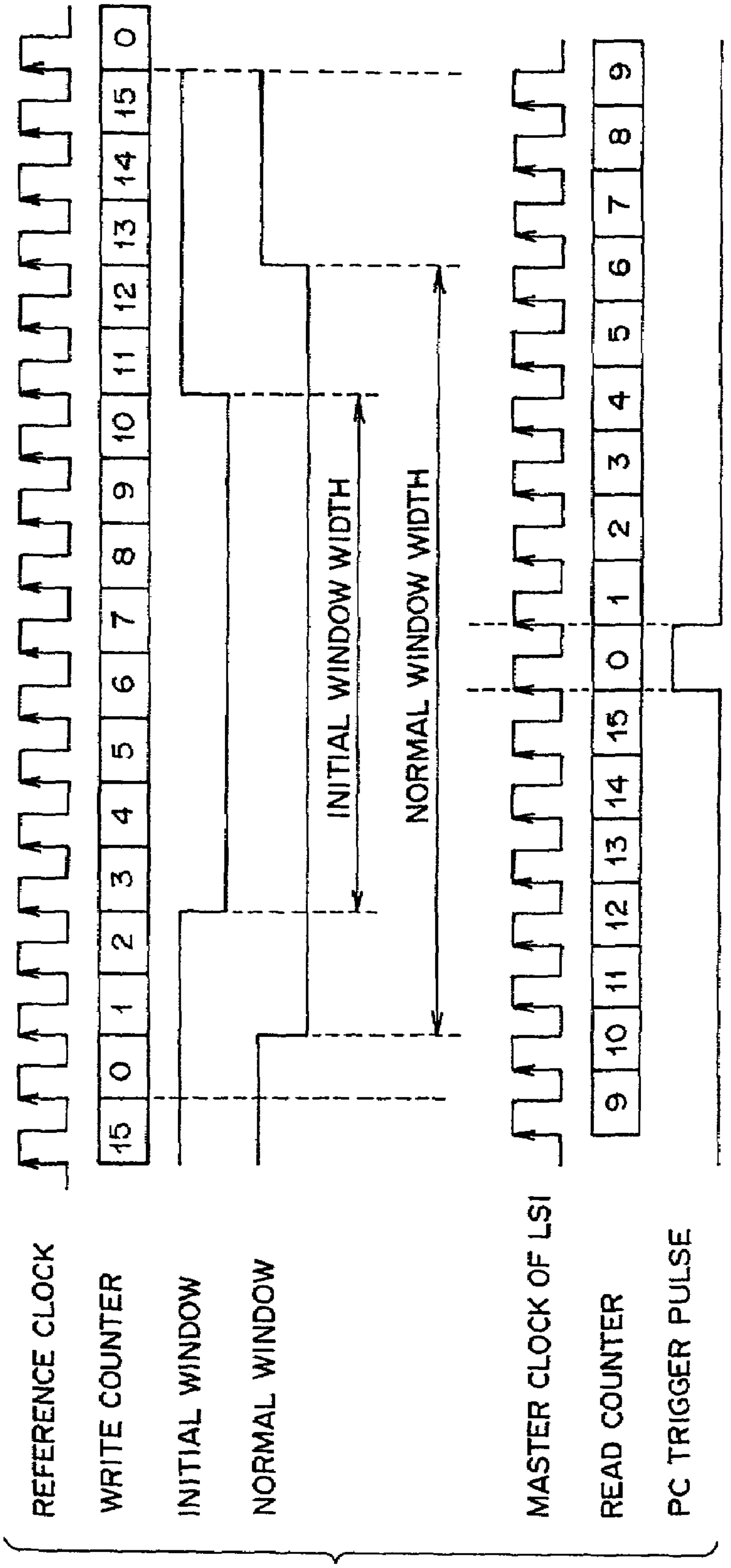
FIG. 33 is a time chart illustrating phase supervision by a phase comparison (PC) section shown in FIG. 31.

In the present MTPES circuit 32-10 having such a configuration as described above, the frame timing (78 MTP) of 8 kHz produced by the MFT circuit 32-9 is re-clocked to the master clock by the ES section 81. At this time, the relationship between the write phase and the readout phase of the 78 MTP into and from the ES section 81 is supervised and controlled (clock phase protected) using the windows described above similarly as in the PC section 51B of the clock phase protection section 51 (refer to FIG. 33).

It is to be noted that, also in this instance, when the apparatus is started up or when a slip error occurs, the PC section 82 uses the narrow supervision window (initial window) to supervise the phase strictly for a time until the clock frequency components of the apparatus are stabilized (until a timeout of the supervising timer 831 occurs), but after the clock frequency components of the apparatus are stabilized (when a timeout of the supervising timer 831 occurs), the PC section 82 uses the wide supervision window (normal window) to provide a margin to the phase supervision thereby to suppress frequent occurrences of a variation of the TP period by re-starting of the window counter 823 when a slip error occurs.

At this instance, the phase difference detection section 84 detects the phase difference of the 78 MTPs before and after the re-clocking by the ES section 81 and controls the counting operation (TP production period) of the TP production counter section 85 so that the phase difference may be reduced to zero. The control by the phase difference detection section 84 is performed similarly to the control by the phase difference detection section 51D described hereinabove with reference to FIGS. 29 and 30.

Figure 34:
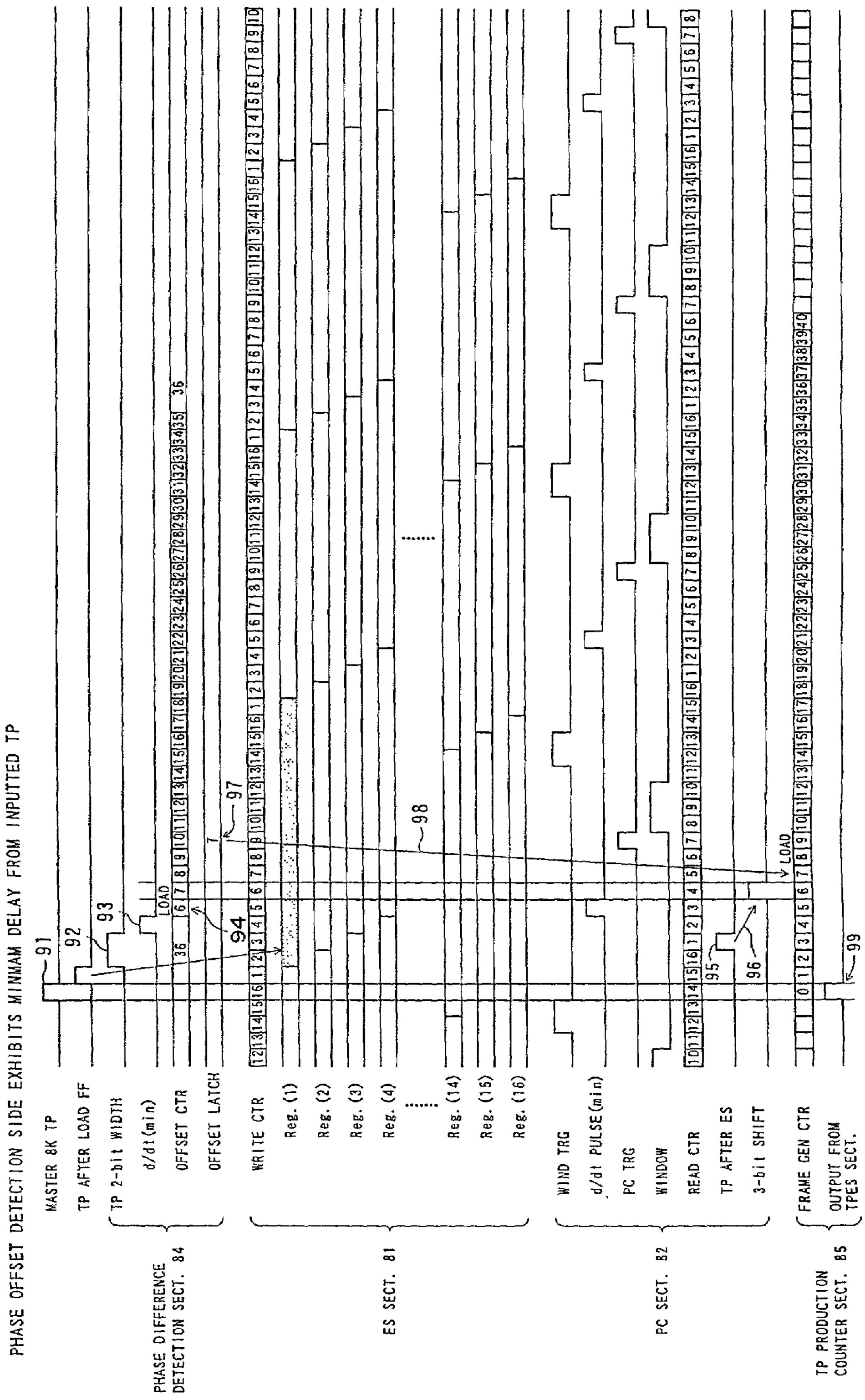
FIG. 34 is a time chart illustrating operation of the MTPES circuit shown in FIG. 31 (when the bit delay of the phase difference detection side is in the minimum)
Figure 35:
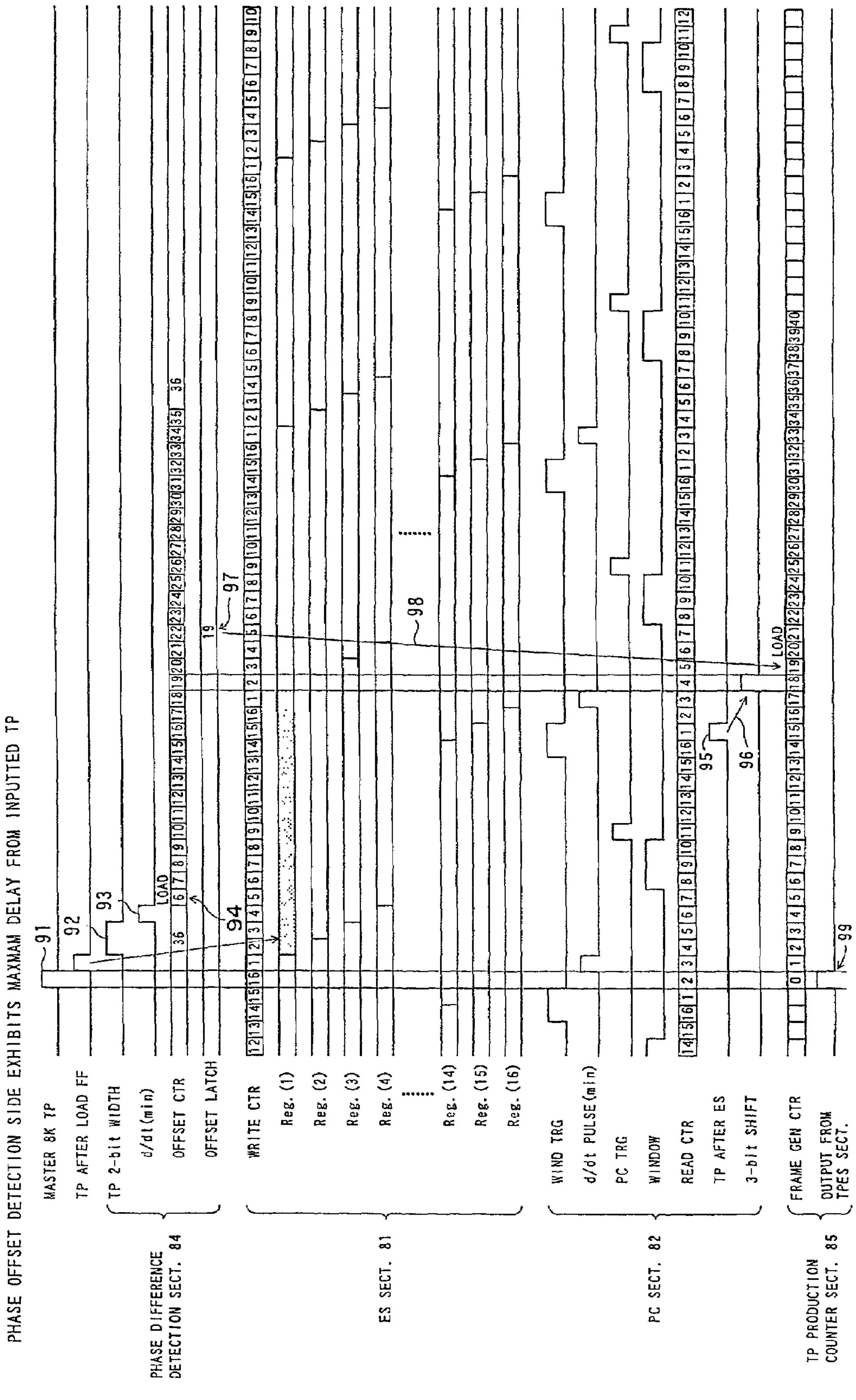
FIG. 35 is a time chart illustrating operation of the MTPES circuit shown in FIG. 31 (when the bit delay of the phase difference detection side is in the maximum)

In particular, as shown in FIGS. 34 and 35, the 8 kHz frame timing (78 MTP: refer to reference numeral 91) from the MFT circuit 29 is decompressed so as to have a 2-bit width by the 2-bit width decompression circuit 841 (refer to reference numeral 92), and the offset counter 843 is loaded with the load value "6" (refer to an arrow mark 94) in response to a pulse (refer to reference numeral 93) obtained by differentiating the pulse with the master clock from the BPIF section 31 by means of the differentiation circuit 527 and starts its counting operation (free-running).

At this time, if phase supervision with the initial window is performed by the PC section 82, then the offset latch circuit 845 latches the count value of the offset counter 843 then (in FIG. 34, the count value is "7" when the bit delay by the phase difference detection is in the minimum, but in FIG. 35, the count value is "19" when the bit delay is in the maximum) as a detected phase difference (offset value) in response to a pulse obtained by shifting the 78 MTP (refer to reference numeral 95) re-clocked by the ES section 51A by 3 bits by means of the 3-bit shift circuit 815 (refer to an arrow mark 97).

The offset value is loaded into the frame production counter 529 (refer to a broken line arrow mark 98). It is to be noted that the latched offset value is loaded as an offset value during phase supervision with the normal window after the changeover from the initial window to the normal window into the frame production counter 529 for each frame.

Then, the frame production counter 529 starts its counting from the offset value loaded therein, and each time the count value "9, 719" of the frame production counter 529 is decoded, the TP is delayed by 1 bit and outputted. Consequently, the 78 MTP after the re-clocking by the ES section 81 is outputted at a timing preceding by the latched offset value (refer to an arrow mark 99).

Consequently, a phase difference of the 8 kHz frame timing (78 MTP) before and after it passes the ES section 81 (after the re-clocking) is absorbed, and the 8 kHz frame timing (78 MTP) produced by the MFT circuit 32-9 is synchronized with the master clock (Master 78), which is an operation clock for the BPIF section 31, main signal ES circuit 32-2 and cross connect section 32-3 (refer to FIG. 1).

In short, the MTPES circuit 32-10 controls the production timing of the readout TP by the TP production counter section 85 so that the 8 kHz frame timing (78 MTP) produced by the MFT circuit 32-9 and finally supplied as the readout TP (78 MTP) for the main signal ES circuit (for reception) 32-2 (refer to FIG. 1) and the master TP at the BPIF section 31 may have a coincident phase relationship.

As a result, margins (rooms) to the preceding and following memory stages for the readout TP in the main signal ES circuit 32-2 can be provided in average as hereinafter described, and the number of memory stages necessary for the main signal ES circuit 32-2 can be suppressed to the minimum (108 stages as hereinafter described).

(E) Detailed Description of the Main Signal ES Circuit 32-2

Figure 36:
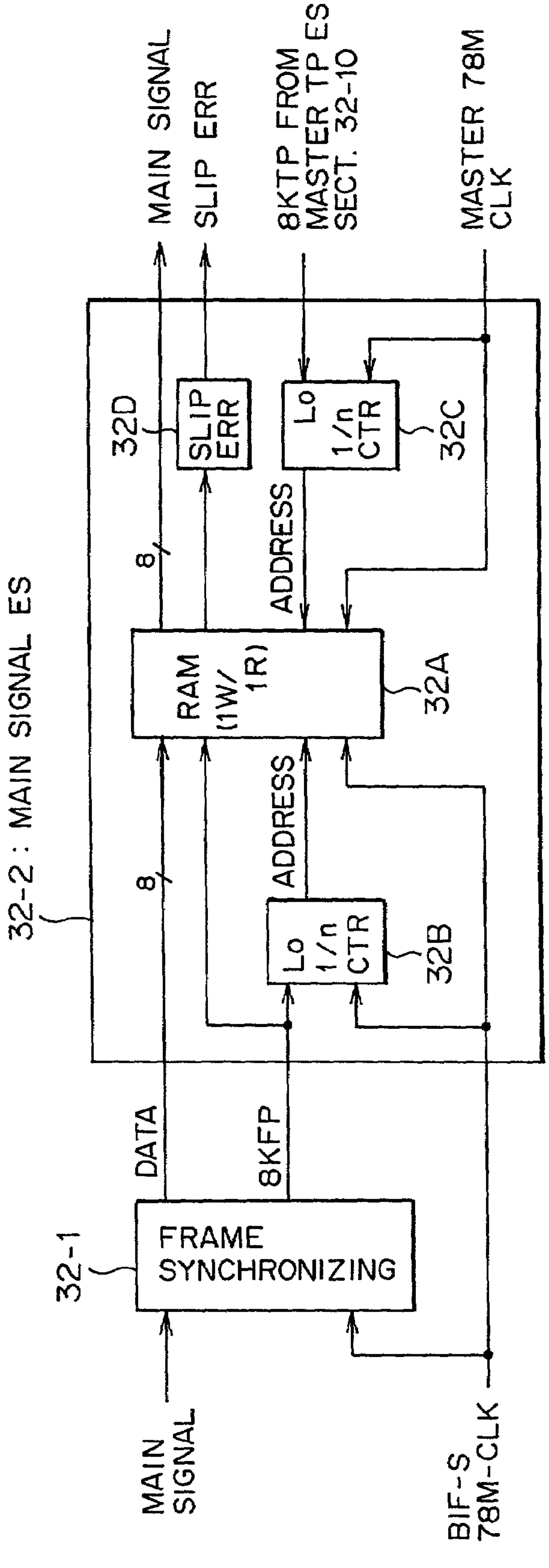
FIG. 36 is a block diagram showing a detailed configuration of a main signal ES circuit shown in FIG. 1.

FIG. 36 is a block diagram showing a detailed configuration of the main signal ES circuit 32-2 described above. As shown in FIG. 36, the main signal ES circuit 32-2 includes a RAM 32A, a write counter 32B, a read counter 32C and a slip error detection section 32D.

The RAM (main signal memory section) 32A stores a main signal frame frame-synchronized by the frame synchronizing section 32-1. It is to be noted, however, that also the 8 kHz frame pulse (FP) from the frame synchronizing section 32-1 is written in addition to the main signal frame data into the area of the address "0" of the RAM 32A.

The write counter 32B starts its counting operation using the 8 kHz FP from the write counter 32B as a load timing to produce a write address for the RAM 32A in accordance with the master clock from the BPIF section 31. The read counter 32C starts its counting operation using the 8 kHz frame timing (8 kHz TP) re-clocked in timing by the MTPES circuit 32-10 described hereinabove as a load timing to produce a read address for the RAM 32A in accordance with the intra-apparatus reference clock of 78 MHz. The slip error detection section 32D detects a memory slip state of the RAM 32A.

Figure 37:
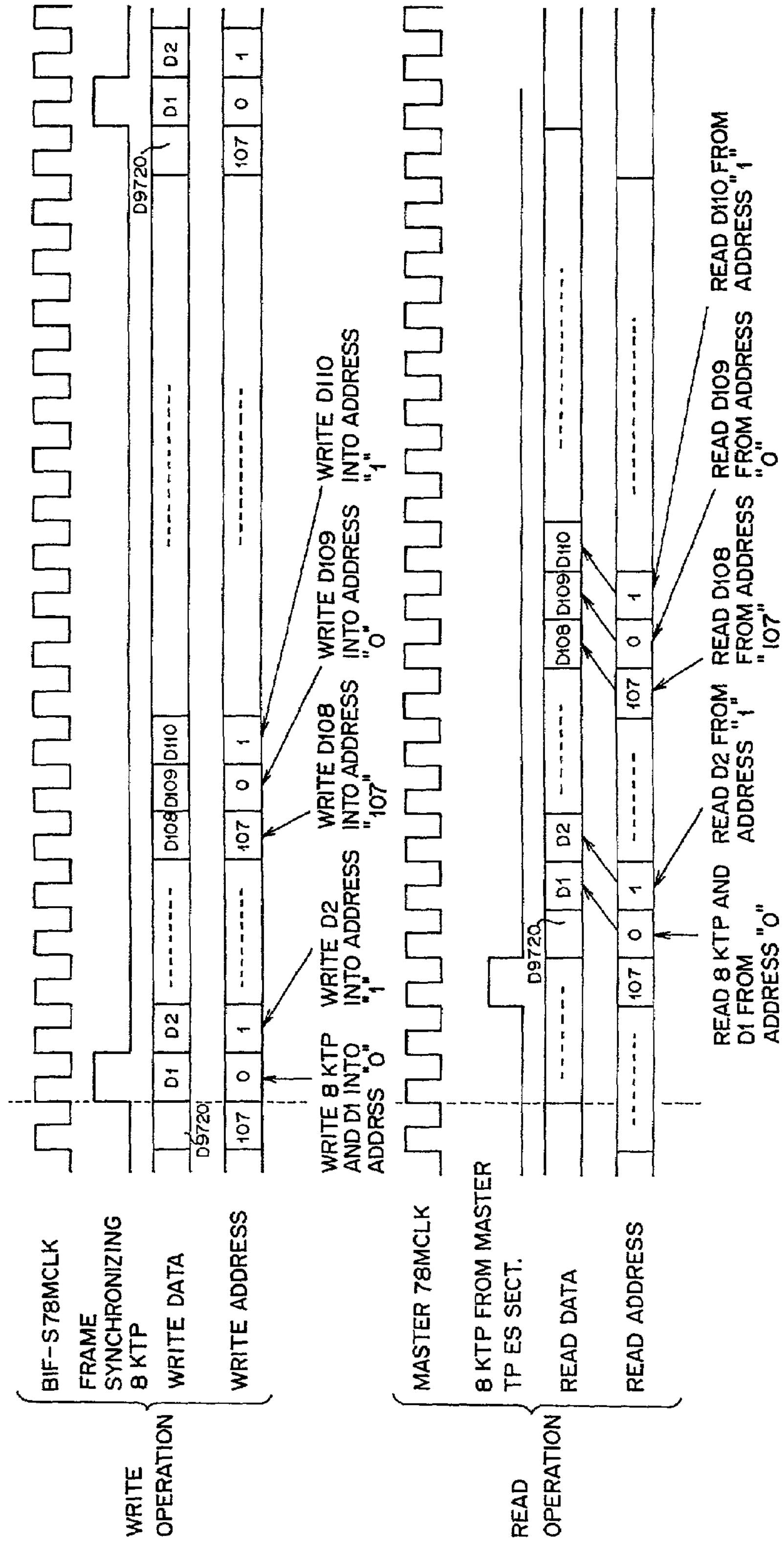
FIG. 37 is a time chart illustrating operation of the main signal ES circuit shown in FIG. 36.

In the main signal ES circuit 32-2 having such a configuration as described above, for example, as shown in FIG. 37, main signal frame data after frame synchronization by the frame synchronizing section 32-1 are successively stored into a write address area produced by the write counter 32B in accordance with the master clock of the BPIF section 31 and are successively read out from an address area denoted by the read counter 32C in accordance with the intra-apparatus reference clock of 78 MHz with reference to the 8 kHz TP from the MTPES circuit 32-10.

Consequently, re-clocking of the main signal frame data to the master clock of the BPIF section 31 is performed. Here, when the read counter 32C is loaded with the 8 kHz TP from the MTPES circuit 32-10 (at the position of 0 indicated by a screened portion in FIG. 37), if the 8 kHz FP is not read out by the write counter 32B (8 kHz FP=0), then a slip error representing that re-clocking has not successfully been changed regularly is detected by the slip error detection section 32D. The slip error is reported to the microcomputer 6 through the microcomputer I/F section 32-11.

It is to be noted that also the main signal ES circuit 32-6 for transmission shown in FIG. 1 has a configuration similar to that of the main signal ES circuit 32-2 described above.

Now, the number of memory stages of the main signal ES circuit 32-2 (RAM 32A) described above is described.

Figure 38A:
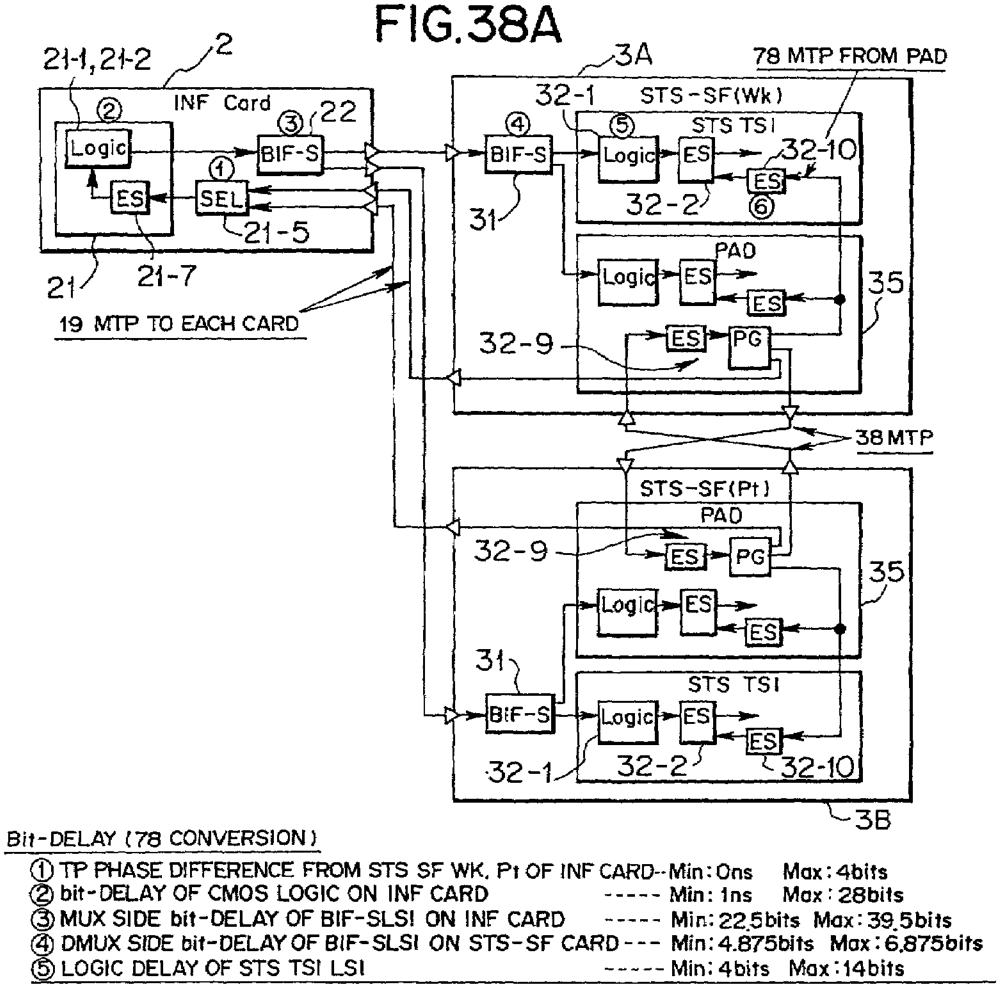
FIG. 38A is a block diagram illustrating calculation of the memory stage number necessary for the main signal ES circuit shown in FIG. 36.

First, where an IF board and the STS-XC units 3A and 3B described above are connected in such a manner as shown in FIG. 38A, if bit delays indicated at ① to ⑤ are totaled, then the total bit delay of the write timing (TP) for the main signal ES circuit 32-2 (RAM 32A) is 31.375 bits in the minimum and 92.375 bits in the maximum.

Figure 38B:
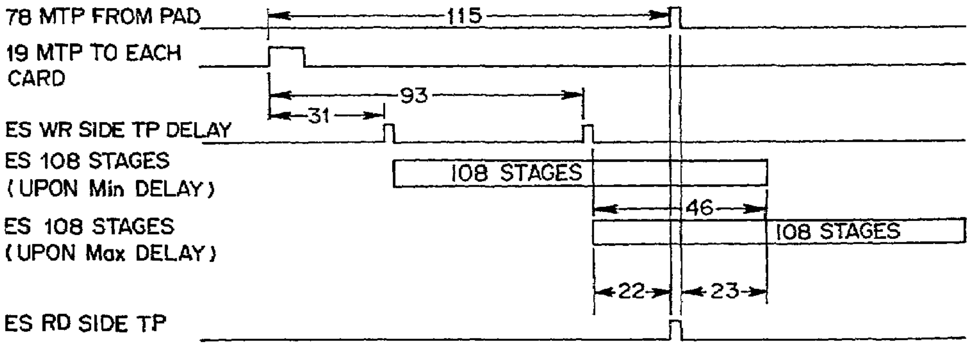
FIG. 38B is a time chart illustrating calculation of the memory stage number necessary for the main signal ES circuit shown in FIG. 36.

Accordingly, if it is considered that the bit delay of the write timing (TP) is 31 bits in the minimum and 93 bits in the maximum, then the maximum bit delay difference between them is 62 bits as seen in FIG. 38B.

Here, if it is assumed that the read timing (TP) for the main signal ES circuit 32-2 (RAM 32A) is delayed by 115 bits from the 8 kHz frame timing (19 MTP) distributed to each IF board 2 and it is tried to provide, for example, margins of 22 bits and 32 bits before and after the read timing (TP), then it can be recognized that a number of memory stages for 62+22+23+1=108 bits are required.

(F) Detailed Description of the Transmission Format Conversion Circuits 22-1 and 31-1

Figure 39:
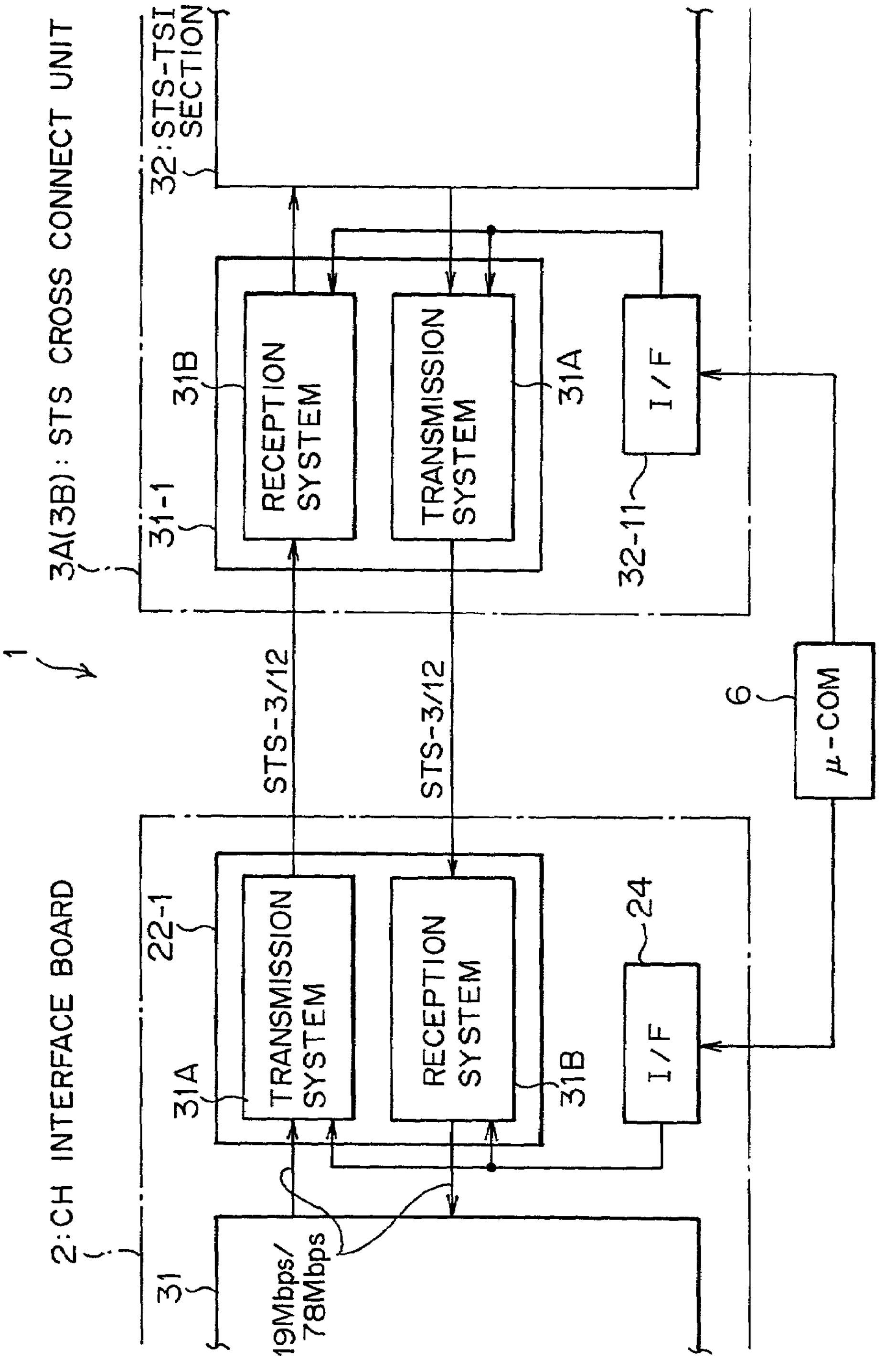
FIG. 39 is a block diagram showing a configuration of a SONET transmission apparatus with attention paid to a configuration of a transmission format conversion circuit shown in FIG. 1.

FIG. 39 is a block diagram showing a configuration of the transmission apparatus 1 with attention paid to the transmission format conversion circuits 22-1 and 31-1 shown in FIG. 1. As shown in FIG. 39, each of the transmission format conversion circuits 22-1 and 31-1 includes a transmission system 31A and a reception system 31B.

Figures 40A, 40B:
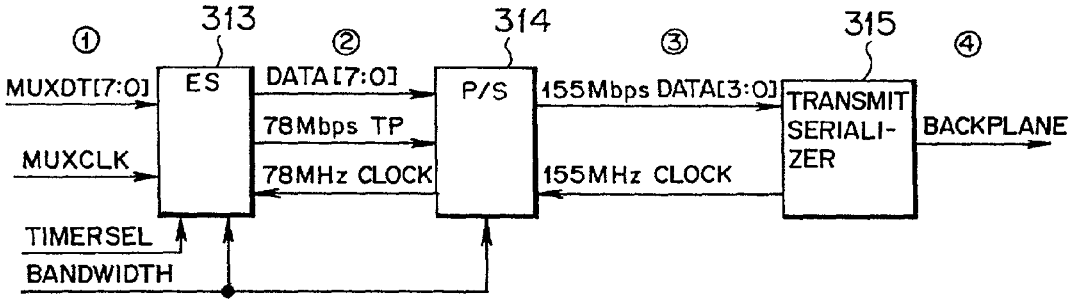
FIG. 40A is a view illustrating operation mode setting for a transmission system of the transmission format conversion circuit shown in FIG. 39.
FIG. 40B is a block diagram showing a configuration of the transmission system of the transmission format conversion circuit shown in FIG. 39.

The transmission system 31A described above includes, for example, as shown in FIG. 40A, an ES section 313, a parallel/serial P/S conversion circuit 314 and a transmission serializer 315. When such operation mode setting (BANDWIDTH=0/1: A/B) as illustrated in FIG. 40A is performed for the ES section 313 from the microcomputer 6 (microcomputer I/F section 32-11) in response to an operation rate (19 Mbps/78 Mbps) of an IF board 2 accommodated in the transmission system 31A, the transmission system 31A performs rate conversion for the input signal in the order of ① to ④ illustrated in FIGS. 40A and 40B.

Figure 41:
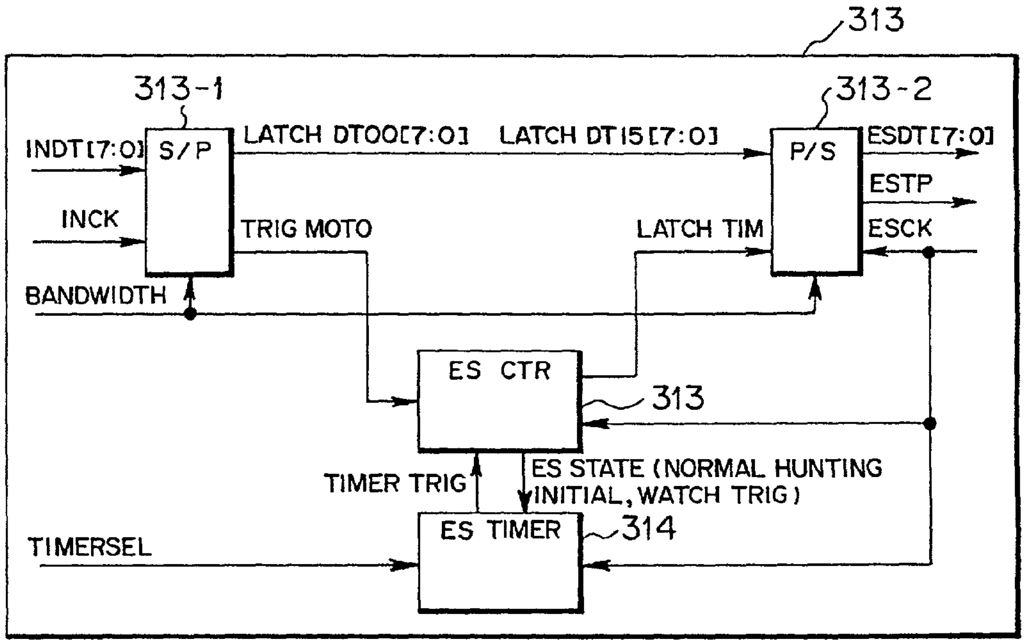
FIG. 41 is a block diagram showing a detailed configuration of an ES section shown in FIG. 40B.

The ES section 313 includes, for example, as shown in FIG. 41, an S/P converter 313-1, a P/S converter 313-2, an ES counter section 313 and an ES timer section 314. The operation mode setting described is performed for the S/P converter 313-1 and the P/S converter 313-2, and phase supervision control for timing re-clocking of the transmission frame by the S/P converter 313-1 and the P/S converter 313-2 is performed by the ES counter section 313 and the ES timer section 314 similarly as in the clock phase protection section 51 or the MTPES circuit 32-10 described hereinabove.

For example, in the transmission system 31A of the transmission format conversion circuit 22-1 of the IF board 2 side, if a main signal of 19 Mbps is received from the CH interface section 21, then the operation mode A is set, and the rate of the receive main signal is converted into the rate of the STS-3 (155 Mbps). However, if a main signal of 78 Mbps is received, then the operation mode B is set, and the rate of the receive main signal is converted into the rate of the STS-12 (622 Mbps).

Figure 42:
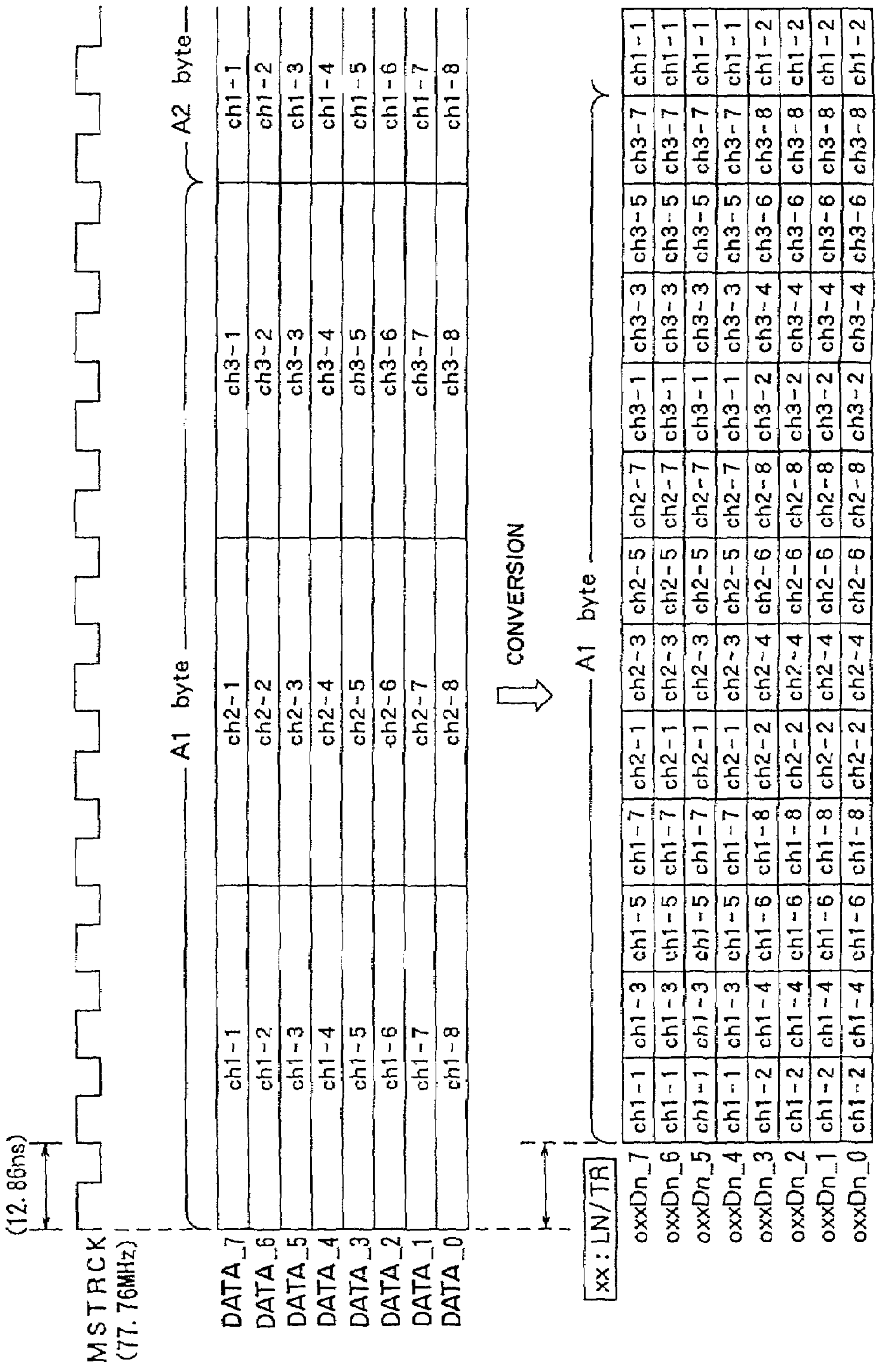
FIG. 42 is a view illustrating an example of format conversion by the transmission system of the transmission format conversion circuit shown in FIG. 40B.

Meanwhile, in the transmission system 31A of the transmission format conversion circuit 31-1 of the STS-XC unit 3A (3B) side, normally the operation mode B is set and the rate of a fixed transmission main signal (78 Mbps) from the STS-TSI section 32 is converted into 622 Mbps. It is to be noted, however, that the difference between the signal rates (622 Mbps/155 Mbps) of the conversion destination depending upon the difference between the operation rates (78 Mbps/19 Mbps) of the IF board 2 corresponds to the difference between whether the main signal configuration of 622 Mbps is different among different channels (refer to (a) of FIG. 46) or is the same among each four channels [the main signal for one channel (1 byte) is accommodated in 78 Mbps×4 bits (refer to FIG. 42 or (a) of FIG. 47)].

Consequently, the transmission system 31A of the transmission format conversion circuit 22-1 can convert a main signal (19 Mbps/78 Mbps) received from an IF board 2 into a signal of a fixed inter-unit transmission rate (155 Mbps/622 Mbps) and transmit the resulting signal to the STS-XC unit 3A (3B). Meanwhile, the transmission system 31A of the transmission format conversion circuit 31-1 can convert a transmission main signal (78 Mbps) received from the STS-TSI section 32 into a signal of a fixed inter-unit transmission rate (155 Mbps/622 Mbps) and transmit the resulting signal to the IF board 2.

Figures 43A, 43B:
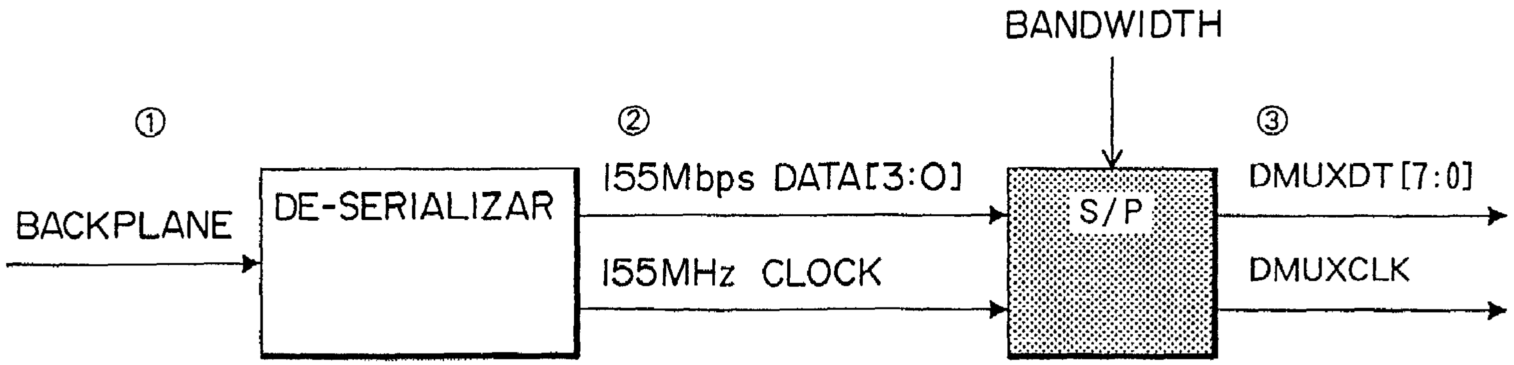
FIG. 43A is a view illustrating operation mode setting for a reception system of the transmission format conversion circuit shown in FIG. 39.
FIG. 43B is a block diagram showing a configuration of a reception system of the transmission format conversion circuit shown in FIG. 39.

FIG. 43B is a block diagram showing a configuration of the reception system 31B described hereinabove. The reception system 31B shown in FIG. 43B includes a deserializer 311 and a serial/parallel (S/P) conversion circuit 312.

The deserializer 311 converts input data into 4 parallel data of 155 Mbps and a clock of 155 MHz irrespective of the transmission rate and the clock of the input data. The S/P conversion circuit 312 converts the 4 parallel data and the clock of 155.52 Mbps from the deserializer 311 into 8 parallel data and a clock, respectively.

To the S/P conversion circuit 312, such operation mode setting (BANDWIDTH=0/1: A to C) as illustrated in FIG. 39A is performed from the microcomputer 6 (microcomputer I/F section 32-11) in response to a received main signal (STS-3/12) through an external terminal (not shown). Consequently, rate conversion of the receive main signal is performed in accordance with the thus set operation mode (refer to FIG. 44).

For example, in the reception system 31B of the STS-XC unit 3A (3B) side, since it is necessary to convert the rate of a receive main signal (STS-3/12) from an IF board 2 into the intra-unit transmission rate of 78 Mbps, the operation mode C/B is set. On the other hand, in the reception system 31B of the IF board 2 side, since it is necessary to convert the rate the receive main signal (STS-3/12) from the STS-XC unit 3A (3B) into the intra-unit transmission rate of 19 Mbps/78 Mbps, the operation mode A/B is set.

Figure 44:
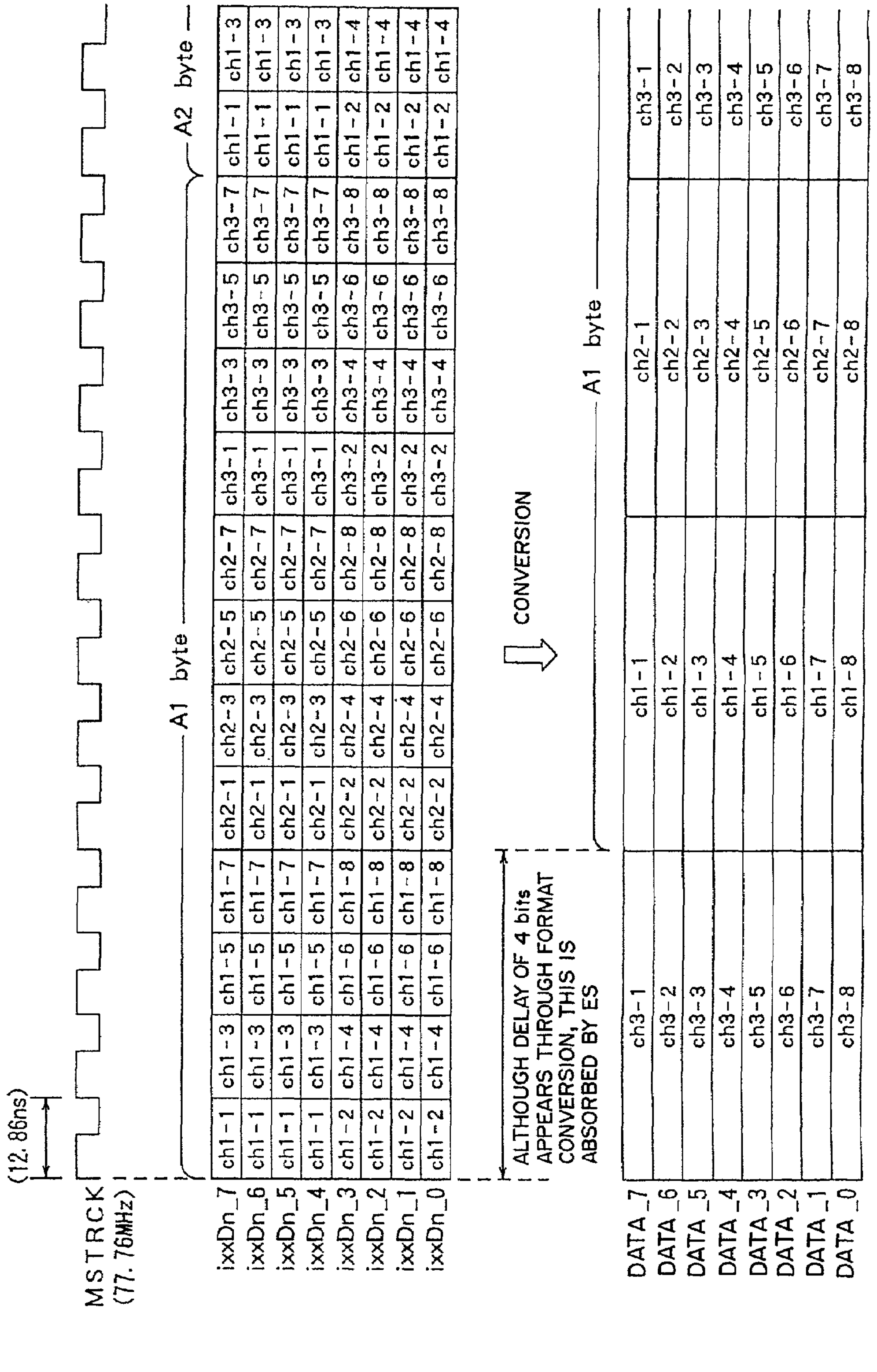
FIG. 44 is a view illustrating an example of format conversion by the reception system of the transmission format conversion circuit shown in FIG. 43B.
Figure 46:
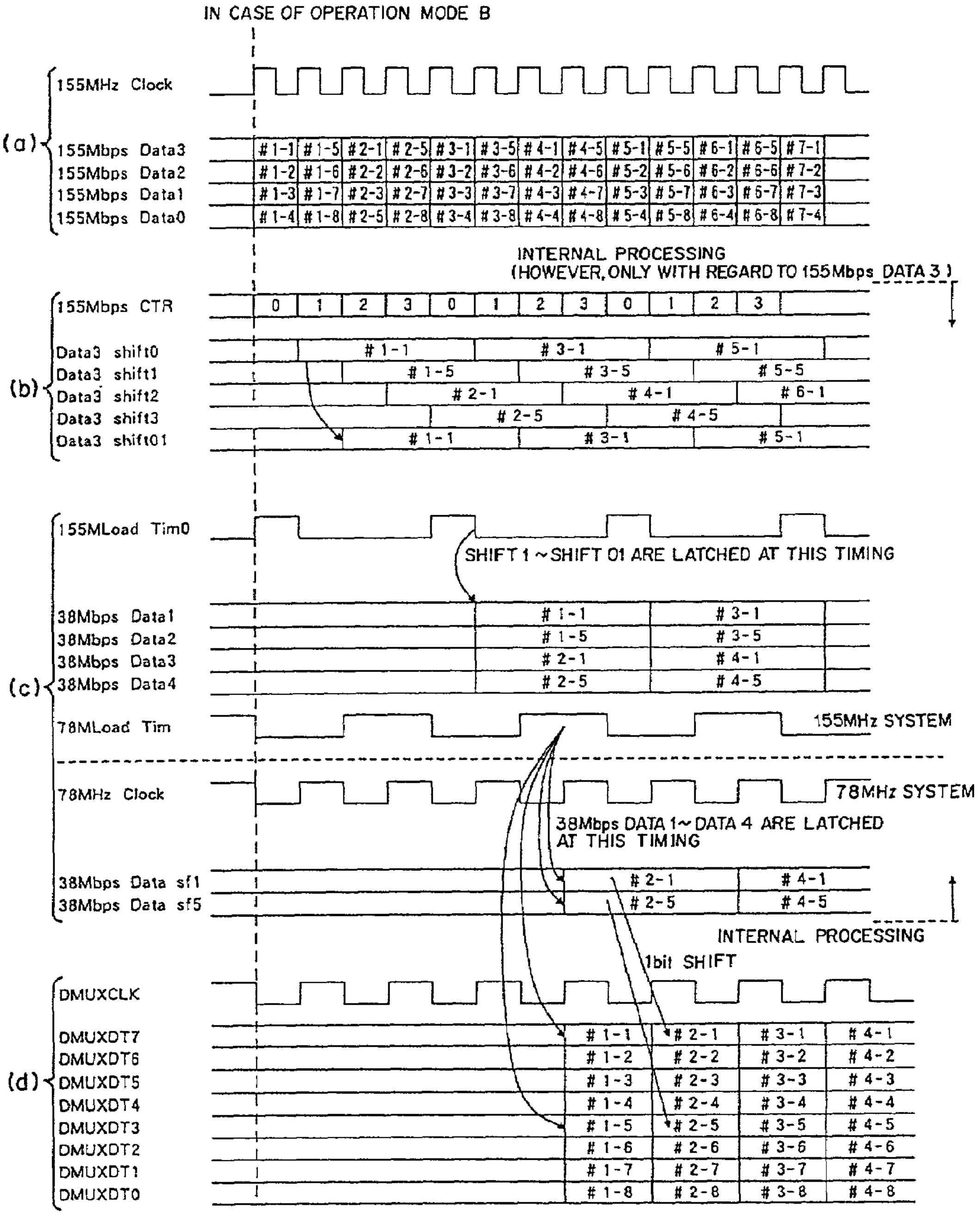
FIG. 46 is a time chart illustrating an example of format conversion in another operation mode B.
Figure 47:
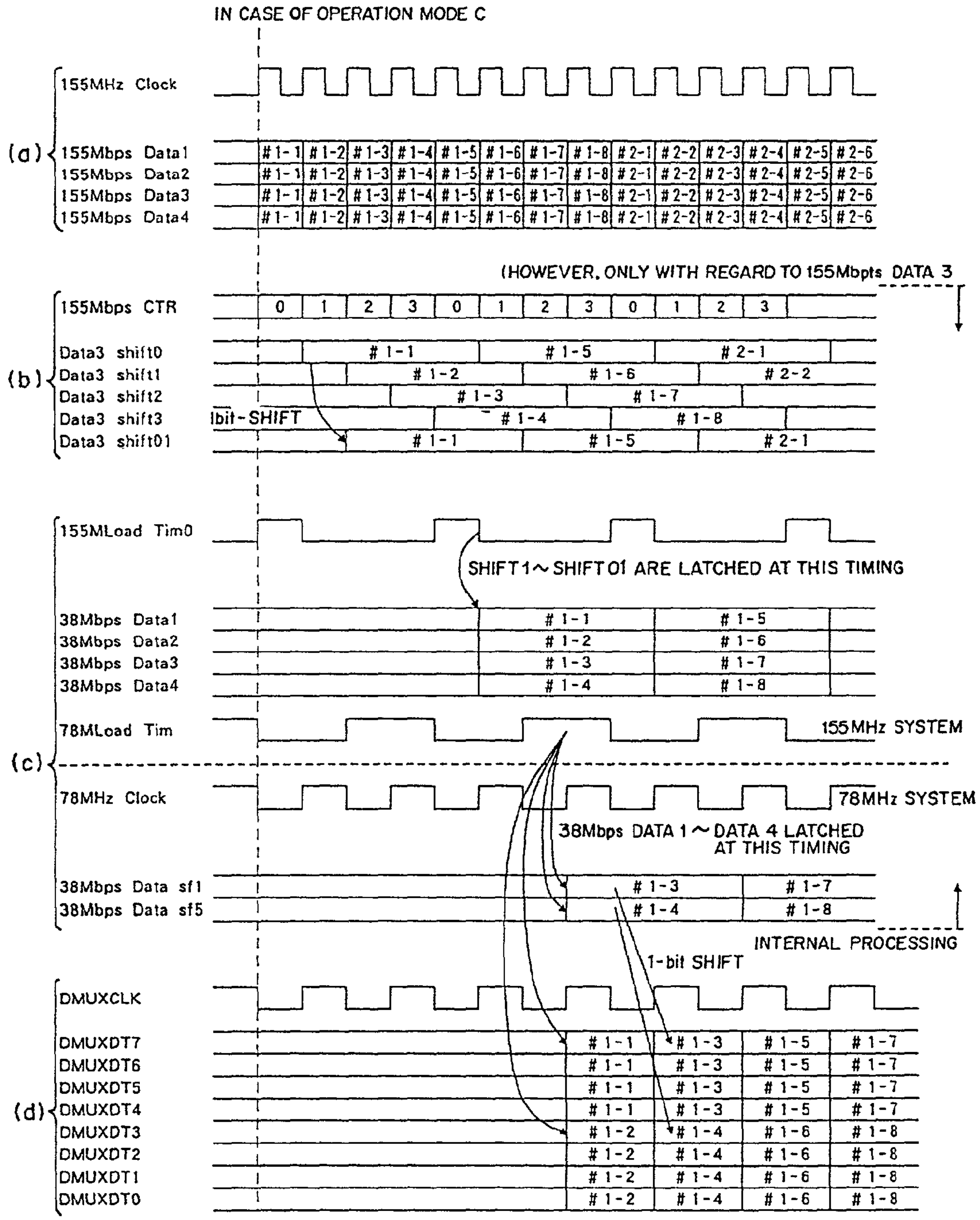
FIG. 47 is a time chart illustrating an example of format conversion in a further operation mode C.
Figure 48:
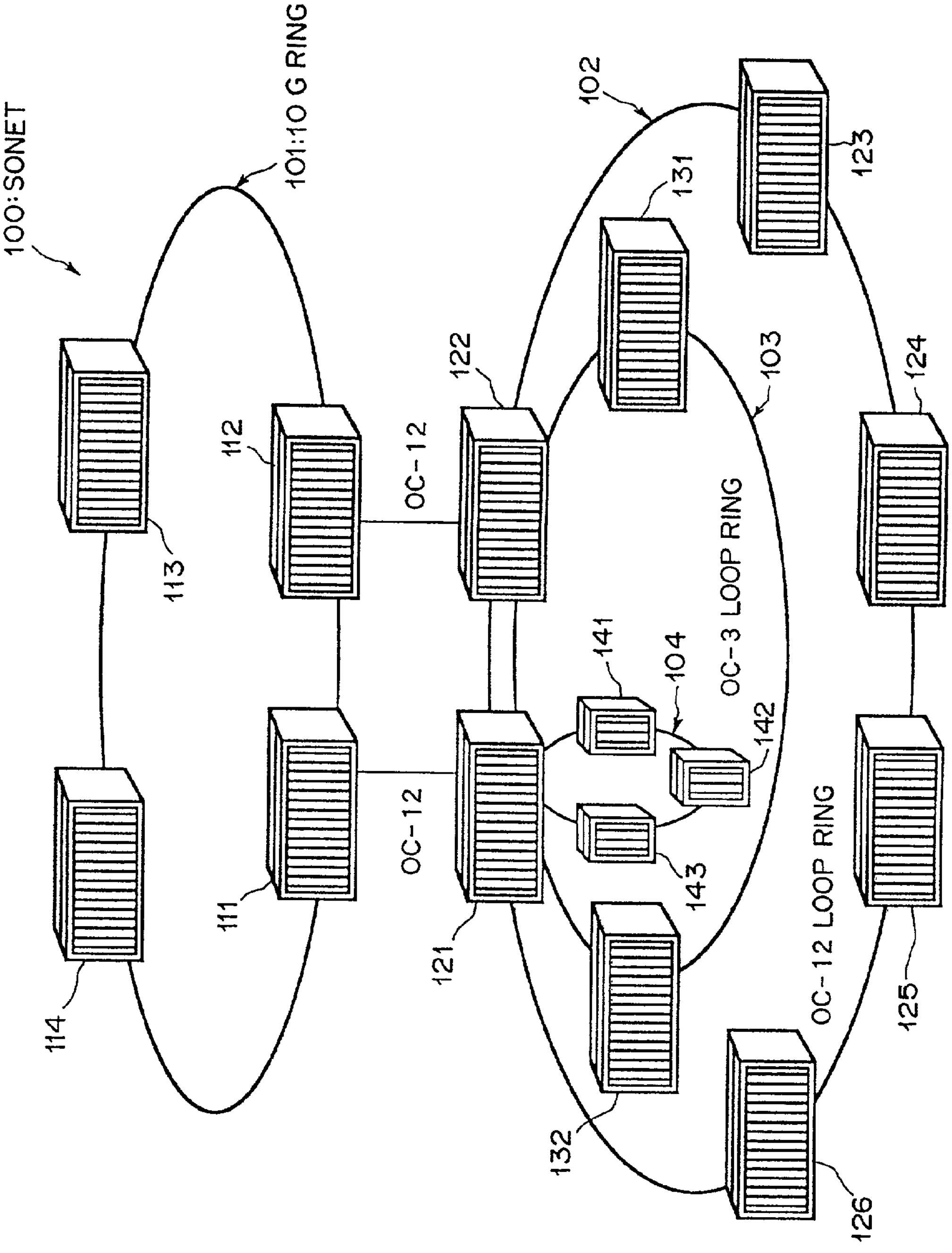
FIG. 48 is a block diagram showing an example of a configuration of a SONET (SDH transmission network)

However, in the operation modes B and C, since the difference in the input signal rates of the conversion sources (622 Mbps/155 Mbps) is only a difference of whether the main signal configuration of 622 Mbps is different among different channels (refer to (a) of FIG. 46) or is the same for each four channels (refer to FIG. 44 or (a) of FIG. 47), the same value (BANDWIDTH=1) is set for the set values.

Consequently, in the reception system 31B of the STS-XC unit 3A (3B) side, the rate of a receive main signal can be converted into the intra-unit transmission rate (78 Mbps) of the STS-XC unit 3A (3B) irrespective of the signal rate handled by the IF board 2. Meanwhile, in the reception system 31B of the IF board 2 side, the rate of a receive main signal from the STS-XC unit 3A (3B) can be converted into a signal rate handled by the corresponding IF board 2.

Examples of format conversion in the operation modes A to C described above are illustrated in FIGS. 45 to 47, respectively.

First, in the operation mode A, as shown in (a) of FIG. 45, deserialization (shifting) processing by the deserializer 311 is performed as shown in (b) and (c) of FIG. 45 for only one (for example, Data3) of receive frames of which the same four signals are inputted in parallel (Data0 to Data4) at 155 Mbps per one data series, and then S/P conversion by the S/P conversion circuit 312 is performed for the signal (Data3). Consequently, data of 19 Mbps (8 parallel) is obtained finally.

In the operation mode B, as shown in (a) of FIG. 46, deserialization (shifting) processing by the deserializer 311 is performed as shown in (b) and (c) of FIG. 46 for all receive frames (totaling 622 Mbps) of which different four signals are inputted in parallel (Data0 to Data4) at 155 Mbps per one data series, and then S/P conversion by the S/P conversion circuit 312 is performed for the signals (Data0 to Data4). Consequently, data of 78 Mbps (8 parallel) is obtained finally.

In the operation mode C, as shown in (a) of FIG. 47, deserialization (shifting) processing by the deserializer 311 is performed as shown in (b) and (c) of FIG. 47 for all receive frames of which the same signals are inputted in parallel (Data0 to Data4) at 155 Mbps per one data series, and then S/P conversion by the S/P conversion circuit 312 is performed for the signals (Data0 to Data4). Consequently, data of 78 Mbps (8 parallel) is obtained finally.

It is to be noted, however, that (b) and (c) of FIGS. 45 to 47 illustrate operation with attention paid to one (Data3) of receive frames of 4 parallel inputs.

As described above, in the present transmission apparatus 1, since it includes the transmission format conversion circuits 22-1 and 31-1 having such a configuration as described above, main signals can be successively converted into and transmitted as signals of a fixed inter-unit transmission rate and a fixed intra-unit transmission rate irrespective of accommodated network applications of the IF board 2 (transmission rates of the received main signals). Therefore, it is not necessary to provide an individual conversion circuit in accordance with a signal rate (network application) handled by each IF board 2. Accordingly, IF boards 2 for various network applications can be provided without increasing the apparatus scale of the transmission apparatus 1.

Further, since the transmission system 31A and the reception system 31B of the same configuration may be provided for the transmission format conversion circuits 22-1 and 31-1, the number of kinds of necessary parts is reduced, and consequently, the number of moves for apparatus development is reduced and the period for apparatus development can be reduced significantly. Further, since the rate conversion described hereinabove can be changed suitably through operation mode setting from the microcomputer 6 (microcomputer I/F section 24 or 32-11), IF boards 2 for a variety of applications can be accommodated in the common transmission format conversion circuits 22-1 and 31-1.

(G) Others

It is to be noted that the main PLL circuit 23, RCK selector circuit 21-5 and MTPES circuit 21-7 of the IF boards 2 have substantially similar configurations to those of the main PLL circuit 34, RCK selector circuit 32-8 and MTPES circuit 32-10 in the STS-XC unit 3A (3B), respectively.

Accordingly, also from the fact that the MTPES circuit 32-10 has a substantially similar configuration to that of the clock phase protection section 51 of the MFT circuit 23-9 as described hereinabove, the number of required parts is further reduced, and this contributes very much to reduction of the apparatus scale and reduction of the period for apparatus development.

Further, while, in the embodiment described above, the case wherein cross connect processing is applied as main signal processing, any processing (for example, multiplexing processing or the like) can be applied similarly if it is necessary to perform it in a state wherein the frame top positions of main signals from the IF boards 2 are adjusted to one another.

The present invention is not limited to the embodiment described hereinabove, but can be carried out in various forms without departing from the spirit and scope of the present invention.

INDUSTRIAL APPLICABILITY OF THE INVENTION

As described above, according to the present invention, by suppressing phase variations of a reference frame timing to be distributed in the apparatus including IF boards to the minimum, a dispersion in bit delay of receive main signals from the IF boards can be suppressed to the minimum. Therefore, the timings of the receive main signals can be re-clocked to an intra-apparatus reference frame timing without using the pointer processing technique while suppressing the necessary memory capacity to the minimum. Accordingly, it is considered that the present invention contributes very much to miniaturization, reduction in cost, improvement in performance and so forth of SDH transmission apparatus and the utility of the present invention is very high.

The invention claimed is:

1. An SDH or SONET transmission apparatus, comprising:

a plurality of interface units (2) for accommodating main signal frames including channel data of a plurality of channels and compliant with an SDH transmission system; and a main signal processing unit (3A) accommodating said interface units (2) for performing predetermined main signal processing for the main signal frames; that said main signal processing unit (3A) includes a frame timing production section (32-9) for producing an intra-apparatus reference frame timing based on an intra-apparatus reference clock;

a frame timing distribution section (32-9) for distributing the intra-apparatus reference frame timing produced by said frame timing production section to said interface units; and a main signal timing re-clocking section (32-2) for synchronizing frame timings of the main signal frames with the intra-frame reference frame timing using a main signal memory section (32A) for temporarily storing the main signal frames; and that each of said interface units (2) includes a main signal signaling processing section (21) for performing signaling a main signal frame to said main signal processing unit based on the intra-apparatus reference frame timing distributed from said frame timing distribution section (32-9) of said main signal processing unit.

2. An SDH or SONET transmission apparatus as set forth in claim 1, characterized in that said main signal processing unit (3A) includes a cross connect section (32) for performing cross connect processing in a unit of channel data for the main signal frames from said main signal timing re-clocking section (33-2).

3. An SDH or SONET transmission apparatus as set forth in claim 1, characterized in that each of said interface units (2) includes a frame synchronizing signal application section (21-2) for applying a frame synchronizing signal to a main signal frame, and said main signal processing unit (3A) includes, for each of said interface units (2), a frame synchronizing section (32-1) for detecting the frame synchronizing signal from the main signal frame from the interface unit (2) to establish synchronism of the main signal frame.

4. An SDH or SONET transmission apparatus as set forth in claim 1, characterized in that each of said interface units (2) includes a first transmission rate conversion section (22-1) for convening the rate of a main signal frame into a predetermined inter-unit transmission rate and transmitting the resulting main signal frame to said main signal processing unit, and said main signal processing unit (3A) includes, for each of said interface units (2), a second transmission rate conversion section (31-1) for convening the rate of a main signal frame from said first transmission rate conversion section (22-1) of any of said interface units (2) into the predetermined intra-apparatus transmission rate.

5. An SDH or SONET transmission apparatus as set forth in claim 4, characterized in that said main signal processing unit (3A) includes a main PLL circuit (34) for performing PLL processing for the intra-apparatus reference clock, and a sub PLL circuit (31-2) provided for each of the second transmission rate conversion sections (31-1) for performing PLL processing for the intra-apparatus reference clock after the PLL processing by said main PLL circuit (34) and supplying the resulting intra-apparatus reference clock as an operation clock for the second transmission rate conversion section (31-1).

6. An SDH or SONET transmission apparatus as set forth in claim 5, characterized in that said main PLL circuit (34) includes a distribution outputting section (34-9) for outputting the intra-apparatus reference clock after the PLL processing individually for the sub PLL circuits (31-2).

7. An SDH or SONET transmission apparatus as set forth in claim 5, characterized in that at least one of the sub PLL circuits (31-2) produces a master clock of an intra-apparatus reference frame timing based on the intra-apparatus reference clock, and said main signal processing unit (3A) includes a frame timing re-clocking section (32-10) for synchronizing the intra-apparatus reference frame timing produced by said frame timing production section with the master clock.

8. An SDH or SONET transmission apparatus as set forth in claim 7, characterized in that said frame timing re-clocking section (32-10) includes:

a second memory section (81) for storing the intra-apparatus reference frame timing produced by said frame timing production section and reading out the intra-apparatus reference frame timing based on the master clock to synchronize the intra-apparatus reference frame timing with the master clock;

a second frame timing production counter section (85) for performing a predetermined counting operation based on the intra-apparatus reference frame timing read out from said second memory section (81) to produce the intra-apparatus reference frame timing synchronized with the master clock; and a second phase difference correction control section (84) for detecting a phase difference of the inter-unit reference frame timing before and after the inter-unit reference frame timing passes said second memory section (81) and performing correction control of the counting operation of said second frame timing production counter section (85) so that the phase difference may be reduced to zero.

9. An SDH or SONET transmission apparatus as set forth in claim 4, characterized in that each of said interface units (2) includes a first transmission rate conversion setting interface section (24) for performing setting for transmission rate conversion of said first transmission rate conversion section (22-1) in accordance with an external transmission rate setting.

10. An SDH or SONET transmission apparatus as set forth in claim 4, characterized in that said main signal processing unit (3A) includes a second transmission rate conversion setting interface section (32-11) for performing setting for transmission rate conversion of said second transmission rate conversion section (31-1) in accordance with an external transmission rate setting.

11. An SDH or SONET transmission apparatus as set forth in claim 1, characterized in that, where said main signal processing unit has a redundancy configuration including a work main signal processing unit (3A) and a protection main signal processing unit (3B), and each of said main signal processing units (3A and 3B) includes a reference clock selection section (32-8) for selecting a higher accuracy one of the intra-apparatus reference clocks of said work and protection main signal processing units.

12. An SDH or SONET transmission apparatus as set forth in claim 11, characterized in that each of said main signal processing units (3A and 3B) includes a clock selection setting interface section (32-11) for performing setting for clock selection of said reference clock selection section in accordance with an external clock selection instruction.

13. An SDH or SONET transmission apparatus as set forth in claim 1, characterized in that, where said main signal processing unit has a redundancy configuration including a work main signal processing unit (3A) and a protection main signal processing unit (3B), and each of said main signal processing units (3A and 3B)

mutually transfer intra-unit synchronizing timings based on the intra-apparatus reference clocks to synchronize intra-apparatus reference frame timings thereof with each other.

14. An SDH or SONET transmission apparatus as set forth in claim 13, characterized in that said frame timing production section (32-9) of the work main signal processing unit (3A) includes a first counter section (53) for performing a predetermined counting operation to produce an inter-unit synchronizing timing, and said frame timing production section (32-9) of said protection main signal processing unit (3B) includes a clock phase protection section (51) for performing clock phase protection for the inter-unit synchronizing timing produced by said first counter section (53) and re-clocking the infer-unit synchronizing timing to a frame timing synchronized with the inter-unit reference frame timing of said work main signal processing unit based on an intra-frame reference clock, a frame phase protection section (52) for performing frame phase protection for the frame timing from said clock phase protection section (51), and a second counter section (53) for performing a predetermined counting operation based on the frame timing after the frame phase protection by said frame phase protection section to produce an intra-apparatus reference frame timing for said protection main signal processing unit itself.

15. An SDH or SONET transmission apparatus as set forth in claim 14, characterized in that said clock phase protection section (51) includes:

a first memory section (51A) for storing the inter-unit synchronizing timing and reading out the inter-unit synchronizing timing based on the intra-apparatus reference clock to synchronize the inter-unit synchronizing timing with the intra-apparatus reference frame timing;

a first frame timing production counter section (51E) for performing a predetermined counting operation based on the inter-unit synchronizing timing read out from said first memory section (51A) to produce the frame timing synchronized with the intra-frame reference frame timing; and a first phase difference correction control section (51D) for detecting a phase difference of the inter-unit synchronizing timing before and after the inter-unit synchronizing timing passes said first memory section (51A) and performing correction control of the counting operation of said first frame timing production counter section (51E) so that the phase difference may be reduced to zero.

16. An SDH or SONET transmission apparatus as set forth in claim 1, wherein a frame timing of a received signal frame is re-clocked to the intra-apparatus reference frame timing without using pointer processing to establish synchronism.

17. A frame timing re-clocking method for an SDH or SONET transmission apparatus which has a plurality of interface units for accommodating main signal frames including channel data of a plurality of channels and compliant with an SDH or SONET transmission system, and a main signal processing unit accommodating said interface units for performing predetermined main signal processing for the main signal frames, said method comprising the steps of:

on said main signal processing unit, performing predetermined main signal processing for the main signal frames;

producing an intra-apparatus reference frame timing based on an intra-apparatus reference clock;

distributing the intra-apparatus reference frame timing produced by said frame timing producing step to said interface units;

synchronizing frame timings of the main signal frames with the intra-frame reference frame timing; and on each of said interface units, performing signaling a main signal frame to said main signal processing unit based on an intra-apparatus reference frame timing distributed by said frame timing distributing step.

* * * * *